(12) United States Patent
Igarashi et al.

(10) Patent No.: US 9,356,810 B2
(45) Date of Patent: *May 31, 2016

(54) SEMICONDUCTOR INTEGRATED CIRCUIT AND OPERATING METHOD THEREOF

(71) Applicant: Renesas Electronics Corporation, Kawasaki-shi (JP)

(72) Inventors: Yutaka Igarashi, Tokyo (JP); Yusaku Katsube, Tokyo (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/492,427

(22) Filed: Sep. 22, 2014

(65) Prior Publication Data

US 2015/0010113 A1 Jan. 8, 2015

Related U.S. Application Data

(63) Continuation of application No. 13/743,214, filed on Jan. 16, 2013, now Pat. No. 8,842,719.

(30) Foreign Application Priority Data

Jan. 18, 2012 (JP) ................. 2012-008005

(51) Int. Cl.
*H04L 27/00* (2006.01)
*H04B 1/00* (2006.01)
(Continued)

(52) U.S. Cl.
CPC ............ *H04L 27/0002* (2013.01); *H04B 1/006* (2013.01); *H04B 1/30* (2013.01); *H04B 1/406* (2013.01); *H04L 27/2272* (2013.01)

(58) Field of Classification Search
CPC .......... H04B 1/30; H04B 1/006; H04B 1/406; H04L 27/0002; H04L 27/2272; H03C 3/095; H03C 3/0958; H03J 7/04; H04W 52/028
See application file for complete search history.

(56) References Cited

U.S. PATENT DOCUMENTS 7,580,684 B2    8/2009  Cyr et al.
7,929,594 B2 *  4/2011  Okazaki .............. H03M 1/0607
                                                            375/219
(Continued)

FOREIGN PATENT DOCUMENTS

JP      2008-113149 A    5/2008
JP      2010/245673 A   10/2010
WO    WO2009/057520 A1   5/2009

OTHER PUBLICATIONS

Notice of Allowance dated May 27, 2014, in U.S. Appl. No. 13/743,214.

(Continued)

*Primary Examiner* — Hirdepal Singh
(74) *Attorney, Agent, or Firm* — McGinn IP Law Group, PLLC

(57) ABSTRACT

A semiconductor integrated circuit includes a first wireless access system reception unit including a first analog reception unit and a first digital reception unit, a voltage-controlled oscillator, a phase locked loop, and a digital interface. The first analog reception unit comprises a first reception mixer for down-converting an RF reception signal into a first analog reception signal and a first analog-digital converter for converting the first analog reception signal into a first digital reception signal. The first wireless access system reception unit, the voltage-controlled oscillator, and the phase locked loop enable switching from a reception operation for a first RF reception signal of a first system to a reception operation for a second RF reception signal of a second system.

5 Claims, 13 Drawing Sheets

(51) Int. Cl.
*H04B 1/403* (2015.01)
*H04B 1/30* (2006.01)
*H04L 27/227* (2006.01)

(56) References Cited

U.S. PATENT DOCUMENTS

| | | | |
|---|---|---|---|
| 8,170,082 B2 | 5/2012 | Schmid | |
| 8,224,374 B2 | 7/2012 | Kato et al. | |
| 2004/0205819 A1 | 10/2004 | Khoini-Poorfard et al. | |
| 2005/0225388 A1 | 10/2005 | Ramachandran et al. | |
| 2006/0014510 A1* | 1/2006 | Yamamoto et al. | 455/260 |
| 2008/0004071 A1 | 1/2008 | Hidaka et al. | |
| 2008/0113625 A1* | 5/2008 | Maeda et al. | 455/67.14 |
| 2008/0165758 A1* | 7/2008 | Kato et al. | 370/347 |
| 2009/0122937 A1 | 5/2009 | Maskou et al. | |
| 2010/0040184 A1* | 2/2010 | Haralabidis et al. | 375/373 |
| 2010/0255834 A1 | 10/2010 | Ishii | |
| 2010/0284379 A1* | 11/2010 | Bitran | H04L 5/0087 370/338 |
| 2010/0328527 A1 | 12/2010 | Brandsma et al. | |
| 2011/0002419 A1 | 1/2011 | Sharma et al. | |
| 2011/0110464 A1* | 5/2011 | Watanabe | H04B 1/1646 375/316 |
| 2012/0121041 A1* | 5/2012 | Volnhals | 375/316 |
| 2012/0129480 A1 | 5/2012 | Ruelke et al. | |
| 2013/0003904 A1* | 1/2013 | Elenes | H04H 40/18 375/350 |
| 2013/0088388 A1 | 4/2013 | Aibara | |
| 2013/0137381 A1* | 5/2013 | Vassiliou | H04L 5/143 455/67.15 |

OTHER PUBLICATIONS

US Office Action dated Apr. 16, 2014, in U.S. Appl. No. 13/743,214.

H. Yoshida et al, "A Single-Chip 8-Band CMOS Transceiver for W-CDMA(HSPA)/GSM(GPRS)/EDGE with Digital Interface", ESSCIRC (European Solid-State Circuits Conference) 2008, pp. 142-145.

Daniel Kaczman et al, "A Single-Chip Tri-Band (2100,1900,850/800MHz) WCDMA/HSDPA Cellular Transceiver", IEEE Journal of Solid-State Circuits, vol. 41, No. 5, pp. 1122-1132, May 2005.

Tirdad Sowlati et al, "Quad-Band GSM/GPRS/EDGE Polar Loop Transmitter", IEEE Journal of Solid-State Circuits, vol. 39, No. 12, pp. 2179-2189, Dec. 2004.

Toshihiko Shimizu et al, "A Small GSM Power Amplifier Module Using Si-LDMOS Driver MMIC", 2004 IEEE International Solid-State Circuits Conference Digest of Technical Papers, pp. 196-197, Feb. 17, 2004.

* cited by examiner

RELATED ART FIG. 13
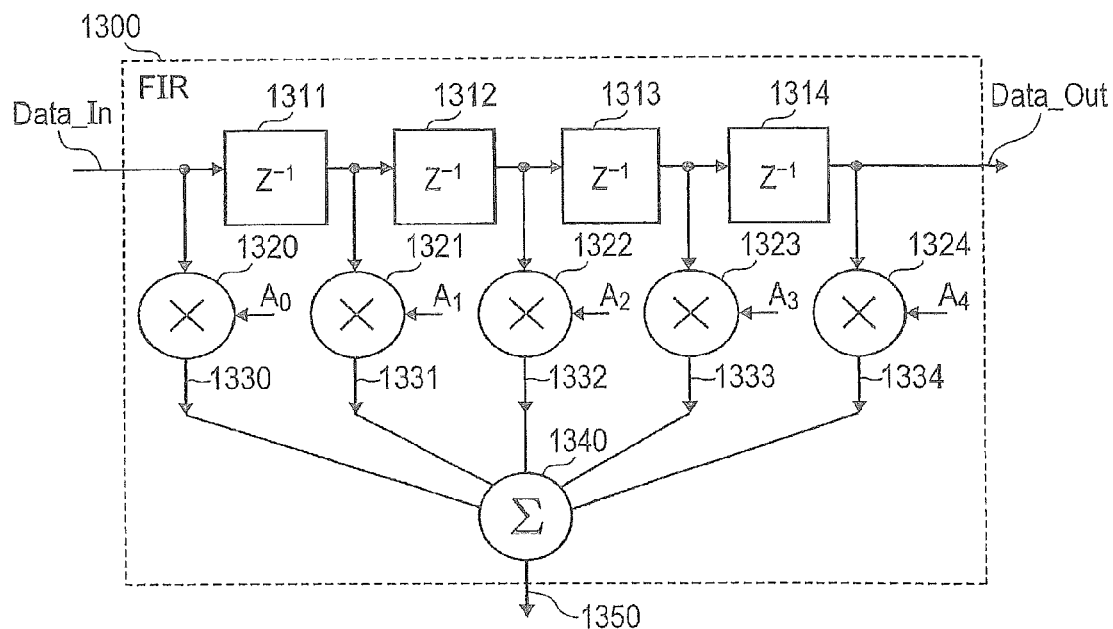
FIG. 14 RELATED ART
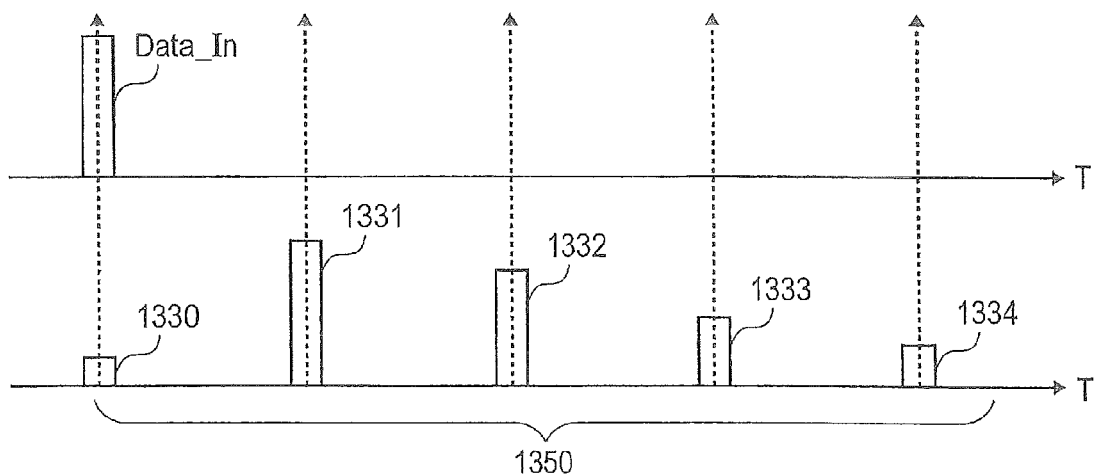

SEMICONDUCTOR INTEGRATED CIRCUIT AND OPERATING METHOD THEREOF

CROSS-REFERENCE TO RELATED APPLICATIONS

The present application is a Continuation Application of U.S. patent application Ser. No. 13/743,214 filed on Jan. 16, 2013, which is based on and claims priority from Japanese Patent Application No. 2012-008005, filed on Jan. 18, 2012, the entire contents of which is incorporated herein by reference.

BACKGROUND

The present invention relates to a semiconductor integrated circuit and an operating method thereof, and particularly to a technique effective in reducing the time of reception operation switching between multiple wireless systems.

A radio frequency (RF) signal processing circuit configured as a receiver incorporated in a cellular phone terminal etc. converts a high-frequency signal received from an antenna into a baseband signal in a lower frequency band with high quality (e.g., low noise, suppression of signals in an interference band outside a desired signal band). On the other hand, with improvements in semiconductor device process technology and semiconductor circuit technology in recent years, in the field of the cellular phone terminal etc., a radio frequency signal processing circuit that supports multiple wireless access systems is integrated in a single semiconductor chip. The wireless access systems include, for example, GSM, EDGE, W-CDMA, HSDPA, and LTE systems. GSM is an abbreviation for "Global System for Mobile Communications", EDGE is an abbreviation for "Enhanced Data for GSM Evolution: Enhanced Data for GPRS", and GPRS is an abbreviation for "General Packet Radio Service". W-CDMA is an abbreviation for "Wideband Code Division Multiple Access", HSDPA is an abbreviation for "High Speed Downlink Packet Access", and LTE is an abbreviation for "Long Term Evolution".

The semiconductor chip incorporating the above-described radio frequency signal processing circuit converts reception analog baseband signals into reception digital baseband signals, which are transferred to a baseband LSI (Large Scale Integrated Circuit) through a digital interface.

The following Non-patent Document 1 describes a single-chip dual-mode 8-band CMOS transceiver which can support W-CDMA(HSDPA) and GSM(EDGE) systems, four bands of 800 MHz, 1.5 GHz, 1.7 GHz, 2 GHz in W-CDMA, and four bands of 850 MHz, 900 MHz, 1.8 GHz, 1.9 GHz in GSM/EDGE. The transceiver includes A/D and D/A converters, digital filters, and a 312 MHz low voltage differential signaling (LVDS) interface. For a transmitter chain, linear direct quadrature modulation architecture is commonly used for both the W-CDMA (HSDPA) and GSM(EDGE) systems. For a direct conversion receiver chain, analog baseband blocks (ABB), i.e., low-pass filters (LPF) and variable gain amplifiers (VGA), delta-sigma A/D converters, and FIR filters are used for both the W-CDMA(HSDPA) and GSM(EDGE) systems to reduce chip area. The characteristics of the analog baseband blocks (ABB) are reconfigurable by register-based control sequence. The receiver chain includes high-speed DC offset cancellers both in analog and digital stages, and an autonomous AGC controller with parameters such as time constants freely programmable by digital baseband (DBE) control.

A radio frequency (RF) signal processing circuit configured as a transmitter incorporated in the cellular phone terminal etc. is also integrated in the single semiconductor chip. Accordingly, transmission digital baseband signals generated from the baseband LSI are transferred through the digital interface to the radio frequency (RF) signal processing circuit configured as the transmitter integrated in the single semiconductor chip. The transmission digital baseband signals are converted into transmission analog baseband signals by D/A converters. Thus, reception digital baseband signals and transmission digital baseband signals are transferred through the digital interface between the radio frequency (RF) signal processing circuit configured as the receiver and transmitter, i.e., a transceiver integrated in the single semiconductor chip and the baseband LSI. Further, digital control signals for controlling the internal operation of the radio frequency (RF) signal processing circuit are supplied from the baseband LSI through the digital interface to the radio frequency (RF) signal processing circuit.

On the other hand, the baseband LSI deinterleaves interleaved signals and performs predetermined digital signal processing such as error correction.

The following Patent Document 1 describes a handover for continuing communication by switching cells when user equipment (UE) moves from one cell to another in a mobile communication system comprised of a plurality of cells. When the user equipment (UE) moves to an adjacent cell and a signal from the adjacent cell has become stronger than a signal from an originally-communicating serving cell, a handover to the adjacent cell is performed. Accordingly, the signal power of the adjacent cell is measured prior to the handover. The measurement result that the signal from the adjacent cell has become stronger than the signal from the serving cell is reported from the user equipment (UE) to a base station. Upon receiving this event, the base station determines execution of the handover and executes a handover procedure. Further, Patent Document 1 also describes a handover in the LTE system which is a successor to the W-CDMA and HSDPA systems.

As described above, in the mobile communication system, when the communication situation of one wireless access system in current communication becomes deteriorated, the radio field intensity of another wireless access system is measured to switch to the another wireless access system without delay. To perform this measurement, for such a short time of the order of several milliseconds that is imperceptible to the user, transmission and reception by the wireless access system in current communication are interrupted, and the semiconductor chip incorporating the radio frequency (RF) signal processing circuit is switched to the reception mode of the another wireless access system. In this measurement, it is not necessary to set the transmission mode of the semiconductor chip incorporating the radio frequency (RF) signal processing circuit to the another wireless access system.

The following Patent Document 2 describes the state confirmation of IEEE802.11e which is one system of the wireless LAN during wireless communication by IEEE802.11n which is another system of the wireless LAN.
[Patent Document 1]
International Publication WO2009/057520A1 Specification
[Patent Document 2]
Japanese Unexamined Patent Publication No. 2008-113149
[Patent Document 3]
Japanese Unexamined Patent Publication No. 2010-245673

[Non-Patent Document 1]
H. Yoshida et al, "A Single-Chip 8-Band CMOS Transceiver for W-CDMA(HSPA)/GSM(GPRS)/EDGE with Digital Interface", ESSCIRC (European Solid-State Circuits Conference) 2008, PP. 142-145.

[Non-Patent Document 2]
Daniel Kaczman et al, "A Single-Chip Tri-Band (2100, 1900, 850/800 MHz) WCDMA/HSDPA Cellular Transceiver", IEEE JOURNAL OF SOLID-STATE CIRCUITS, VOL. 41, NO, 5, PP. 1122-1132, May 2005.

[Non-Patent Document 3]
Tirdad Sowlati et al, "Quad-Band GSM/GPRS/EDGE Polar Loop Transmitter", IEEE JOURNAL OF SOLID-STATE CIRCUITS, VOL. 39, NO. 12, PP. 2179-2189, December 2004.

[Non-Patent Document 4]
Toshihiko Shimizu et al, "A Small GSM Power Amplifier Module Using Si-LDMOS Driver MMIC", 2004 IEEE International Solid-State Circuits Conference Digest of Technical Papers, PP. 196-197, Feb. 17, 2004.

SUMMARY

Prior to the present invention, the present inventors et al. have studied the radio frequency (RF) signal processing circuit to/from which digital control signals and reception digital baseband signals are transferred through the digital interface from/to the baseband LSI as described above.

FIG. 11 is a diagram showing the configuration of a receiver studied by the present inventors et al. prior to the invention.

In FIG. 11, reference numeral 10 denotes an antenna, 20 is a front-end module (FEM) including a switch, 1000 is a radio frequency (RF) signal processing semiconductor integrated circuit (RFIC), 30 is a digital interface (DIF), 31 is a digital interface input terminal (DIFin), and 32 is a digital interface output terminal (DIFout).

Further, reference numeral 200 denotes a wireless access system A reception unit (RXA), 210 is a wireless access system B reception unit (RXB), 40 is a control unit, 41R is an on/off control signal (RXA_ON) to the wireless access system A reception unit, and 42R is an on/off control signal (RXB_ON) to the wireless access system B reception unit. Further, reference numeral 46 denotes a switching control signal (FEM_C) to the front-end module (FEM) 20, 100 is a voltage-controlled oscillator (VCO), and 110 is a PLL frequency synthesizer (PLL).

Furthermore, reference numerals A10, B10 denote a low noise amplifier (LNA); A20, A21, B20, B21 are a mixer (MIX); A30, A31, A50, A51, B30, B31, B50, B51 are a variable analog low-pass filter (A-LPF); and A40, A41, B40, B41 are an analog variable gain amplifier (A-PGA). Further, reference numerals A60, A61, B60, B61 denote an analog-digital converter (ADC); A70, A71, B70, B71 are a variable digital low-pass filter (D-LPF); A80, A81, B80, B81 are a digital variable gain amplifier (D-PGA); and A90, B90 are a phase shifter.

In the wireless access system A reception unit (RXA) 200, the low noise amplifier (LNA) A10, the mixers (MIX) A20, A21, and the phase shifter A90 perform quadrature direct down-conversion signal processing. More specifically, by the down-conversion signal processing, an RF reception signal of a wireless access system A received by the antenna 10 is converted into a reception analog baseband signal I having an in-phase component and a reception analog baseband signal Q having a quadrature component. The variable analog low-pass filters (A-LPF) A30, A31, A50, A51 function as channel selection filters which suppress an interference signal component outside a desired signal band contained in the reception analog baseband signals I, Q. After that, the reception analog baseband signals I, Q are converted by the analog-digital converters (ADC) A60, A61 into reception digital baseband signals I, Q, which are supplied to the input terminals of the variable digital low-pass filters (D-LPF) A70, A71. Then, the reception digital baseband signals I, Q outputted from the output terminals of the variable digital low-pass filters (D-LPF) A70, A71 are supplied to the input terminals of the digital variable gain amplifiers (D-PGA) A80, A81 configured with digital multipliers. The reception digital baseband signals I, Q outputted from the output terminals of the digital variable gain amplifiers (D-PGA) A80, A81 are supplied to a baseband LSI through the digital interface (DIF) 30.

In the wireless access system B reception unit (RXB) 210, the low noise amplifier (LNA) B10, the mixers (MIX) B20, B21, and the phase shifter B90 perform quadrature direct down-conversion signal processing. More specifically, by the down-conversion signal processing, an RF reception signal of a wireless access system B received by the antenna 10 is converted into a reception analog baseband signal I having an in-phase component and a reception analog baseband signal Q having a quadrature component. The variable analog low-pass filters (A-LPF) B30, B31, 350, B51 function as channel selection filters which suppress an interference signal component outside a desired signal band contained in the reception analog baseband signals I, Q. After that, the reception analog baseband signals I, Q are converted by the analog-digital converters (ADC) B60, B61 into reception digital baseband signals I, Q, which are supplied to the input terminals of the variable digital low-pass filters (D-LPF) B70, B71. Then, the reception digital baseband signals I, Q outputted from the output terminals of the variable digital low-pass filters (D-LPF) B70, B71 are supplied to the input terminals of the digital variable gain amplifiers (D-PGA) B80, B81 configured with digital multipliers. The reception digital baseband signals I, Q outputted from the output terminals of the digital variable gain amplifiers (D-PGA) B80, B81 are supplied to the baseband LSI through the digital interface (DIF) 30.

The RF signal processing semiconductor integrated circuit (RFIC) 1000 includes the two reception units. That is, the wireless access system A reception unit (RXA) 200 is a reception block unit for receiving the wireless access system A, and the wireless access system B reception unit (RXB) 210 is a reception block unit for receiving the wireless access system B.

The internal operation of the RF signal processing semiconductor integrated circuit (RFIC) 1000 is controlled from the baseband LSI (not shown) through the digital interface (DIF) 30. The digital interface input terminal (DIFin) 31 and the digital interface output terminal (DIFout) 32 transfer digital signals, and output signals from the digital variable gain amplifiers (D-PGA) A80, A81, B80, B81 are digital parallel signals. Therefore, if the digital interface (DIF) 30 is a serial interface, the digital interface (DIF) 30 includes the function of converting digital parallel signals from the digital variable gain amplifiers (D-PGA) A80, A81, B80, B81 into serial signals. That is, if the digital interface (DIF) 30 is a serial interface, the number of external terminals of the RF signal processing semiconductor integrated circuit (RFIC) 1000 can be reduced in comparison with a parallel interface performing output processing of digital data having the same number of bits. Therefore, by configuring the digital interface (DIF) 30 with the serial interface, it is possible to reduce the size of a package containing the RF signal processing semiconductor integrated circuit (RFIC) 1000.

Through the digital interface input terminal (DIFin) 31, digital control signals to the RF signal processing semiconductor integrated circuit (RFIC) 1000 and the front-end module (FEM) 20 and a transmission digital baseband signal etc. to the RF signal processing semiconductor integrated circuit (RFIC) 1000 are transferred from the baseband LSI (not shown).

Through the digital interface output terminal (DIFout) 32, reception digital baseband signals from the RF signal processing semiconductor integrated circuit (RFIC) 1000 and the operating states etc. of the RF signal processing semiconductor integrated circuit (RFIC) 1000 and the front-end module (FEM) 20 are transferred to the baseband LSI (not shown).

As for the wireless access systems A, B; for example, in the case of a mobile communication terminal, the LTE system is used as the wireless access system A, and the GSM system is used as the wireless access system B. Thus, mutually different wireless access systems are used. The communication systems used as the wireless access systems A, B can be set by an operation mode designation signal supplied to the RF signal processing semiconductor integrated circuit (RFIC) 1000 through the digital interface (DIF) 30.

Hereinafter, description will be made of the operation of the RF signal processing semiconductor integrated circuit (RFIC) 1000 as the receiver studied by the present inventors et al. prior to the invention shown in FIG. 11.

A radio frequency (RF) reception signal received by the antenna 10 is supplied to the front-end module (FEM) 20.

The front-end module (FEM) 20 includes an antenna switch and a filter. The antenna switch included in the front-end module (FEM) 20 is, for example, controlled to couple with the wireless access system A reception unit (RXA) 200 and decouple with the wireless access system B reception unit (RXB) 210. The filter included in the front-end module (FEM) 20 passes, with as little loss as possible, the desired signal band of the wireless access system A in the radio frequency (RF) reception signal received from the antenna 10, and suppresses an interference signal component outside the desired signal band. Consequently, the RF reception signal as the output signal of the front-end module (FEM) 20 is supplied to the low noise amplifier (LNA) A10.

The low noise amplifier (LNA) A10 amplifies the RF reception signal by a desired gain with as little noise as possible. The RF reception amplification signal outputted from the low noise amplifier (LNA) A10 is supplied to the mixers (MIX) A20, A21.

The PLL frequency synthesizer (PLL) 110 locks the frequency of the oscillation output signal of the voltage-controlled oscillator (VCO) 100 to a desired frequency by comparing the oscillation output signal of the voltage-controlled oscillator (VCO) 100 with a reference clock signal (not shown) based on operation setting information supplied from the control unit 40. Thus, the voltage-controlled oscillator (VCO) 100 generates the oscillation output signal of the desired frequency.

In response to the oscillation output signal supplied from the voltage-controlled oscillator (VCO) 100, the phase shifter A90 generates two local signals having a phase difference of 90 degrees and supplies the two local signals to the mixers (MIX) A20, A21. For example, if the wireless access system A reception unit (RXA) 200 is a direct conversion receiver, the frequency of the local signals supplied to the mixers (MIX) A20, A21 is equal to the center frequency of the RF reception signal of a desired channel supplied from the antenna 10. The oscillation signal of the voltage-controlled oscillator (VCO) 100 and the two local signals having a phase difference of 90 degrees generated from the phase shifter A90 do not necessarily have the same frequency. For example, the frequency of the oscillation output signal of the voltage-controlled oscillator (VCO) 100 is set to two times the frequency of the local signals. In this case, the phase shifter A90 has not only the function of the 90-degree phase shift between the local signals but also the function of dividing by two the frequency of the oscillation output signal of the voltage-controlled oscillator (VCO) 100.

The output signals of the mixers (MIX) A20, A21 are supplied to the variable analog low-pass filters (A-LPF) A30, A31. The variable analog low-pass filters (A-LPF) A30, A31, A50, A51 pass the desired channel signal band with as little loss as possible, and suppress the interference signal component outside the desired signal band.

The output signals of the variable analog low-pass filters (A-LPF) A30, A31 are supplied to the analog variable gain amplifiers (A-PGA) A40, A41. The analog variable gain amplifiers (A-PGA) A40, A41 are set to a desired gain based on setting information supplied from the control unit 40. The output signals of the analog variable gain amplifiers (A-PGA) A40, A41 are supplied to the variable analog low-pass filters (A-LPF) A50, A51. Further, the reception analog baseband signals which are the output signals of the variable analog low-pass filters (A-LPF) A50, A51 are supplied to the analog-digital converters (ADC) A60, A61, and the reception digital baseband signals are outputted from the output terminals of the analog-digital converters (ADC) A60, A61.

In response to the reception digital baseband signals from the output terminals of the analog-digital converters (ADC) A60, A61, the variable digital low-pass filters (D-LPF) A70, A71 output the desired channel signal band with as little loss as possible, and suppress undesired signals other than the desired channel signals. The reception digital baseband signals of the output terminals of the variable digital low-pass filters (D-LPF) A70, A71 are supplied to the digital variable gain amplifiers (D-PGA) A80, A81.

The digital variable gain amplifiers (D-PGA) A80, A81 configured with digital multipliers are set to a desired digital gain based on setting information supplied from the control unit 40. The reception digital baseband signals of the output terminals of the digital variable gain amplifiers (D-PGA) A80, A81 are transferred from the digital interface output terminal (DIFout) 32 to the baseband LSI (not shown) by the digital interface (DIF) 30.

Assume that the digital interface (DIF) 30 receives a reception stop signal of the wireless access system A and a reception start signal of the wireless access system B at the digital interface input terminal (DIFin) 31 in this state. In general, prior to the reception start signal of the wireless access system B, the reception stop signal of the wireless access system A reaches the RF signal processing semiconductor integrated circuit (RFIC) 1000. However, the reception start signal of the wireless access system B may arrive prior to the reception stop signal of the wireless access system A. Alternatively, it is possible to determine that the reception stop signal of the wireless access system A has been received by exclusively processing the reception start signal of the wireless access system B.

For reception stop processing of the wireless access system A, first the switch included in the front-end module (FEM) 20 decouples the wireless access system A reception unit (RXA) 200 based on the switching control signal 46 from the control unit 40. This stops the supply of the RF reception signal of the wireless access system A received by the antenna 10 to the wireless access system A reception unit (RXA) 200 through the switch included in the front-end module (FEM) 20.

Therefore, concerning all reception signals of the wireless access system A existing in the wireless access system A reception unit (RXA) 200, the digital interface (DIF) 30 completes output processing of the reception digital baseband signals from the digital interface output terminal (DIFout) 32. Then, the on/off control signal (RXA_ON) 41R from the control unit 40 turns off the wireless access system A reception unit (RXA) 200. After the wireless access system A reception unit (RXA) 200 is thus turned off, the on/off control signal (RXB_ON) 42R from the control unit 40 turns on the wireless access system B reception unit (RXB) 210. At approximately the same time, the PLL frequency synthesizer (PLL) 110 starts a lock operation so as to match the frequency of the oscillation output signal of the voltage-controlled oscillator (VCO) 100 to a desired frequency of the wireless access system B by comparing the oscillation output signal of the voltage-controlled oscillator (VCO) 100 with the reference clock signal (not shown) based on the on/off control signal (RXB_ON) 42R outputted from the control unit 40. While the PLL frequency synthesizer (PLL) 110 and the voltage-controlled oscillator (VCO) 100 perform the lock operation, the wireless access system B reception unit (RXB) 210 cancels the DC offset voltage of the internal circuit and calibrates the filter characteristics of the variable analog low-pass filters (A-LPF) B30, B31, B50, B51. Thus, the wireless access system B reception unit (RXB) 210 completes canceling the DC offset voltage and calibrating the filter characteristics, thereby finishing all preparations for reception start processing of the wireless access system B. After that, the switch included in the front-end module (FEM) 20 couples the wireless access system B reception unit (RXB) 210 based on the switching control signal 46 from the control unit 40.

A radio frequency (RF) reception signal received by the antenna 10 is supplied to the front-end module (FEM) 20.

The antenna switch included in the front-end module (FEM) 20 is controlled to decouple with the wireless access system A reception unit (RXA) 200 and couple with the wireless access system B reception unit (RXB) 210. The filter included in the front-end module (FEM) 20 passes, with as little loss as possible, the desired signal band of the wireless access system B in the radio frequency (RF) reception signal received from the antenna 10, and suppresses an interference signal component outside the desired signal band. Consequently, the RF reception signal as the output signal of the front-end module (FEM) 20 is supplied to the low noise amplifier (LNA) B10.

The low noise amplifier (LNA) B10 amplifies the RF reception signal by a desired gain with as little noise as possible. The RF reception amplification signal outputted from the low noise amplifier (LNA) B10 is supplied to the mixers (MIX) B20, B21.

The PLL frequency synthesizer (PLL) 110 locks the frequency of the oscillation output signal of the voltage-controlled oscillator (VCO) 100 to a desired frequency by comparing the oscillation output signal of the voltage-controlled oscillator (VCO) 100 with the reference clock signal (not shown) based on operation setting information supplied from the control unit 40. Thus, the voltage-controlled oscillator (VCO) 100 generates the oscillation output signal of the desired frequency.

In response to the oscillation output signal supplied from the voltage-controlled oscillator (VCO) 100, the phase shifter B90 generates two local signals having a phase difference of 90 degrees and supplies the two local signals to the mixers (MIX) B20, B21. For example, if the wireless access system B reception unit (RXB) 210 is a direct conversion receiver, the frequency of the local signals supplied to the mixers (MIX) B20, B21 is equal to the center frequency of the RF reception signal of a desired channel supplied from the antenna 10. The oscillation signal of the voltage-controlled oscillator (VCO) 100 and the two local signals having a phase difference of 90 degrees generated from the phase shifter B90 do not necessarily have the same frequency. For example, the frequency of the oscillation output signal of the voltage-controlled oscillator (VCO) 100 is set to two times the frequency of the local signals. In this case, the phase shifter B90 has not only the function of the 90-degree phase shift between the local signals but also the function of dividing by two the frequency of the oscillation output signal of the voltage-controlled oscillator (VCO) 100.

The output signals of the mixers (MIX) B20, B21 are supplied to the variable analog low-pass filters (A-LPF) B30, B31. The variable analog low-pass filters (A-LPF) B30, B31, B50, B51 pass the desired channel signal band with as little loss as possible, and suppress the interference signal component outside the desired signal band.

The output signals of the variable analog low-pass filters (A-LPF) B30, B31 are supplied to the analog variable gain amplifiers (A-PGA) B40, B41. The analog variable gain amplifiers (A-PGA) B40, B41 are set to a desired gain based on setting information supplied from the control unit 40. The output signals of the analog variable gain amplifiers (A-PGA) B40, B41 are supplied to the variable analog low-pass filters (A-LPF) B50, B51. Further, the reception analog baseband signals which are the output signals of the variable analog low-pass filters (A-LPF) B50, B51 are supplied to the analog-digital converters (ADC) B60, B61, and the reception digital baseband signals are outputted from the output terminals of the analog-digital converters (ADC) B60, B61.

In response to the reception digital baseband signals from the output terminals of the analog-digital converters (ADC) B60, B61, the variable digital low-pass filters (D-LPF) B70, B71 output the desired channel signal band with as little loss as possible, and suppress undesired signals other than the desired channel signals. The reception digital baseband signals of the output terminals of the variable digital low-pass filters (D-LPF) B70, B71 are supplied to the digital variable gain amplifiers (D-PGA) B80, B81.

The digital variable gain amplifiers (D-PGA) B80, B81 configured with digital multipliers are set to a desired digital gain based on setting information supplied from the control unit 40. The reception digital baseband signals of the output terminals of the digital variable gain amplifiers (D-PGA) B80, B81 are transferred from the digital interface output terminal (DIFout) 32 to the baseband LSI (not shown) by the digital interface (DIF) 30.

FIG. 12 is a flowchart for explaining the operation of the RF signal processing semiconductor integrated circuit (RFIC) 1000 as the receiver studied by the present inventors et al. prior to the invention shown in FIG. 11.

More specifically, FIG. 12 shows the operation for switching from a reception operation mode in which the wireless access system A reception unit (RXA) 200 receives the wireless access system A to a reception operation mode in which the wireless access system B reception unit (RXB) 210 receives the wireless access system B in the receiver shown in FIG. 11.

In step S1200 of FIG. 12, the wireless access system A reception unit (RXA) 200 is receiving the wireless access system A.

In step S1201 of FIG. 12, the digital interface (DIF) 30 waits for a command to be supplied to the digital interface input terminal (DIFin) 31 from the baseband LSI (not shown).

In step S1202 of FIG. 12, the wireless access system A reception unit (RXA) 200 receives a reception stop command of the wireless access system A from the baseband LSI (not shown) through the digital interface (DIF) 30.

Then, in step S1203 of FIG. 12, concerning all reception signals of the wireless access system A existing in the wireless access system A reception unit (RXA) 200, the wireless access system A reception unit (RXA) 200 completes output processing (sending) of the reception digital baseband signals from the digital interface output terminal (DIFout) 32 of the digital interface (DIF) 30 to the baseband LSI.

Upon completion of sending the reception digital baseband signals, in step S1204 of FIG. 12 the wireless access system A reception unit (RXA) 200 is turned off In step S1205 of FIG. 12, assume that the wireless access system B reception unit (RXB) 210 receives a reception start command of the wireless access system B through the digital interface (DIF) 30. In this case, after completion of turning off the wireless access system A reception unit (RXA) 200 in step S1206 of FIG. 12, the wireless access system B reception unit (RXB) 210 is turned on in step S1207 of FIG. 12. The timing of completion of turning off the wireless access system A reception unit (RXA) 200 in step S1206 of FIG. 12 matches the timing of completion of turning off the wireless access system A reception unit (RXA) 200 in step S1204 of FIG. 12.

In step S1207 of FIG. 12, when the wireless access system B reception unit (RXB) 210 is turned on, the PLL frequency synthesizer (PLL) 110 starts a lock operation based on the on/off control signal (RXB_ON) 42R from the control unit 40. That is, the PLL frequency synthesizer (PLL) 110 starts the lock operation so as to match the frequency of the oscillation output signal of the voltage-controlled oscillator (VCO) 100 to the desired frequency of the wireless access system B by comparing the oscillation output signal of the voltage-controlled oscillator (VCO) 100 with the reference clock signal (not shown). While the PLL frequency synthesizer (PLL) 110 and the voltage-controlled oscillator (VCO) 100 perform the lock operation, the wireless access system B reception unit (RXB) 210 cancels the DC offset voltage of the internal circuit and calibrates the filter characteristics of the variable analog low-pass filters (A-LPF) B30, B31, B50, B51.

When the digital interface (DIF) 30 receives a power-off command of the RF signal processing semiconductor integrated circuit (RFIC) 1000 in step S1208 of FIG. 12, the wireless access system A reception unit (RXA) 200 and the wireless access system B reception unit (RXB) 210 are turned off in step S1209 of FIG. 12.

As described above, at the time of switching between wireless access systems by the switching operation shown in FIG. 12, the receiver studied by the present inventors et al. prior to the invention shown in FIG. 11 completes the output processing (sending) of all reception digital baseband signals concerning all reception signals existing in the reception unit of a currently-accessed wireless access system, and then moves to preparation to receive a wireless access system to be accessed next.

However, the study made by the present inventors et al. prior to the present invention has revealed that the receiver shown in FIG. 11 for performing the switching operation shown in FIG. 12 has the following problem.

That is, in the RF signal processing semiconductor integrated circuit (RFIC) 1000 of the receiver shown in FIG. 11, the reception analog baseband signals are converted into the reception digital baseband signals by the analog-digital converters (ADC) A60, A61, B60, B61. The reception digital baseband signals are supplied to the variable digital low-pass filters (D-LPF) A70, A71, B70, B71 which suppress undesired signal components in the digital signals. However, the signal delay time of digital filters configuring the variable digital low-pass filters (D-LPF) A70, A71, B70, B71 is larger than the signal delay time of the variable analog low-pass filters (A-LPF) A30, A31, A50, A51, B30, B31, B50, B51, due to the following reason.

In the digital interface (DIF) 30 of the RF signal processing semiconductor integrated circuit (RFIC) 1000 shown in FIG. 11, the sampling rate of the analog-digital converters (ADC) A60, A61 . . . and the sampling rate of the digital interface output terminal (DIFout) 32 are defined to predetermined values by a digital interface standard. That is, the sampling rate of the analog-digital converters (ADC) A60, A61 . . . is higher than the sampling rate of the digital interface output terminal (DIFout) 32.

Thus, the variable digital low-pass filters (D-LPF) A70, A71 . . . do not only suppress undesired signals other than the desired channel signals, but also function as asynchronous sampling rate converters (ASRC) for converting the high sampling rate of the analog-digital converters (ADC) A60, A61 . . . into the low sampling rate of the digital interface output terminal (DIFout) 32. The variable digital low-pass filters (D-LPF) A70, A71 . . . are configured with FIR digital filters. ASRC is an abbreviation for "Asynchronous Sampling Rate Converter", and FIR is an abbreviation for "Finite Impulse Response".

FIG. 13 is a diagram showing the configuration of one FIR digital filter 1300 configuring the variable digital low-pass filters (D-LPF) A70, A71, B70, B71 in the RF signal processing semiconductor integrated circuit (RFIC) 1000 as the receiver studied by the present inventors et al. prior to the invention shown in FIG. 11.

As shown in FIG. 13, the FIR digital filter 1300 configuring the variable digital low-pass filters (D-LPF) A70, A71, B70, B71 includes four delay circuits 1311, 1312, 1313, 1314, five digital multipliers 1320, 1321, 1322, 1323, 1324, and an adder 1340.

A digital input signal Data_In is supplied to the input terminal of the first delay circuit 1311 and the input terminal of the first digital multiplier 1320, and the output terminal of the first delay circuit 1311 is coupled to the input terminal of the second delay circuit 1312 and the input terminal of the second digital multiplier 1321. The output terminal of the second delay circuit 1312 is coupled to the input terminal of the third delay circuit 1313 and the input terminal of the third digital multiplier 1322, and the output terminal of the third delay circuit 1313 is coupled to the input terminal of the fourth delay circuit 1314 and the input terminal of the fourth digital multiplier 1323. A digital output signal Data_Out is outputted from the output terminal of the fourth delay circuit 1314, and the output terminal of the fourth delay circuit 1314 is coupled to the input terminal of the fifth digital multiplier 1324.

A first filter coefficient A0 is supplied to the other input terminal of the first digital multiplier 1320, a second filter coefficient A1 is supplied to the other input terminal of the second digital multiplier 1321, and a third filter coefficient A2 is supplied to the other input terminal of the third digital multiplier 1322. A fourth filter coefficient A3 is supplied to the other input terminal of the fourth digital multiplier 1323, and a fifth filter coefficient A4 is supplied to the other input terminal of the fifth digital multiplier 1324. Five output signals 1330, 1331, 1332, 1333, 1334 of the five digital multipliers 1320, 1321, 1322, 1323, 1324 are supplied to the five input terminals of the adder 1340, respectively. Accordingly, output data 1350 is outputted from the output terminal of the adder 1340.

FIG. 14 is a diagram for explaining the operation of the FIR digital filter 1300 configuring the variable digital low-pass filters (D-LPF) A70, A71, B70, B71 shown in FIG. 13.

As shown in FIG. 14, the output signal 1331 of the second digital multiplier 1321 is delayed by one unit delay time in comparison with the digital input signal Data_In and the output signal 1330 of the first digital multiplier 1320. The output signal 1332 of the third digital multiplier 1322 is delayed by one unit delay time in comparison with the output signal 1331 of the second digital multiplier 1321. The output signal 1333 of the fourth digital multiplier 1323 is delayed by one unit delay time in comparison with the output signal 1332 of the third digital multiplier 1322. Further, the output signal 1334 of the fifth digital multiplier 1324 is delayed by one unit delay time in comparison with the output signal 1333 of the fourth digital multiplier 1323.

As described above, the FIR digital filter 1300 shown in FIG. 13 is configured with the four delay circuits 1311, 1312, 1313, 1314. Further, the variable digital low-pass filters (D-LPF) A70, A71, B70, B71 in the RF signal processing semiconductor integrated circuit (RFIC) 1000 shown in FIG. 11 are each configured with 100 FIR digital filters. Therefore, the variable digital low-pass filters (D-LPF) A70, A71, B70, B71 each include 400 delay circuits.

Thus, since the variable digital low-pass filters (D-LPF) A70, A71, B70, B71 each include an extremely large number of stages of delay circuits, the signal delay time of the variable digital low-pass filters (D-LPF) A70, A71, B70, B71 is larger than the signal delay time of the variable analog low-pass filters (A-LPF) A30, A31, A50, A51, B30, B31, B50, B51.

Therefore, in the receiver studied by the present inventors et al. prior to the invention shown in FIG. 11, to switch the reception operation from the wireless access system A to the wireless access system B as shown by the switching operation in FIG. 12, it is necessary to complete the output processing (sending) of all reception digital baseband signals concerning all reception signals existing in a large number of stages of delay circuits in the variable digital low-pass filters (D-LPF) A70, A71.

As a result, the signal delay time of the 400 delay circuits in each of the variable digital low-pass filters (D-LPF) A70, A71, B70, B71 is, for example, several tens of microseconds in the GSM system and the W-CDMA system. Particularly in the GSM system, the frequency band of reception baseband signals is lower than that of the W-CDMA system, which leads to a lower cutoff frequency of the variable digital low-pass filters (D-LPF) A70, A71, B70, B71, thereby elongating the signal delay time, which makes it difficult to reduce the time of reception operation switching between multiple wireless systems.

On the other hand, in the reception operation switching between multiple wireless systems, the voltage-controlled oscillator (VCO) and the PLL frequency synthesizer need to complete a lock operation (pull-in operation) into a desired reception frequency before the reception of a wireless access system to be accessed next. It takes a long time to complete the lock operation (pull-in operation), and Non-patent Document 2 describes that the lock time is 150.mu.s.

As described above, prior to the invention, it takes a long time to switch the reception operation between multiple wireless systems. Consequently, it also takes a long time to switch the reception operation to measure the signal power of an adjacent cell prior to a handover between adjacent cells in a mobile communication system.

The present invention has been made as a result of the above-described study made by the present inventors et al. prior to the present invention.

It is therefore an object of the present invention to reduce the time of reception operation switching between multiple wireless systems.

It is another object of the invention to reduce the time of switching the reception operation to measure the signal power of an adjacent cell prior to a handover between adjacent cells in a mobile communication system.

The above and other objects and novel features of the present invention will become apparent from the description of this specification and the accompanying drawings.

A typical aspect of the invention disclosed in the present application will be briefly described as follows.

A semiconductor integrated circuit (1000) according to a typical embodiment of the invention includes a first wireless access system reception unit (200) including a first analog reception unit (202) and a first digital reception unit (203), a voltage-controlled oscillator (100), a phase locked loop (110), and a digital interface (30).

The first analog reception unit (202) includes a first reception mixer (A20, A21) for down-converting an RF reception signal into a first analog reception signal and a first analog-digital converter (A60, A61) for converting the first analog reception signal into a first digital reception signal.

The first digital reception unit (203) includes a first digital filter (A70, A71) having an input terminal to which the first digital reception signal is supplied.

A first digital filter reception output signal outputted from an output terminal of the first digital filter (A70, A71) in the first digital reception unit (203) can be outputted to an outside of the semiconductor integrated circuit (1000) through the digital interface (30).

The voltage-controlled oscillator (100) generates an oscillation output signal as a base for a first reception local signal supplied to the first reception mixer (A20, A21), and the phase locked loop (110) locks a frequency of the oscillation output signal generated from the voltage-controlled oscillator (100) to a desired frequency (see FIG. 1).

The first wireless access system reception unit (200), the voltage-controlled oscillator (100), and the phase locked loop (110) enable switching from a reception operation for a first RF reception signal of a first system (A0) to a reception operation for a second RF reception signal of a second system (A1).

In the switching, as for the reception operation for the first RF reception signal of the first system (A0), an end transition operation (403) of the first digital reception unit (203) is performed subsequent to an end transition operation (402) of the first analog reception unit (202).

In the switching, for the reception operation for the second RF reception signal of the second system (A1), a start transition operation (406) of the first analog reception unit (202) and a start transition operation (408) of the first digital reception unit (203) are performed.

In a period of the end transition operation (403) of the first digital reception unit (203) in the switching, the phase locked loop (110) starts a lock operation so as to match a frequency of the oscillation output signal generated from the voltage-controlled oscillator (100) to a desired frequency of the second system (A1) (see FIG. 4).

An effect obtained by the typical aspect of the invention disclosed in the present application will be briefly described as follows.

According to the invention, it is possible to reduce the time of reception operation switching between multiple wireless systems.

BRIEF DESCRIPTION OF THE DRAWINGS

FIG. 13 is a diagram showing the configuration of one FIR digital filter 1300 configuring variable digital low-pass filters (D-LPF) A70, A71, B70, B71 in the RF signal processing semiconductor integrated circuit (RFIC) 1000 as the receiver according to the first embodiment of the invention shown in FIG. 1 and the receiver studied by the present inventors et al. prior to the invention shown in FIG. 11.

FIG. 14 is a diagram for explaining the operation of the FIR digital filter 1300 configuring the variable digital low-pass filters (D-LPF) A70, A71, B70, B71 shown in FIG. 13.

DETAILED DESCRIPTION

1. Outline of Embodiments

Figure 1:
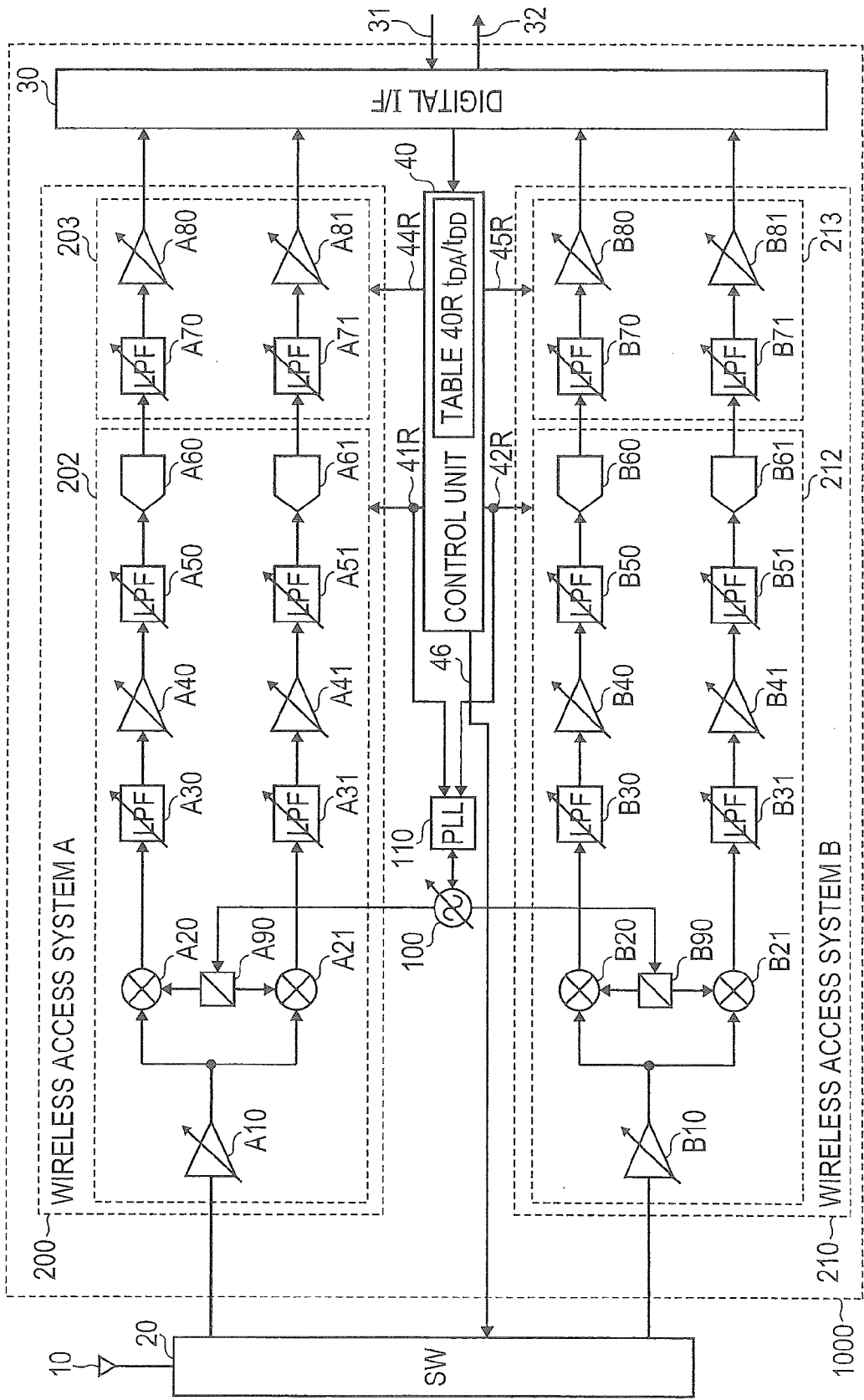
FIG. 1 is a diagram showing the configuration of a receiver according to a first embodiment of the present invention.

First, exemplary embodiments of the invention disclosed in the present application will be outlined. Reference numerals in the drawings that refer to with parentheses applied thereto in the outline description of the exemplary embodiments are merely illustration of ones contained in the concepts of components marked with the reference numerals.

[1] A semiconductor integrated circuit (1000) according to an exemplary embodiment of the invention includes a first wireless access system reception unit (200) including a first analog reception unit (202) and a first digital reception unit (203), a voltage-controlled oscillator (100), a phase locked loop (110), and a digital interface (30).

The first analog reception unit (202) includes a first reception mixer (A20, A21) for down-converting an RF reception signal into a first analog reception signal and a first analog-digital converter (A60, A61) for converting the first analog reception signal into a first digital reception signal.

The first digital reception unit (203) includes a first digital filter (A70, A71) having an input terminal to which the first digital reception signal is supplied.

A first digital filter reception output signal outputted from an output terminal of the first digital filter (A70, A71) in the first digital reception unit (203) can be outputted to an outside of the semiconductor integrated circuit (1000) through the digital interface (30).

The voltage-controlled oscillator (100) generates an oscillation output signal as a base for a first reception local signal supplied to the first reception mixer (A20, A21), and the phase locked loop (110) locks a frequency of the oscillation output signal generated from the voltage-controlled oscillator (100) to a desired frequency (see FIG. 1).

The first wireless access system reception unit (200), the voltage-controlled oscillator (100), and the phase locked loop (110) enable switching from a reception operation for a first RF reception signal of a first system (A0) to a reception operation for a second RF reception signal of a second system (A1).

In the switching, as for the reception operation for the first RF reception signal of the first system (A0), an end transition operation (403) of the first digital reception unit (203) is performed subsequent to an end transition operation (402) of the first analog reception unit (202).

In the switching, for the reception operation for the second RF reception signal of the second system (A1), a start transition operation (406) of the first analog reception unit (202) and a start transition operation (408) of the first digital reception unit (203) are performed.

Figure 4:
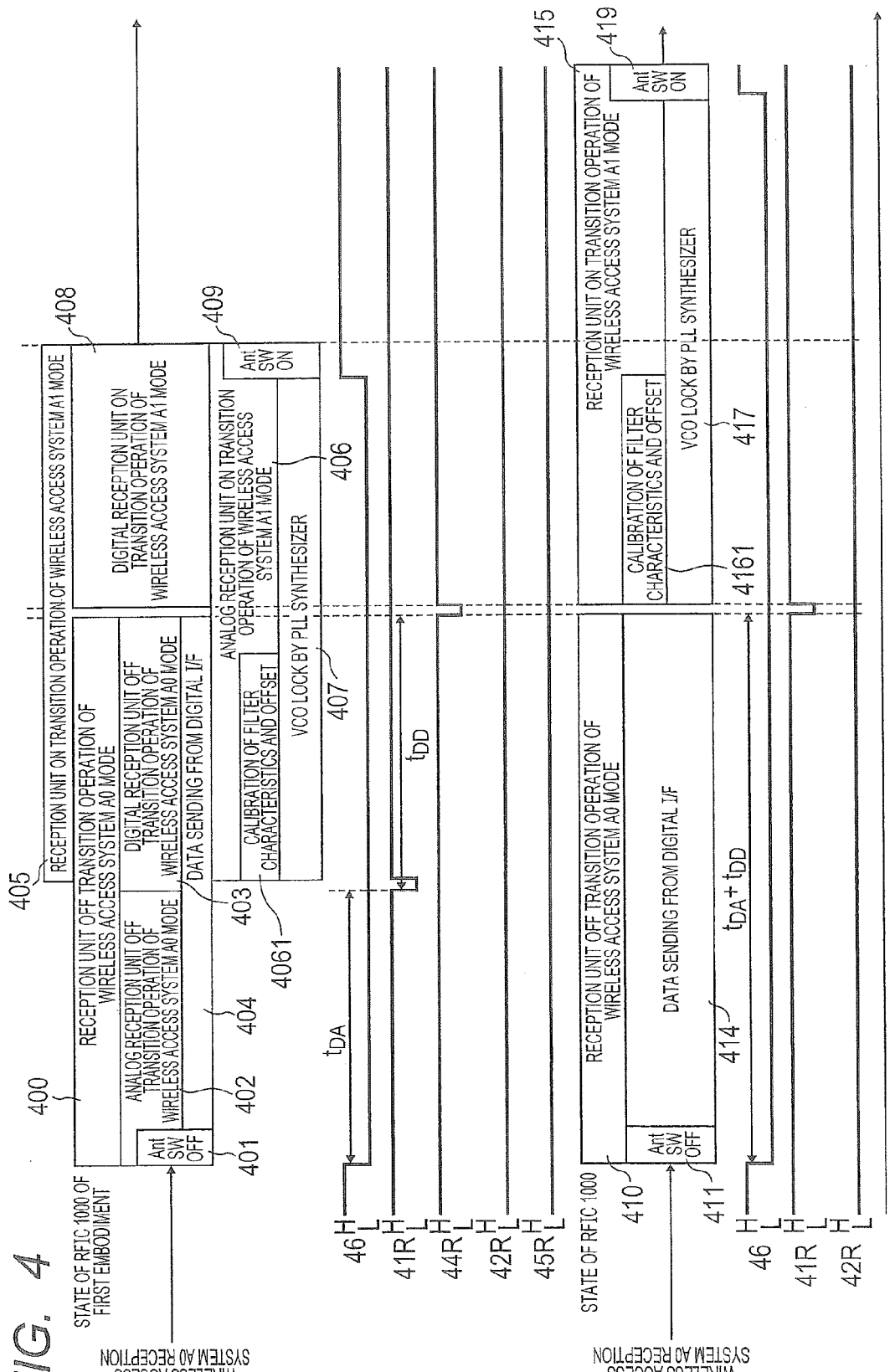
FIG. 4 is a diagram showing the time course of the operation for switching from the reception mode of a wireless access system A0 to the reception mode of a wireless access system A1 by the RF signal processing semiconductor integrated circuit according to the first embodiment of the invention shown in FIG. 1 and the time course of the operation for switching the reception operation of the RF signal processing semiconductor integrated circuit studied by the present inventors et al. prior to the invention shown in FIG. 11.

In a period of the end transition operation (403) of the first digital reception unit (203) in the switching, the phase locked loop (110) starts a lock operation so as to match a frequency of the oscillation output signal generated from the voltage-controlled oscillator (100) to a desired frequency of the second system (A1) (see FIG. 4).

According to this embodiment, it is possible to reduce the time of reception operation switching between multiple wireless systems.

The semiconductor integrated circuit (1000) according to a preferred embodiment further includes a second wireless access system reception unit (210) including a second analog reception unit (212) and a second digital reception unit (213).

The second analog reception unit (212) includes a second reception mixer (B20, B21) for down-converting an RF reception signal into a second analog reception signal and a second analog-digital converter (B60, B61) for converting the second analog reception signal into a second digital reception signal.

The second digital reception unit (213) includes a second digital filter (B70, B71) having an input terminal to which the second digital reception signal is supplied.

A second digital filter reception output signal outputted from an output terminal of the second digital filter (B70, B71) in the second digital reception unit (213) can be outputted to the outside of the semiconductor integrated circuit (1000) through the digital interface (30).

The voltage-controlled oscillator (100) generates an oscillation output signal as a base for the first reception local signal supplied to the first reception mixer (A20, A21), and the phase locked loop (110) locks a frequency of the oscillation output signal generated from the voltage-controlled oscillator (100) to a desired frequency of the first system (A).

The voltage-controlled oscillator (100) generates an oscillation output signal as a base for a second reception local signal supplied to the second reception mixer (B20, B21), and the phase locked loop (110) locks a frequency of the oscillation output signal generated from the voltage-controlled oscillator (100) to a desired frequency of the second system (B).

The first wireless access system reception unit (200), the voltage-controlled oscillator (100), and the phase locked loop (110) can perform the reception operation for the first RF reception signal of the first system (A).

The second wireless access system reception unit (210), the voltage-controlled oscillator (100), and the phase locked loop (110) can perform the reception operation for the second RF reception signal of the second system (B).

The first wireless access system reception unit (200), the second wireless access system reception unit (210), the voltage-controlled oscillator (100), and the phase locked loop (110) enable switching from the reception operation for the first RF reception signal of the first system (A) to the reception operation for the second RF reception signal of the second system (B).

In the switching, as for the reception operation for the first RF reception signal of the first system (A), the end transition operation (303) of the first digital reception unit (203) is performed subsequent to the end transition operation (302) of the first analog reception unit (202).

In the switching, for the reception operation for the second RF reception signal of the second system (B), a start transition operation (306) of the second analog reception unit (212) and a start transition operation (308) of the second digital reception unit (213) are performed.

Figure 3:
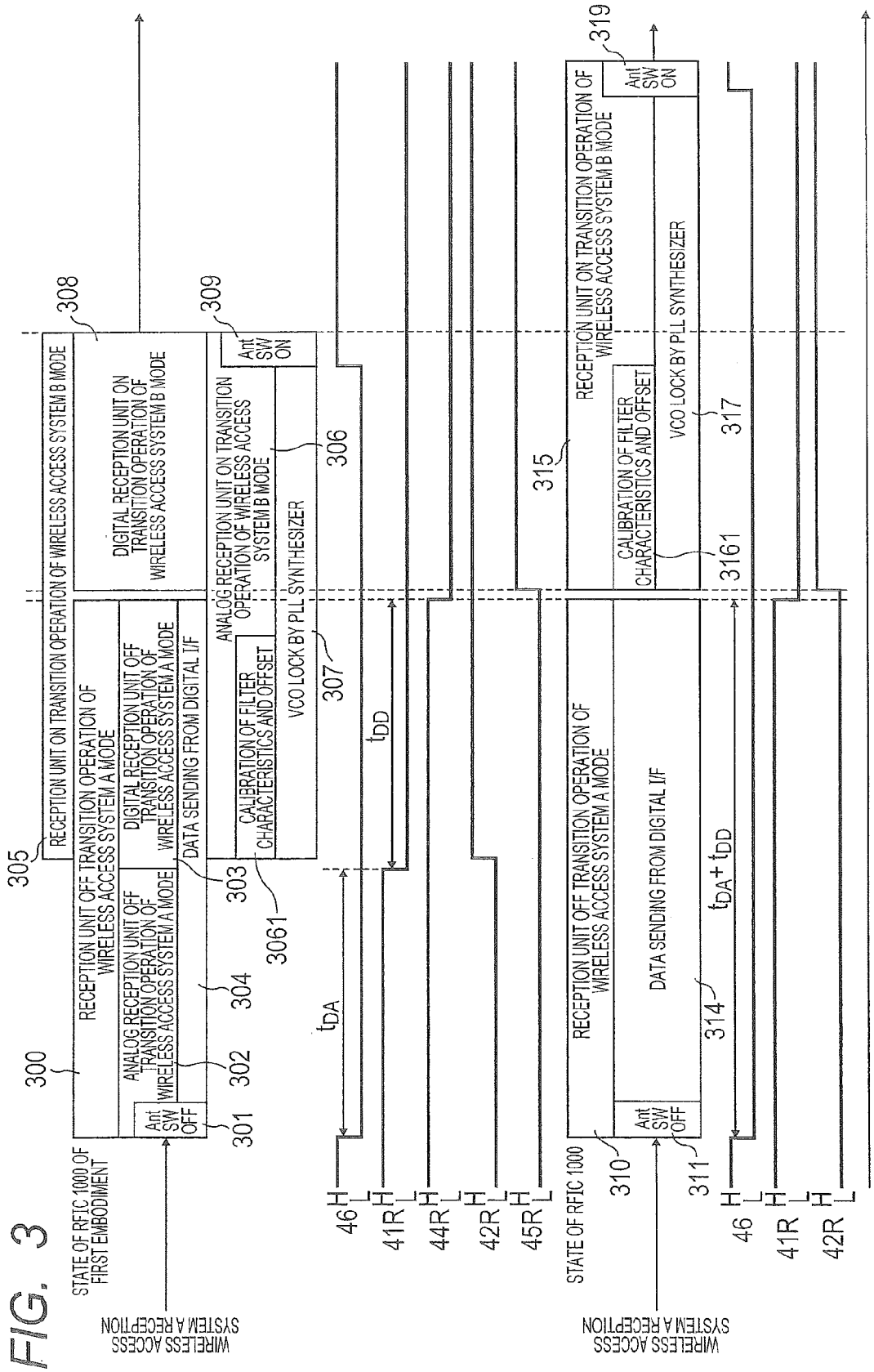
FIG. 3 is a diagram showing the time course of the operation for switching the reception operation of the RF signal processing semiconductor integrated circuit of the receiver according to the first embodiment of the invention shown in FIG. 1 and the time course of the operation for switching the reception operation of an RF signal processing semiconductor integrated circuit of a receiver studied by the present inventors et al. prior to the invention shown in FIG. 11.

In a period of the end transition operation (303) of the first digital reception unit (203) in the switching, the phase locked loop (110) starts a lock operation so as to match the frequency of the oscillation output signal generated from the voltage-controlled oscillator (100) to the desired frequency of the second system (B) (see FIG. 3).

In another preferred embodiment, the first digital filter (A70, A71) and the second digital filter (B70, B71) are each configured with multiple FIR filters (see FIG. 13).

The semiconductor integrated circuit (1000) according to yet another preferred embodiment further includes a first wireless access system transmission unit (220) including a first digital transmission unit (223) and a first analog transmission unit (222) and a second wireless access system transmission unit (230) including a second digital transmission unit (233) and a second analog transmission unit (232).

The first digital transmission unit (223) of the first wireless access system transmission unit (220) can convert a first digital transmission signal of the first system (A) supplied from the outside of the semiconductor integrated circuit (1000) through the digital interface (30) into a first analog transmission signal.

The second digital transmission unit (233) of the second wireless access system transmission unit (230) can convert a second digital transmission signal of the second system (B) supplied from the outside of the semiconductor integrated circuit (1000) through the digital interface (30) into a second analog transmission signal.

The first analog transmission unit (222) of the first wireless access system transmission unit (220) can up-convert the first analog transmission signal into a first RF transmission signal of the first system (A).

Figure 5:
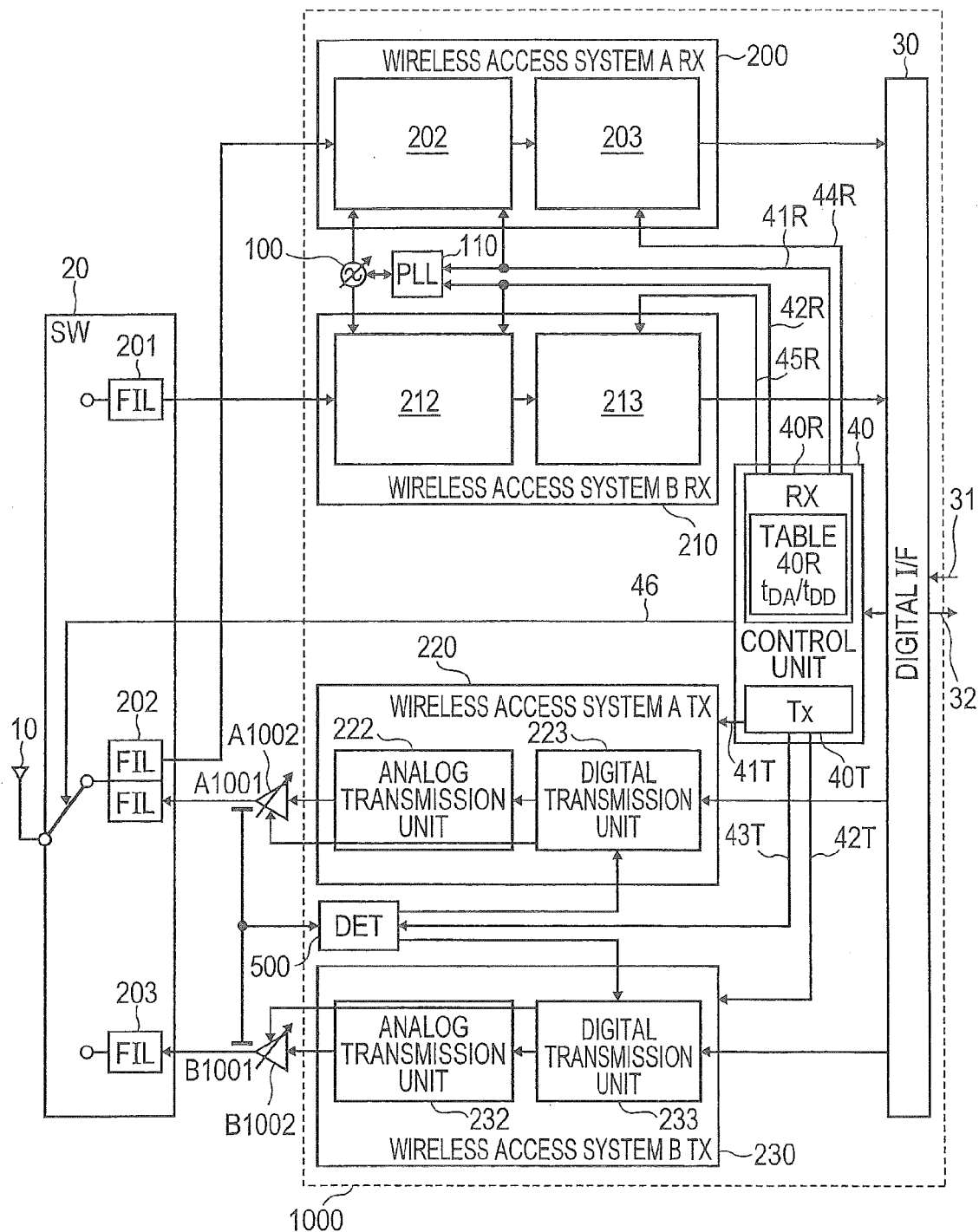
FIG. 5 is a diagram showing the configuration of a cellular phone including the receiver and a transmitter according to the first embodiment of the invention.

The second analog transmission unit (232) of the second wireless access system transmission unit (230) can up-convert the second analog transmission signal into a second RF transmission signal of the second system (B) (see FIG. 5).

In a more preferred embodiment, a sampling rate of the first analog-digital converter (A60, A61) and the second analog-digital converter (B60, B61) is set to be higher than a sampling rate of a digital interface output terminal (32) of the digital interface (30).

The first digital filter (A70, A71) and the second digital filter (B70, B71) also function as asynchronous sampling rate converters for converting the sampling rate of the first analog-digital converter and the second analog-digital converter into the sampling rate of the digital interface output terminal of the digital interface (see FIG. 1).

The semiconductor integrated circuit (1000) according to another more preferred embodiment further includes a control unit (40) for performing switching between the reception operation for the first RF reception signal of the first system (A) and the reception operation for the second RF reception signal of the second system (B).

The control unit (40) can store a signal delay time ($t_{DA}$) of the first analog reception unit (202) and the second analog reception unit (212) and a signal delay time ($t_{DD}$) of the first digital reception unit (203) and the second digital reception unit (213) (see FIG. 1).

In yet another more preferred embodiment, the first analog reception unit (202) further includes a first low noise amplifier (A10), a first variable analog filter (A30, A31, A50, A51), and a first analog variable gain amplifier (A40, A41).

The first low noise amplifier (A10) supplies the first RF reception signal of the first system (A) to the first reception mixer (A20, A21), and the first variable analog filter (A30, A31, A50, A51) and the first analog variable gain amplifier (A40, A41) are coupled in series between an output of the first reception mixer (A20, A21) and an input of the first analog-digital converter (A60, A61).

The second analog reception unit (212) further includes a second low noise amplifier (B10), a second variable analog filter (B30, B31, B50, B51), and a second analog variable gain amplifier (B40, B41).

The second low noise amplifier (B10) supplies the second RF reception signal of the second system (B) to the second reception mixer (B20, B21), and the second variable analog filter (B30, B31, B50, B51) and the second analog variable gain amplifier (B40, B41) are coupled in series between an output of the second reception mixer (B20, B21) and an input of the second analog-digital converter (B60, B61) (see FIG. 1).

In an alternative more preferred embodiment, in the period of the end transition operation (303) of the first digital reception unit in the switching, the second analog reception unit of the second wireless access system reception unit cancels DC offset voltage and calibrates a filter characteristic of the second variable analog filter, concurrently with the start of the lock operation of the phase locked loop (see FIG. 3).

In a specific embodiment, an input terminal of the first low noise amplifier (A10) in the first wireless access system reception unit and an input terminal of the second low noise amplifier (B10) in the second wireless access system reception unit can be coupled to a front-end module coupled to an antenna for receiving the first RF reception signal of the first system and the second RF reception signal of the second system (see FIG. 1).

In the most specific embodiment, the first RF transmission signal of the first system (A) generated from the first analog transmission unit (222) of the first wireless access system transmission unit (220) can be supplied to the antenna (10) through a first RF power amplifier (A1002) and the front-end module (20).

The second RF transmission signal of the second system (B) generated from the second analog transmission unit (232) of the second wireless access system transmission unit (230) can be supplied to the antenna (10) through a second RF power amplifier (B1002) and the front-end module (20) (see FIG. 5).

[2] Another exemplary embodiment of the invention is an operating method of a semiconductor integrated circuit (1000) including a first wireless access system reception unit (200) including a first analog reception unit (202) and a first digital reception unit (203), a voltage-controlled oscillator (100), a phase locked loop (110), and a digital interface (30).

The first analog reception unit (202) includes a first reception mixer (A20, A21) for down-converting an RF reception signal into a first analog reception signal and a first analog-digital converter (A60, A61) for converting the first analog reception signal into a first digital reception signal.

The first digital reception unit (203) includes a first digital filter (A70, A71) having an input terminal to which the first digital reception signal is supplied.

A first digital filter reception output signal outputted from an output terminal of the first digital filter (A70, A71) in the first digital reception unit (203) can be outputted to an outside of the semiconductor integrated circuit (1000) through the digital interface (30).

The voltage-controlled oscillator (100) generates an oscillation output signal as a base for a first reception local signal supplied to the first reception mixer (A20, A21), and the phase locked loop (110) locks a frequency of the oscillation output signal generated from the voltage-controlled oscillator (100) to a desired frequency (see FIG. 1).

The first wireless access system reception unit (200), the voltage-controlled oscillator (100), and the phase locked loop (110) enable switching from a reception operation for a first RF reception signal of a first system (A0) to a reception operation for a second RF reception signal of a second system (A1).

In the switching, as for the reception operation for the first RF reception signal of the first system (A0), an end transition operation (403) of the first digital reception unit (203) is performed subsequent to an end transition operation (402) of the first analog reception unit (202).

In the switching, for the reception operation for the second RF reception signal of the second system (A1), a start transition operation (406) of the first analog reception unit (202) and a start transition operation (408) of the first digital reception unit (203) are performed.

In a period of the end transition operation (403) of the first digital reception unit (203) in the switching, the phase locked loop (110) starts a lock operation so as to match a frequency of the oscillation output signal generated from the voltage-controlled oscillator (100) to a desired frequency of the second system (A1) (see FIG. 4).

According to this embodiment, it is possible to reduce the time of reception operation switching between multiple wireless systems.

2. Details of Embodiments

Next, embodiments will be described in greater detail below. In all the drawings for illustrating the best mode for carrying out the invention, components having the same functions as in the foregoing drawings are denoted by the same reference numerals, and their description will not be repeated.

First Embodiment

Configuration of Receiver

FIG. 1 is a diagram showing the configuration of a receiver according to the first embodiment of the invention.

In FIG. 1, reference numeral 10 denotes an antenna, 20 is a front-end module (FEM) including a switch, 1000 is a radio frequency (RF) signal processing semiconductor integrated circuit (RFIC), 30 is a digital interface (DIF), 31 is a digital interface input terminal (DIFin), and 32 is a digital interface output terminal (DIFout).

<<RFIC>>

Further, reference numeral 200 denotes a wireless access system A reception unit (RXA), and 210 is a wireless access system B reception unit (RXB). In the wireless access system A reception unit (RXA) 200, reference numeral 202 denotes an analog reception unit (A-RXA), and 203 is a digital reception unit (D-RXA). In the wireless access system B reception unit (RXB) 210, reference numeral 212 denotes an analog reception unit (A-RXB), and 213 is a digital reception unit (D-RXB).

Further, reference numeral 40 denotes a control unit, 41R is an on/off control signal (A-RXA_ON) to the analog reception unit (A-RXA) 202 of the wireless access system A reception unit (RXA) 200, and 42R is an on/off control signal (A-RXB_ON) to the analog reception unit (A-RXB) 212 of the wireless access system B reception unit (RXB) 210. Further, reference numeral 44R denotes an on/off control signal (D-RXA_ON) to the digital reception unit (D-RXA) 203 of the wireless access system A reception unit (RXA) 200, and 45R is an on/off control signal (D-RXB_ON) to the digital reception unit (D-RXB) 213 of the wireless access system B reception unit (RXB) 210.

Further, reference numeral 46 denotes a switching control signal (FEM_C) to the front-end module (FEM) 20, 100 is a voltage-controlled oscillator (VCO), and 110 is a PLL frequency synthesizer (PLL). PLL is an abbreviation for "Phase Locked Loop".

Furthermore, reference numerals A10, B10 denote a low noise amplifier (LNA); A20, A21, B20, B21 are a mixer (MIX); A30, A31, A50, A51, B30, B31, B50, B51 are a variable analog low-pass filter (A-LPF); and A40, A41, B40, B41 are an analog variable gain amplifier (A-PGA). Further, reference numerals A60, A61, B60, B61 denote an analog-digital converter (ADC); A70, A71, B70, B71 are a variable digital low-pass filter (D-LPF); A80, A81, B80, B81 are a digital variable gain amplifier (D-PGA); and A90, B90 are a phase shifter.

In the analog reception unit (A-RXA) 202 of the wireless access system A reception unit (RXA) 200, the low noise amplifier (LNA) A10, the mixers (MIX) A20, A21, and the phase shifter A90 perform quadrature direct down-conversion signal processing. More specifically, by the down-conversion signal processing, an RF reception signal of a wireless access system A received by the antenna 10 is converted into a reception analog baseband signal I having an in-phase component and a reception analog baseband signal Q having a quadrature component. The variable analog low-pass filters (A-LPF) A30, A31, A50, A51 function as channel selection filters which suppress an interference signal component outside a desired signal band contained in the reception analog baseband signals I, Q. After that, the reception analog baseband signals I, Q are converted by the analog-digital converters (ADC) A60, A61 into reception digital baseband signals I, Q, which are supplied to the input terminals of the variable digital low-pass filters (D-LPF) A70, A71 in the digital reception unit (D-RXA) 203. Then, the reception digital baseband signals I, Q outputted from the output terminals of the variable digital low-pass filters (D-LPF) A70, A71 are supplied to the input terminals of the digital variable gain amplifiers (D-PGA) A80, A81 configured with digital multipliers. The reception digital baseband signals I, Q outputted from the output terminals of the digital variable gain amplifiers (D-PGA) A80, A81 are supplied to a baseband LSI through the digital interface (DIF) 30.

In the analog reception unit (A-RXB) 212 of the wireless access system B reception unit (RXB) 210, the low noise amplifier (LNA) B10, the mixers (MIX) B20, B21, and the phase shifter B90 perform quadrature direct down-conversion signal processing. More specifically, by the down-conversion signal processing, an RF reception signal of a wireless access system B received by the antenna 10 is converted into a reception analog baseband signal I having an in-phase component and a reception analog baseband signal Q having a quadrature component. The variable analog low-pass filters (A-LPF) B30, B31, B50, B51 function as channel selection filters which suppress an interference signal component outside a desired signal band contained in the reception analog baseband signals I, Q. After that, the reception analog baseband signals I, Q are converted by the analog-digital converters (ADC) B60, B61 into reception digital baseband signals I, Q, which are supplied to the input terminals of the variable digital low-pass filters (D-LPF) B70, B71 in the digital reception unit (D-RXB) 213. Then, the reception digital baseband signals I, Q outputted from the output terminals of the variable digital low-pass filters (D-LPF) B70, B71 are supplied to the input terminals of the digital variable gain amplifiers (D-PGA) B80, B81 configured with digital multipliers. The reception digital baseband signals I, Q outputted from the output terminals of the digital variable gain amplifiers (D-PGA) B80, B81 are supplied to the baseband LSI through the digital interface (DIF) 30.

The RF signal processing semiconductor integrated circuit (RFIC) 1000 includes the two reception units. That is, the wireless access system A reception unit (RXA) 200 is a reception block unit for receiving the wireless access system A, and the wireless access system B reception unit (RXB) 210 is a reception block unit for receiving the wireless access system B.

The internal operation of the RF signal processing semiconductor integrated circuit (RFIC) 1000 is controlled from the baseband LSI (not shown) through the digital interface (DIF) 30. The digital interface input terminal (DIFin) 31 and the digital interface output terminal (DIFout) 32 transfer digital signals, and output signals from the digital variable gain amplifiers (D-PGA) A80, A81, B80, B81 are digital parallel signals. Therefore, if the digital interface (DIF) 30 is a serial interface, the digital interface (DIF) 30 includes the function of converting digital parallel signals from the digital variable gain amplifiers (D-PGA) A80, A81, B80, B81 into serial signals. That is, if the digital interface (DIF) 30 is a serial interface, the number of external terminals of the RF signal processing semiconductor integrated circuit (RFIC) 1000 can be reduced in comparison with a parallel interface performing output processing of digital data having the same number of bits. Therefore, by configuring the digital interface (DIF) 30 with the serial interface, it is possible to reduce the size of a package containing the RF signal processing semiconductor integrated circuit (RFIC) 1000.

Through the digital interface input terminal (DIFin) 31, digital control signals to the RF signal processing semiconductor integrated circuit (RFIC) 1000 and the front-end module (FEM) 20 and transmission digital baseband signals etc. to the RF signal processing semiconductor integrated circuit (RFIC) 1000 are transferred from the baseband LSI (not shown).

Through the digital interface output terminal (DIFout) 32, reception digital baseband signals from the RF signal processing semiconductor integrated circuit (RFIC) 1000 and the operating states etc. of the RF signal processing semiconductor integrated circuit (RFIC) 1000 and the front-end module (FEM) 20 are transferred to the baseband LSI (not shown).

As for the wireless access systems A, B; for example, in the case of a mobile communication terminal, the LTE system is used as the wireless access system A, and the GSM system is used as the wireless access system B. Thus, mutually different wireless access systems are used. The communication systems used as the wireless access systems A, B can be set by an operation mode designation signal supplied to the RF signal processing semiconductor integrated circuit (RFIC) 1000 through the digital interface (DIF) 30.

Hereinafter, description will be made of the operation of the RF signal processing semiconductor integrated circuit (RFIC) 1000 as the receiver according to the first embodiment of the invention shown in FIG. 1.

A radio frequency (RF) reception signal received by the antenna 10 is supplied to the front-end module (FEM) 20.

The front-end module (FEM) 20 includes an antenna switch and a filter. The antenna switch included in the front-end module (FEM) 20 is, for example, controlled to couple with the wireless access system A reception unit (RXA) 200 and decouple with the wireless access system B reception unit (RXB) 210. The filter included in the front-end module (FEM) 20 passes, with as little loss as possible, the desired signal band of the wireless access system A in the radio frequency (RF) reception signal received from the antenna 10, and suppresses an interference signal component outside the desired signal band. Consequently, the RF reception signal as the output signal of the front-end module (FEM) 20 is supplied to the low noise amplifier (LNA) A10 in the analog reception unit (A-RXA) 202.

The low noise amplifier (LNA) A10 amplifies the RF reception signal by a desired gain with as little noise as possible. The RF reception amplification signal outputted from the low noise amplifier (LNA) A10 is supplied to the mixers (MIX) A20, A21.

The PLL frequency synthesizer (PLL) 110 locks the frequency of the oscillation output signal of the voltage-controlled oscillator (VCO) 100 to a desired frequency by comparing the oscillation output signal of the voltage-controlled oscillator (VCO) 100 with a reference clock signal (not shown) based on operation setting information supplied from the control unit 40. Thus, the voltage-controlled oscillator (VCO) 100 generates the oscillation output signal of the desired frequency.

In response to the oscillation output signal supplied from the voltage-controlled oscillator (VCO) 100, the phase shifter A90 generates two local signals having a phase difference of 90 degrees and supplies the two local signals to the mixers (MIX) A20, A21. For example, if the wireless access system A reception unit (RXA) 200 is a direct conversion receiver, the frequency of the local signals supplied to the mixers (MIX) A20, A21 is equal to the center frequency of the RF reception signal of a desired channel supplied from the antenna 10. The oscillation signal of the voltage-controlled oscillator (VCO) 100 and the two local signals having a phase difference of 90 degrees generated from the phase shifter A90 do not necessarily have the same frequency. For example, the frequency of the oscillation output signal of the voltage-controlled oscillator (VCO) 100 is set to two times the frequency of the local signals. In this case, the phase shifter A90 has not only the function of the 90-degree phase shift between the local signals but also the function of dividing by two the frequency of the oscillation output signal of the voltage-controlled oscillator (VCO) 100.

The output signals of the mixers (MIX) A20, A21 are supplied to the variable analog low-pass filters (A-LPF) A30, A31. The variable analog low-pass filters (A-LPF) A30, A31, A50, A51 pass the desired channel signal band with as little loss as possible, and suppress the interference signal component outside the desired signal band.

The output signals of the variable analog low-pass filters (A-LPF) A30, A31 are supplied to the analog variable gain amplifiers (A-PGA) A40, A41. The analog variable gain amplifiers (A-PGA) A40, A41 are set to a desired gain based on setting information supplied from the control unit 40. The output signals of the analog variable gain amplifiers (A-PGA) A40, A41 are supplied to the variable analog low-pass filters (A-LPF) A50, A51. Further, the reception analog baseband signals which are the output signals of the variable analog low-pass filters (A-LPF) A50, A51 are supplied to the analog-digital converters (ADC) A60, A61, and the reception digital baseband signals are outputted from the output terminals of the analog-digital converters (ADC) A60, A61.

In response to the reception digital baseband signals from the output terminals of the analog-digital converters (ADC) A60, A61, the variable digital low-pass filters (D-LPF) A70, A71 in the digital reception unit (D-RXA) 203 output the desired channel signal band with as little loss as possible, and suppress undesired signals other than the desired channel signals. The reception digital baseband signals of the output terminals of the variable digital low-pass filters (D-LPF) A70, A71 are supplied to the digital variable gain amplifiers (D-PGA) A80, A81.

The digital variable gain amplifiers (D-PGA) A80, A81 configured with digital multipliers are set to a desired digital gain based on setting information supplied from the control unit 40. The reception digital baseband signals of the output terminals of the digital variable gain amplifiers (D-PGA) A80, A81 are transferred from the digital interface output terminal (DIFout) 32 to the baseband LSI (not shown) by the digital interface (DIF) 30.

Further, in the digital interface (DIF) 30 of the RF signal processing semiconductor integrated circuit (RFIC) 1000 according to the first embodiment of the invention shown in FIG. 1, the sampling rate of the analog-digital converters (ADC) A60, A61 . . . and the sampling rate of the digital interface output terminal (DIFout) 32 are defined to predetermined values by a digital interface standard. That is, the sampling rate of the analog-digital converters (ADC) A60, A61 . . . is higher than the sampling rate of the digital interface output terminal (DIFout) 32.

The variable digital low-pass filters (D-LPF) A70, A71 . . . do not only suppress undesired signals other than the desired channel signals, but also function as asynchronous sampling rate converters (ASRC) for converting the high sampling rate of the analog-digital converters (ADC) A60, A61 . . . into the low sampling rate of the digital interface output terminal (DIFout) 32. The variable digital low-pass filters (D-LPF) A70, A71 . . . are configured with FIR digital filters. FIR is an abbreviation for "Finite Impulse Response".

<<Digital Filter>>

FIG. 13 is a diagram showing the configuration of one FIR digital filter 1300 configuring the variable digital low-pass filters (D-LPF) A70, A71, B70, B71 in the RF signal processing semiconductor integrated circuit (RFIC) 1000 as the receiver according to the first embodiment of the invention shown in FIG. 1.

As shown in FIG. 13, the FIR digital filter 1300 configuring the variable digital low-pass filters (D-LPF) A70, A71, B70, B71 includes four delay circuits 1311, 1312, 1313, 1314, five digital multipliers 1320, 1321, 1322, 1323, 1324, and an adder 1340.

A digital input signal Data_In is supplied to the input terminal of the first delay circuit 1311 and the input terminal of the first digital multiplier 1320, and the output terminal of the first delay circuit 1311 is coupled to the input terminal of the second delay circuit 1312 and the input terminal of the second digital multiplier 1321. The output terminal of the second delay circuit 1312 is coupled to the input terminal of the third delay circuit 1313 and the input terminal of the third digital multiplier 1322, and the output terminal of the third delay circuit 1313 is coupled to the input terminal of the fourth delay circuit 1314 and the input terminal of the fourth digital multiplier 1323. A digital output signal Data_Out is outputted from the output terminal of the fourth delay circuit 1314, and the output terminal of the fourth delay circuit 1314 is coupled to the input terminal of the fifth digital multiplier 1324.

A first filter coefficient A0 is supplied to the other input terminal of the first digital multiplier 1320, a second filter coefficient A1 is supplied to the other input terminal of the second digital multiplier 1321, and a third filter coefficient A2 is supplied to the other input terminal of the third digital multiplier 1322. A fourth filter coefficient A3 is supplied to the other input terminal of the fourth digital multiplier 1323, and a fifth filter coefficient A4 is supplied to the other input terminal of the fifth digital multiplier 1324. Five output signals 1330, 1331, 1332, 1333, 1334 of the five digital multipliers 1320, 1321, 1322; 1323, 1324 are supplied to the five input terminals of the adder 1340, respectively. Accordingly, output data 1350 is outputted from the output terminal of the adder 1340.

FIG. 14 is a diagram for explaining the operation of the FIR digital filter 1300 configuring the variable digital low-pass filters (D-LPF) A70, A71, B70, B71 shown in FIG. 13.

As shown in FIG. 14, the output signal 1331 of the second digital multiplier 1321 is delayed by one unit delay time in comparison with the digital input signal Data_In and the output signal 1330 of the first digital multiplier 1320. The output signal 1332 of the third digital multiplier 1322 is delayed by one unit delay time in comparison with the output signal 1331 of the second digital multiplier 1321. The output signal 1333 of the fourth digital multiplier 1323 is delayed by one unit delay time in comparison with the output signal 1332 of the third digital multiplier 1322. Further, the output signal 1334 of the fifth digital multiplier 1324 is delayed by one unit delay time in comparison with the output signal 1333 of the fourth digital multiplier 1323.

Figure 11:
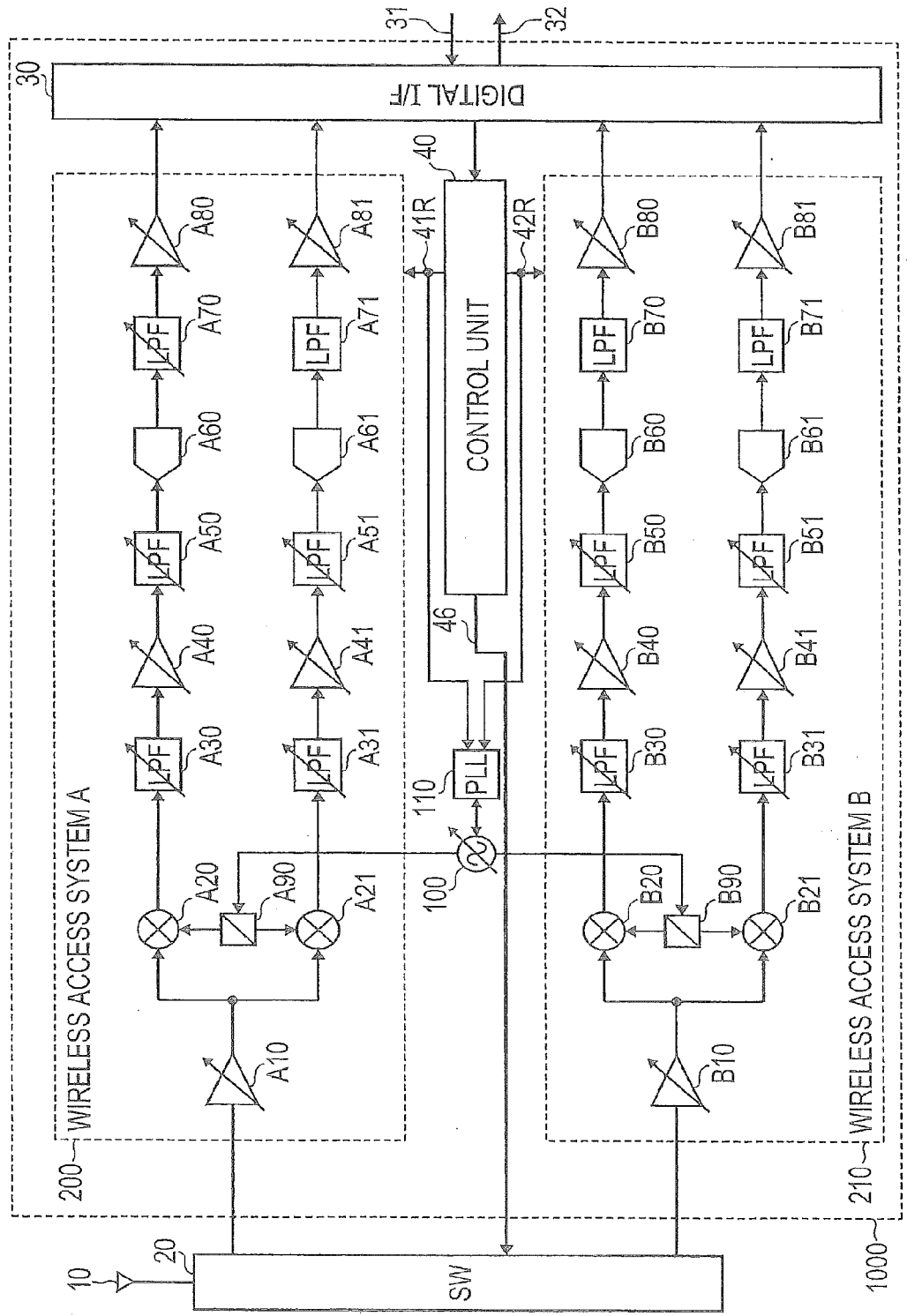
FIG. 11 is a diagram showing the configuration of the receiver studied by the present inventors et al. prior to the invention.

As described above, the FIR digital filter 1300 shown in FIG. 13 is configured with the four delay circuits 1311, 1312, 1313, 1314. Further, the variable digital low-pass filters (D-LPF) A70, A71, B70, B71 in the RF signal processing semiconductor integrated circuit (RFIC) 1000 shown in FIG. 11 are each configured with 100 FIR digital filters. Therefore, the variable digital low-pass filters (D-LPF) A70, A71, B70, B71 each include 400 delay circuits.

Thus, since the variable digital low-pass filters (D-LPF) A70, A71, B70, B71 each include an extremely large number of stages of delay circuits, the signal delay time of the variable digital low-pass filters (D-LPF) A70, A71, B70, B71 is larger than the signal delay time of the variable analog low-pass filters (A-LPF) A30, A31, A50, A51, B30, B31, B50, B51.

<<Reception Operation Switching>>

Assume that the digital interface (DIF) 30 receives a reception stop signal of the wireless access system A and a reception start signal of the wireless access system B at the digital interface input terminal (DIFin) 31 in this state. In general, prior to the reception start signal of the wireless access system B, the reception stop signal of the wireless access system A reaches the RF signal processing semiconductor integrated circuit (RFIC) 1000. However, the reception start signal of the wireless access system B may arrive prior to the reception stop signal of the wireless access system A. Alternatively, it is possible to determine that the reception stop signal of the wireless access system A has been received by exclusively processing the reception start signal of the wireless access system B.

For reception stop processing of the wireless access system A, first the switch included in the front-end module (FEM) 20 decouples the wireless access system A reception unit (RXA) 200 based on the switching control signal 46 from the control unit 40. This stops the supply of the RF reception signal of the wireless access system A received by the antenna 10 to the wireless access system A reception unit (RXA) 200 through the switch included in the front-end module (FEM) 20.

The control unit 40 stores a signal delay time t.sub.DA of the analog reception unit (A-RXA) 202 and the analog reception unit (A-RXB) 212 and a signal delay time t.sub.DD of the digital reception unit (D-RXA) 203 and the digital reception unit (D-RXB) 213.

In the case of supporting multiple wireless access systems only by the wireless access system A reception unit (RXA) 200 without using the wireless access system B reception unit (RXB) 210, the filter characteristics of the variable analog low-pass filters (A-LPF) A30, A31, A50, A51 and the variable digital low-pass filters (D-LPF) A70, A71 included in the wireless access system A reception unit (RXA) 200 are varied. Accordingly, in the wireless access system A reception unit (RXA) 200, to set the signal delay time t.sub.DA of the analog reception unit (A-RXA) 202 and the signal delay time t.sub.DD of the digital reception unit (D-RXA) 203 to different values for respective wireless access systems, a storage table for storing a plurality of set values is provided in the control unit 40. The set values are transferred from the baseband LSI to the storage table provided in the control unit 40.

Similarly, in the case of supporting multiple wireless access systems only by the wireless access system B reception unit (RXB) 210 without using the wireless access system A reception unit (RXA) 200, the filter characteristics of the variable analog low-pass filters (A-LPF) B30, B31, B50, B51 and the variable digital low-pass filters (D-LPF) B70, B71 included in the wireless access system B reception unit (RXB) 210 are varied. Accordingly, in the w wireless access system B reception unit (RXB) 210, to set the signal delay time t.sub.DA of the analog reception unit (A-RXB) 212 and the signal delay time t.sub.DD of the digital reception unit (D-RXB) 213 to different values for respective wireless access systems, a storage table for storing a plurality of set values is provided in the control unit 40. The set values are transferred from the baseband LSI to the storage table provided in the control unit 40.

After the lapse of the signal delay time t.sub.DA of the analog reception unit (A-RXA) 202, the on/off control signal (A-RXA_ON) 41R from the control unit 40 turns off the analog reception unit (A-RXA) 202. Then, the on/off control signal (A-RXB_ON) 42R from the control unit 40 turns on the analog reception unit (A-RXB) 212. At the same time, the PLL frequency synthesizer (PLL) 110 starts a lock operation so as to match the frequency of the oscillation output signal of the voltage-controlled oscillator (VCO) 100 to a desired frequency of the wireless access system B by comparing the oscillation output signal of the voltage-controlled oscillator (VCO) 100 with the reference clock signal (not shown) based on setting inputted from the control unit 40.

While the PLL frequency synthesizer (PLL) 110 and the voltage-controlled oscillator (VCO) 100 perform the lock operation, the digital reception unit (D-RXA) 203 performs the output processing (sending) of all reception digital baseband signals concerning all reception signals existing in a large number of stages of delay circuits in the variable digital low-pass filters (D-LPF) A70, A71. Thus, the digital interface (DIF) 30 completes the output processing (sending) of all reception digital baseband signals concerning reception signals existing in the variable digital low-pass filters (D-LPF) A70, A71 in the digital reception unit (D-RXA) 203 through the digital interface output terminal (DIFout) 32 to the baseband LSI. Then, the on/off control signal (D-RXA_ON) 44R from the control unit 40 turns off the digital reception unit (D-RXA) 203. This control can be implemented, for example, by monitoring the operating state of the digital reception unit (D-RXA) 203 and outputting a flag signal indicating that the digital interface (DIF) 30 has completed the output processing (sending) of all reception digital baseband signals through the digital interface output terminal (DIFout) 32. Alternatively, since the signal delay time t.sub.DD of the digital reception unit (D-RXA) 203 is always constant, after the lapse of the constant signal delay time t.sub.DD after turning off the analog reception unit (A-RXA) 202, the on/off control signal (D-RXA_ON) 44R from the control unit 40 can turn off the digital reception unit (D-RXA) 203.

After the on/off control signal (D-RXA_ON) 44R from the control unit 40 turns off the digital reception unit (D-RXA) 203, the on/off control signal (D-RXB_ON) 45R from the control unit 40 turns on the digital reception unit (D-RXB) 213.

Further, according to the RF signal processing semiconductor integrated circuit (RFIC) 1000 according to the first embodiment of the invention shown in FIG. 1, while the PLL frequency synthesizer (PLL) 110 and the voltage-controlled oscillator (VCO) 100 perform the lock operation, the analog reception unit (A-RXB) 212 of the wireless access system B reception unit (RXB) 210 cancels DC offset voltage and calibrates filter characteristics. That is, the analog reception unit (A-RXB) 212 of the wireless access system B reception unit (RXB) 210 cancels the DC offset voltage of the internal circuit and calibrates the filter characteristics of the variable analog low-pass filters (A-LPF) B30, B31, B50, B51.

After the wireless access system B reception unit (RXB) 210 completes all preparations for reception start processing of the wireless access system B, the switch included in the front-end module (FEM) 20 couples the wireless access system B reception unit (RXB) 210 based on the switching control signal 46 from the control unit 40.

A radio frequency (RF) reception signal received by the antenna 10 is supplied to the front-end module (FEM) 20.

The antenna switch included in the front-end module (FEM) 20 is controlled to decouple with the wireless access system A reception unit (RXA) 200 and couple with the wireless access system B reception unit (RXB) 210. The filter included in the front-end module (FEM) 20 passes, with as little loss as possible, the desired signal band of the wireless access system B in the radio frequency (RF) reception signal received from the antenna 10, and suppresses an interference signal component outside the desired signal band. Consequently, the RF reception signal as the output signal of the front-end module (FEM) 20 is supplied to the low noise amplifier (LNA) B10 in the analog reception unit (A-RXB) 212.

The low noise amplifier (LNA) B10 in the analog reception unit (A-RXB) 212 amplifies the RF reception signal by a desired gain with as little noise as possible. The RF reception amplification signal outputted from the low noise amplifier (LNA) B10 is supplied to the mixers (MIX) B20, B21.

The PLL frequency synthesizer (PLL) 110 locks the frequency of the oscillation output signal of the voltage-controlled oscillator (VCO) 100 to a desired frequency by comparing the oscillation output signal of the voltage-controlled oscillator (VCO) 100 with the reference clock signal (not shown) based on operation setting information supplied from the control unit 40. Thus, the voltage-controlled oscillator (VCO) 100 generates the oscillation output signal of the desired frequency.

In response to the oscillation output signal supplied from the voltage-controlled oscillator (VCO) 100, the phase shifter B90 generates two local signals having a phase difference of 90 degrees and supplies the two local signals to the mixers (MIX) B20, B21. For example, if the wireless access system B reception unit (RXB) 210 is a direct conversion receiver, the frequency of the local signals supplied to the mixers (MIX) B20, B21 is equal to the center frequency of the RF reception signal of a desired channel supplied from the antenna 10. The oscillation signal of the voltage-controlled oscillator (VCO) 100 and the two local signals having a phase difference of 90 degrees generated from the phase shifter B90 do not necessarily have the same frequency. For example, the frequency of the oscillation output signal of the voltage-controlled oscillator (VCO) 100 is set to two times the frequency of the local signals. In this case, the phase shifter B90 has not only the function of the 90-degree phase shift between the local signals but also the function of dividing by two the frequency of the oscillation output signal of the voltage-controlled oscillator (VCO) 100.

The output signals of the mixers (MIX) B20, B21 are supplied to the variable analog low-pass filters (A-LPF) B30, B31. The variable analog low-pass filters (A-LPF) B30, B31, B50, B51 pass the desired channel signal band with as little loss as possible, and suppress the interference signal component outside the desired signal band.

The output signals of the variable analog low-pass filters (A-LPF) B30, B31 are supplied to the analog variable gain amplifiers (A-PGA) B40, B41. The analog variable gain amplifiers (A-PGA) B40, B41 are set to a desired gain based on setting information supplied from the control unit 40. The output signals of the analog variable gain amplifiers (A-PGA) B40, B41 are supplied to the variable analog low-pass filters (A-LPF) B50, B51. Further, the reception analog baseband signals which are the output signals of the variable analog low-pass filters (A-LPF) B50, B51 are supplied to the analog-digital converters (ADC) B60, B61, and the reception digital baseband signals are outputted from the output terminals of the analog-digital converters (ADC) B60, B61.

In response to the reception digital baseband signals from the output terminals of the analog-digital converters (ADC) B60, B61, the variable digital low-pass filters (D-LPF) B70, B71 in the digital reception unit (D-RXB) 213 output the desired channel signal band with as little loss as possible, and suppress undesired signals other than the desired channel signals. The reception digital baseband signals of the output terminals of the variable digital low-pass filters (D-LPF) B70, B71 are supplied to the digital variable gain amplifiers (D-PGA) B80, B81.

The digital variable gain amplifiers (D-PGA) B80, B81 configured with digital multipliers are set to a desired digital gain based on setting information supplied from the control unit 40. The reception digital baseband signals of the output terminals of the digital variable gain amplifiers (D-PGA) B80, B81 are transferred from the digital interface output terminal (DIFout) 32 to the baseband LSI (not shown) by the digital interface (DIF) 30.

<<Operation for Switching Reception Operation>>

Figure 2:
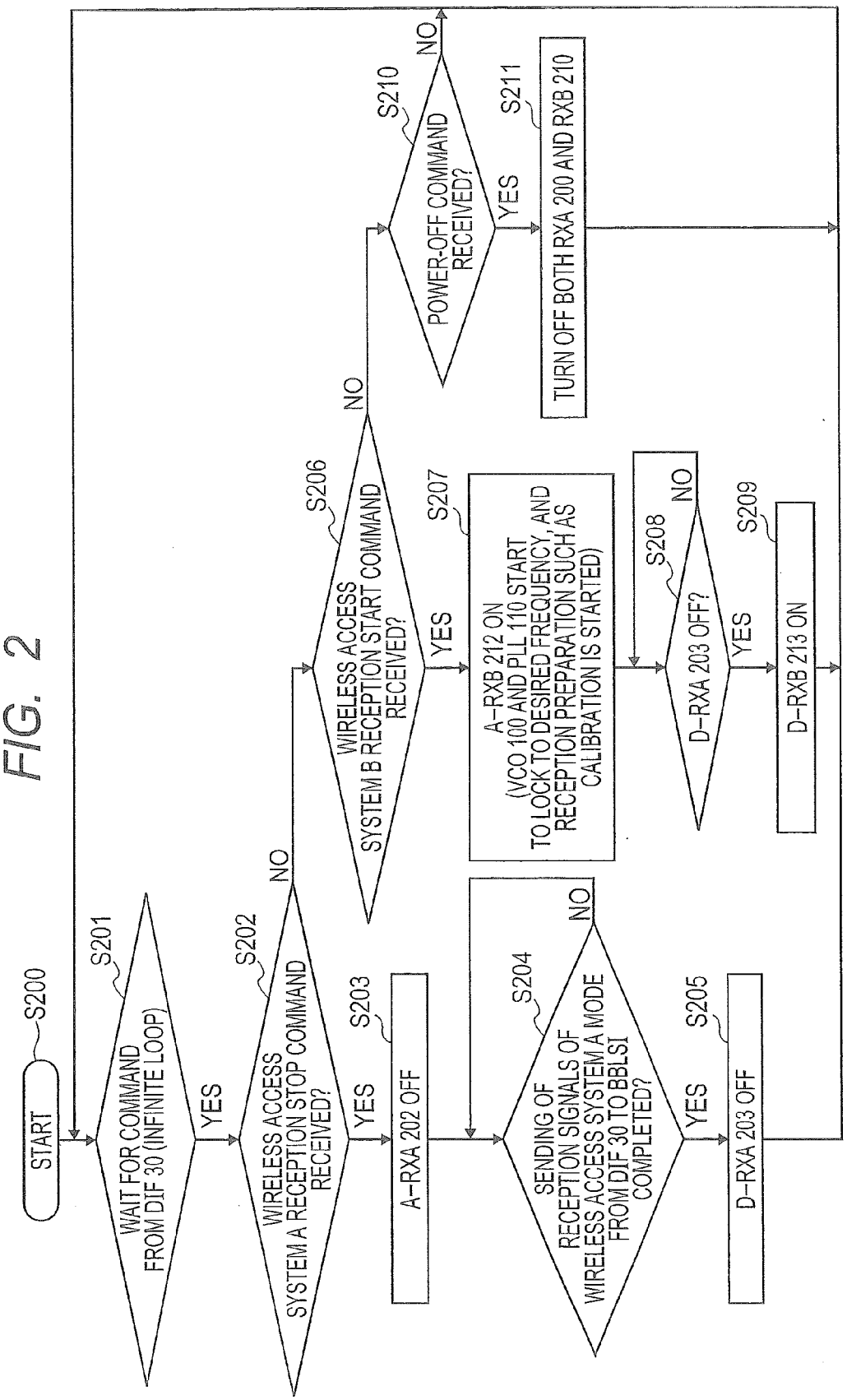
FIG. 2 is a flowchart showing an operation for switching the reception operation of an RF signal processing semiconductor integrated circuit (RFIC) 1000 as the receiver according to the first embodiment of the invention shown in FIG. I.

FIG. 2 is a flowchart showing an operation for switching the reception operation of the RF signal processing semiconductor integrated circuit (RFIC) 1000 as the receiver according to the first embodiment of the invention shown in FIG. 1.

In step S200 of FIG. 2, the analog reception unit (A-RXA) 202 and the digital reception unit (D-RXA) 203 in the wireless access system A reception unit (RXA) 200 of the RF signal processing semiconductor integrated circuit (RFIC) 1000 are receiving the wireless access system A.

In step S201 of FIG. 2, the digital interface (DIF) 30 of the RF signal processing semiconductor integrated circuit (RFIC) 1000 waits for a command to be supplied to the digital interface input terminal (DIFin) 31 from the baseband LSI (not shown).

In step S202 of FIG. 2, the wireless access system A reception unit (RXA) 200 receives a reception stop command of the wireless access system A from the baseband LSI (not shown) through the digital interface (DIF) 30.

Then, in step S203 of FIG. 2, the on/off control signal (A-RXA_ON) 41R of the control unit 40 turns off the analog reception unit (A-RXA) 202 of the wireless access system A reception unit (RXA) 200.

In step S204 of FIG. 2, concerning all reception signals of the wireless access system A existing in the digital reception unit (D-RXA) 203 of the wireless access system A reception unit (RXA) 200, the digital reception unit (D-RXA) 203 completes output processing (sending) of the reception digital baseband signals from the digital interface output terminal (DIFout) 32 of the digital interface (DIF) 30 to the baseband LSI.

Upon completion of sending the reception digital baseband signals of the wireless access system A in step S204 of FIG. 2, the on/off control signal (D-RXA_ON) 44R of the control unit 40 turns off the digital reception unit (D-RXA) 203 of the wireless access system A reception unit (RXA) 200 in next step S205.

In step S206 of FIG. 2, assume that the wireless access system B reception unit (RXB) 210 receives a reception start command of the wireless access system B through the digital interface (DIF) 30.

If the reception start command of the wireless access system B has been received in step S206, the on/off control signal (A-RXB_ON) 42R of the control unit 40 turns on the analog reception unit (A-RXB) 212 of the wireless access system B reception unit (RXB) 210 in step S207 of FIG. 2.

In step S207, when the wireless access system B reception unit (RXB) 210 is turned on, the PLL frequency synthesizer (PLL) 110 starts a lock operation based on the on/off control signal (RXB_ON) 42R from the control unit 40. That is, the PLL frequency synthesizer (PLL) 110 starts the lock operation so as to match the frequency of the oscillation output signal of the voltage-controlled oscillator (VCO) 100 to the desired frequency of the wireless access system B by comparing the oscillation output signal of the voltage-controlled oscillator (VCO) 100 with the reference clock signal (not shown). While the PLL frequency synthesizer (PLL) 110 and the voltage-controlled oscillator (VCO) 100 perform the lock operation, the wireless access system B reception unit (RXB) 210 cancels the DC offset voltage of the internal circuit and calibrates the filter characteristics of the variable analog low-pass filters (A-LPF) B30, B31, B50, B51.

After completion of turning off the digital reception unit (D-RXA) 203 of the wireless access system A reception unit (RXA) 200 in step S208 of FIG. 2, the digital reception unit (D-RXB) 213 of the wireless access system B reception unit (RXB) 210 is turned on in step S209 of FIG. 2. The timing of completion of turning off the digital reception unit (D-RXA) 203 of the wireless access system A reception unit (RXA) 200 in step S208 of FIG. 2 matches the timing of completion of turning off the digital reception unit (D-RXA) 203 of the wireless access system A reception unit (RXA) 200 in step S205 of FIG. 2.

When the digital interface (DIF) 30 receives a power-off command of the RF signal processing semiconductor integrated circuit (RFIC) 1000 in step S210 of FIG. 2, the wireless access system A reception unit (RXA) 200 and the wireless access system B reception unit (RXB) 210 are turned off in step S211 of FIG. 2.

Figure 12:
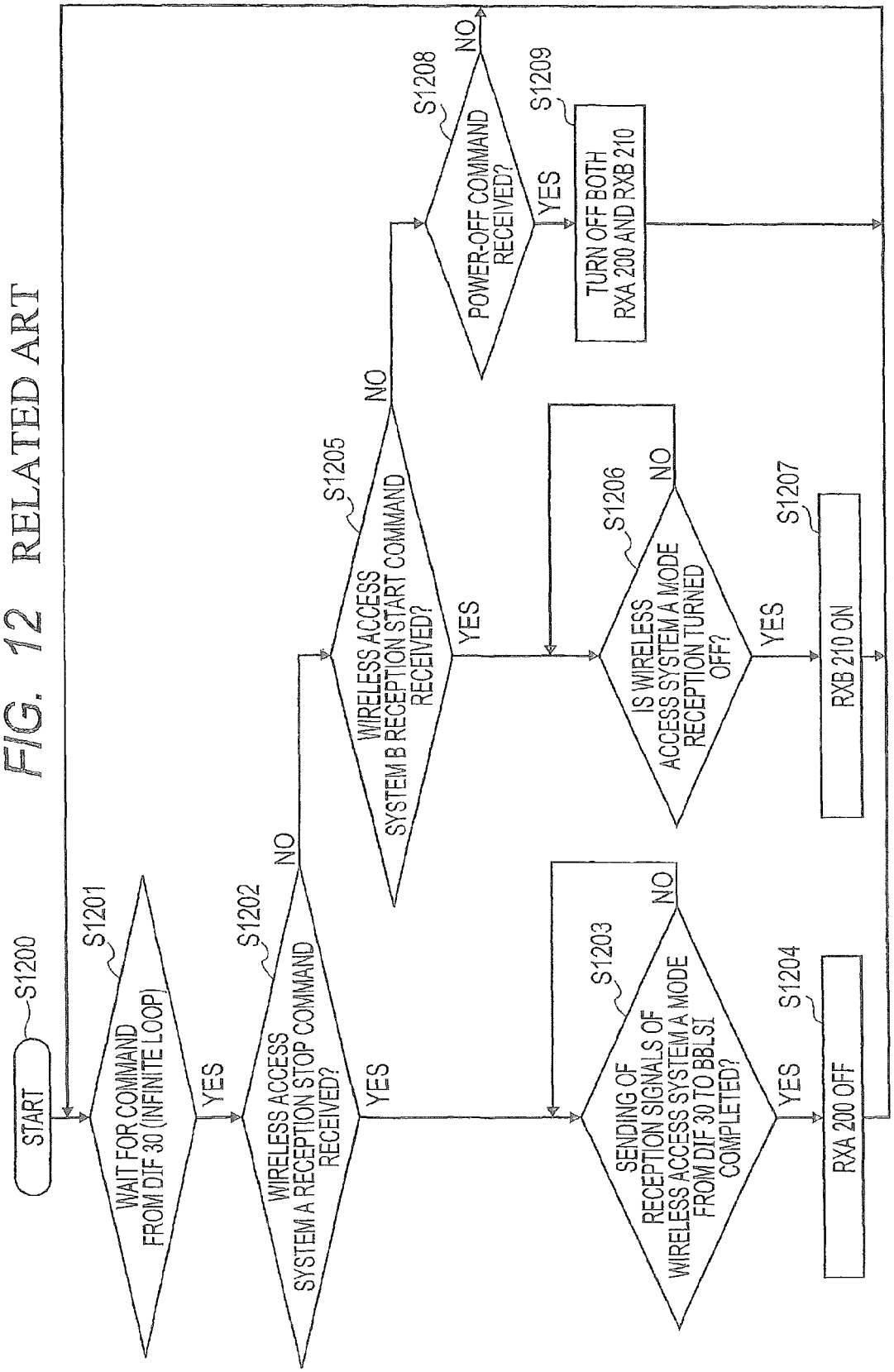
FIG. 12 is a flowchart for explaining the operation of the RF signal processing semiconductor integrated circuit (RFIC) 1000 as the receiver studied by the present inventors et al. prior to the invention shown in FIG. 11.

Incidentally, the receiver studied by the present inventors et al. prior to the invention shown in FIG. 11, at the time of switching between wireless access systems by the switching operation shown in FIG. 12, completes the output processing (sending) of all reception digital baseband signals concerning all reception signals existing in the reception unit of a currently-accessed wireless access system, and then moves to preparation to receive a wireless access system to be accessed next.

<<Reduction in Reception Operation Switching Time>>

On the other hand, in step S207 of the operation for switching the reception operation shown in FIG. 2, the time required for the PLL frequency synthesizer (PLL) 110 to perform the lock operation so as to match the frequency of the oscillation output signal of the voltage-controlled oscillator (VCO) 100 to the desired frequency of the wireless access system B is several hundreds of microseconds. Further, in step S204 of the operation for switching the reception operation shown in FIG. 2, the time required to complete the output processing (sending) of the reception digital baseband signals from the digital interface (DIF) 30 to the baseband LSI concerning all reception signals of the wireless access system A existing in the digital reception unit (D-RXA) 203 of the wireless access system A reception unit (RXA) 200 is several tens of microseconds.

Therefore, the operation for switching the reception operation shown in FIG. 2 according to the first embodiment of the invention enables the parallel execution of the output processing (sending) of the reception digital baseband signals with a processing time of several ten microseconds in step S204 and the lock operation of the oscillation frequency of the voltage-controlled oscillator (VCO) 100 with a processing time of several hundred microseconds in step S207. Consequently, according to the operation for switching the reception operation in FIG. 2 according to the first embodiment of the invention, the processing time of several ten microseconds in step S204 is not included in the switching time by the parallel execution, which can reduce the time of reception operation switching between multiple wireless systems.

<<Time Course of Operation for Switching Reception Operation>>

FIG. 3 is a diagram showing the time course of the operation for switching the reception operation of the RF signal processing semiconductor integrated circuit of the receiver according to the first embodiment of the invention shown in FIG. 1 and the time course of the operation for switching the reception operation of the RF signal processing semiconductor integrated circuit of the receiver studied by the present inventors et al. prior to the invention shown in FIG. 11.

That is, for comparison, in FIG. 3, the upper part shows the time course of the operation for switching the reception operation of the RF signal processing semiconductor integrated circuit of the receiver according to the first embodiment of the invention shown in FIG. 1, and the lower part shows the time course of the operation for switching the reception operation of the RF signal processing semiconductor integrated circuit of the receiver studied by the present inventors et al. prior to the invention shown in FIG. 11.

The upper part of FIG. 3 shows the time course of the operation for switching the reception operation of the RF signal processing semiconductor integrated circuit of the receiver according to the first embodiment of the invention shown in FIG. 1.

In response to the reception stop command of the wireless access system A received in step S202 of FIG. 2, a reception unit off transition operation 300 of the wireless access system A is started as shown in FIG. 3. At the same time that the reception unit off transition operation 300 of the wireless access system A is started, the switching control signal 46 supplied from the control unit 40 to the front-end module (FEM) 20 changes from a high level "H" to a low level "L". Accordingly, in an antenna switch operation 301 in FIG. 3, the antenna switch included in the front-end module (FEM) 20 decouples the wireless access system A reception unit (RXA) 200.

After the start of the reception unit off transition operation 300 of the wireless access system A, the on/off control signal (A-RXA_ON) 41R supplied from the control unit 40 to the analog reception unit (A-RXA) 202 is maintained at the high level "H" during the signal delay time $t_{DA}$ of the analog reception unit (A-RXA) 202, and the on/off control signal (A-RXA_ON) 41R changes to the low level "L" after the lapse of the signal delay time $t_{DA}$. As a result, in the period of an analog reception unit A off transition operation 302 in FIG. 3 corresponding to the signal delay time t.sub.DA, analog signal processing by the analog reception unit (A-RXA) 202 including the variable analog low-pass filters (A-LPF) A30, A31, A50, A51 having a large signal delay time is completed. The analog signal processing includes analog-digital conversion processing by the analog-digital converters (ADC) A60, A61.

After the analog signal processing by the analog reception unit (A-RXA) 202 is completed in the signal delay time t.sub.DA, the on/off control signal (D-RXA_N) 44R supplied from the control unit 40 to the digital reception unit (D-RXA) 203 is maintained at the high level "H" during the signal delay time t.sub.DD of the digital reception unit (D-RXA) 203, and the on/off control signal (D-RXA_ON) 44R changes to the low level "L" after the lapse of the signal delay time t.sub.DD. Consequently, in the period of a digital reception unit A off transition operation 303 in FIG. 3 corresponding to the signal delay time t.sub.DD, digital signal processing by the digital reception unit (D-RXA) 203 including the variable digital low-pass filters (D-LPF) A70, A71 having an extremely large signal delay time is completed. By the execution of the analog signal processing in the analog reception unit A off transition operation 302 during the signal delay time t.sub.DA and the digital signal processing in the digital reception unit A off transition operation 303 during the signal delay time t.sub.DD, the digital interface (DIF) 30 completes the sending of the last reception digital baseband signals of the wireless access system A to the baseband LSI (not shown) by a data sending operation 304.

On the other hand, at approximately the same time that the analog signal processing by the analog reception unit (A-RXA) 202 is completed in the signal delay time t.sub.DA, a reception unit on transition operation 305 of the wireless access system B is started. At approximately the same time that the reception unit on transition operation 305 of the wireless access system B is started, the on/off control signal (A-RXB_ON) 42R supplied from the control unit 40 to the analog reception unit (A-RXB) 212 of the wireless access system B reception unit (RXB) 210 changes from the low level "L" to the high level "H". As a result, in response to the high level "H" of the on/off control signal (A-RXB_ON) 42R, the analog reception unit (A-RXB) 212 of the wireless access system B reception unit (RXB) 210 is activated. Accordingly, in the period of an analog reception unit B on transition operation 306 shown in FIG. 3, preparation for analog signal processing by the analog reception unit (A-RXB) 212 including the variable analog low-pass filters (A-LPF) B30, B31, B50, B51 having a large signal delay time is started. In an initial period 3061 in the period of the analog reception unit B on transition operation 306, the analog reception unit (A-RXB) 212 of the wireless access system B reception unit (RXB) 210 cancels DC offset voltage and calibrates filter characteristics. That is, the analog reception unit (A-RXB) 212 of the wireless access system B reception unit (RXB) 210 cancels the DC offset voltage of the internal circuit and calibrates the filter characteristics of the variable analog low-pass filters (A-LPF) B30, B31, B50, B51.

During a VCO lock period 307 in parallel with the period of the analog reception unit B on transition operation 306 shown in FIG. 3, the PLL frequency synthesizer (PLL) 110 and the voltage-controlled oscillator (VCO) 100 perform the lock operation. That is, the PLL frequency synthesizer (PLL) 110 starts the lock operation so as to match the frequency of the oscillation output signal of the voltage-controlled oscillator (VCO) 100 to the desired frequency of the wireless access system B by comparing the oscillation output signal of the voltage-controlled oscillator (VCO) 100 with the reference clock signal (not shown) based on the on/off control signal (A-RXB_ON) 42R outputted from the control unit 40.

On the other hand, after the period of the digital reception unit A off transition operation 303 corresponding to the signal delay time t.sub.DD is completed, the on/off control signal (D-RXB_ON) 45R supplied from the control unit 40 to the digital reception unit (D-RXB) 213 of the wireless access system B reception unit (RXB) 210 changes from the low level "L" to the high level "H". As a result, in response to the high level "H" of the on/off control signal (D-RXB_ON) 45R, the digital reception unit (D-RXB) 213 of the wireless access system B reception unit (RXB) 210 is activated. Accordingly, in the period of a digital reception unit B on transition operation 308 shown in FIG. 3, preparation for digital signal processing by the digital reception unit (D-RXB) 213 including the variable digital low-pass filters (D-LPF) B70, B71 having an extremely large signal delay time is started.

As shown in FIG. 3, after the PLL frequency synthesizer (PLL) 110 and the voltage-controlled oscillator (VCO) 100 complete the lock operation in the VCO lock period 307, the switching control signal 46 supplied from the control unit 40 to the front-end module (FEM) 20 changes from the low level "L" to the high level "H". Accordingly, in an antenna switch operation 309, the antenna switch included in the front-end module (FEM) 20 couples the wireless access system B reception unit (RXB) 210.

Consequently, this enables the direct conversion of the radio frequency (RF) reception signal of the wireless access system B into the reception digital baseband signals, using the analog reception unit (A-RXB) 212 and the digital reception unit (D-RXB) 213 in the wireless access system B reception unit (RXB) 210, after the antenna switch operation 309 is completed.

The lower part of FIG. 3 shows the time course of the operation for switching the reception operation of the RF signal processing semiconductor integrated circuit of the receiver studied by the present inventors et al. prior to the invention shown in FIG. 11.

In response to the reception stop command of the wireless access system A, a reception unit off transition operation 310 of the wireless access system A is started. That is, by the reception unit off transition operation 310 of the wireless access system A, transition from activation to deactivation of the reception operation of the whole wireless access system A reception unit (RXA) 200 in the RF signal processing semiconductor integrated circuit (RFIC) 1000 shown in FIG. 11 is started. At the same time that the reception unit off transition operation 310 of the wireless access system A is started, the switching control signal 46 supplied from the control unit 40 to the front-end module (FEM) 20 changes from the high level "H" to the low level "L". Accordingly, in an antenna switch operation 311 in FIG. 3, the antenna switch included in the front-end module (FEM) 20 decouples the wireless access system A reception unit (RXA) 200.

Consideration will be given to the total time of the analog signal delay time t.sub.DA of the analog reception unit and the digital signal delay time t.sub.DD of the digital reception unit in the wireless access system A reception unit (RXA) 200 after the start of the reception unit off transition operation 310 of the wireless access system A. The on/off control signal (RXA_ON) 41R supplied from the control unit 40 to the wireless access system A reception unit (RXA) 200 is maintained at the high level "H" during the total time t.sub.DA+t.sub.DD, and the on/off control signal (RXA_ON) 41R changes to the low level "L" after the lapse of the total time t.sub.DA+t.sub.DD. As a result, in the period of the reception unit off transition operation 310 of the wireless access system A in FIG. 3 corresponding to the total time t.sub.DA+t.sub.DD analog signal processing by the analog reception unit and digital signal processing by the digital reception unit in the wireless access system A reception unit (RXA) 200 are completed. By the execution of the analog signal processing by the analog reception unit and the digital signal processing by the digital reception unit in the wireless access system A reception unit (RXA) 200 during the total time t.sub.DA+t.sub.DD, the digital interface (DIF) 30 completes the sending of the last reception digital baseband signals of the wireless access system A to the baseband LSI (not shown) by a data sending operation 314.

After the completion of the reception unit off transition operation 310 of the wireless access system A in the total time t.sub.DA+t.sub.DD, the on/off control signal (RXA_ON) 41R supplied from the control unit 40 to the wireless access system A reception unit (RXA) 200 changes from the high level "H" to the low level "L". After that, the on/off control signal (RXB_ON) 42R supplied from the control unit 40 to the wireless access system B reception unit (RXB) 210 changes from the low level "L" to the high level "H". As a result, in response to the high level "H" of the on/off control signal (RXB_ON) 42R, the analog reception unit and the digital reception unit in the wireless access system B reception unit (RXB) 210 are activated. Accordingly, in the period of a reception unit on transition operation 315 of the wireless access system B shown in FIG. 3, preparation for analog signal processing by the analog reception unit and preparation for digital signal processing by the digital reception unit in the wireless access system B reception unit (RXB) 210 are started. In an initial period 3161 in the period of the reception unit on transition operation 315 of the wireless access system B, the analog reception unit of the wireless access system B reception unit (RXB) 210 cancels DC offset voltage and calibrates filter characteristics. That is, the analog reception unit of the wireless access system B reception unit (RXB) 210 cancels the DC offset voltage of the internal circuit and calibrates the filter characteristics of the variable analog low-pass filters (A-LPF) B30, B31, B50, B51.

During a VCO lock period 317 approximately in parallel with the period of the reception unit on transition operation 315 of the wireless access system B shown in FIG. 3, the PLL frequency synthesizer (PLL) 110 and the voltage-controlled oscillator (VCO) 100 perform the lock operation. That is, the PLL frequency synthesizer (PLL) 110 starts the lock operation so as to match the frequency of the oscillation output signal of the voltage-controlled oscillator (VCO) 100 to the desired frequency of the wireless access system B by comparing the oscillation output signal of the voltage-controlled oscillator (VCO) 100 with the reference clock signal (not shown) based on the on/off control signal (RXB_ON) 42R outputted from the control unit 40.

As shown in FIG. 3, after the PLL frequency synthesizer (PLL) 110 and the voltage-controlled oscillator (VCO) 100 complete the lock operation in the VCO lock period 317, the switching control signal 46 supplied from the control unit 40 to the front-end module (FEM) 20 changes from the low level "L" to the high level "H". Accordingly, in an antenna switch operation 319, the antenna switch included in the front-end module (FEM) 20 couples the wireless access system B reception unit (RXB) 210.

Consequently, this enables the direct conversion of the radio frequency (RF) reception signal of the wireless access system B into the reception digital baseband signals, using the analog reception unit and the digital reception unit in the wireless access system B reception unit (RXB) 210, after the antenna switch operation 319 is completed.

As is obvious from the comparison of the upper and lower parts of FIG. 3, the operation for switching the reception operation according to the first embodiment of the invention shown in FIG. 1 shown in the upper part of FIG. 3 enables the early start of the DC offset voltage cancellation and filter characteristics calibration 3061 and the VCO lock period 307, in comparison with the operation for switching the reception operation studied by the present inventors et al. prior to the invention shown in FIG. 11 shown in the lower part of FIG. 3. This time difference corresponds to the digital signal delay time t.sub.DD of the digital reception unit (D-RXA) 203. As a result, the analog reception unit (A-RXB) 212 of the wireless access system B reception unit (RXB) 210 shown in FIG. 1 can early complete canceling the DC offset voltage of the internal circuit and calibrating the filter characteristics of the variable analog low-pass filters (A-LPF) B30, B31, B50, B51. Further, the PLL frequency synthesizer (PLL) 110 and the voltage-controlled oscillator (VCO) 100 can early complete the lock operation. Accordingly, the antenna switch operation 309 is completed early, thus making it possible to expedite the direct conversion of the radio frequency (RF) reception signal of the wireless access system B into the reception digital baseband signals, using the analog reception unit (A-RXB) 212 and the digital reception unit (D-RXB) 213 in the wireless access system B reception unit (RXB) 210.

Further, the RF signal processing semiconductor integrated circuit (RFIC) 1000 according to the first embodiment of the invention shown in FIG. 1 can perform a switching operation other than the above-described operation for switching the reception operation between the LTE system as the wireless access system A and the GSM system as the wireless access system B. Further, the RF signal processing semiconductor integrated circuit (RFIC) 1000 according to the first embodiment of the invention shown in FIG. 1 is not limited to one having the two reception units of the wireless access system A reception unit (RXA) 200 and the wireless access system B reception unit (RXB) 210. That is, the RF signal processing semiconductor integrated circuit (RFIC) 1000 according to the first embodiment of the invention shown in FIG. 1 can also have only one of the two reception units and perform the operation for switching the reception operation between multiple systems such as LTE, GSM, W-CDMA.

Alternatively, the RF signal processing semiconductor integrated circuit (RFIC) 1000 according to the first embodiment of the invention shown in FIG. 1 supports both wireless access systems of LTE and W-CDMA, and the wireless access system A reception unit (RXA) 200 is shared between LTE reception and W-CDMA reception. The wireless access system B reception unit (RXB) 210 is used for GSM reception.

The W-CDMA system received by the wireless access system A reception unit (RXA) 200 has one mode with a channel spacing of 5 MHz and a bandwidth of 3.84 MHz. On the other hand, the LTE system received by the wireless access system A reception unit (RXA) 200 has six modes ranging from a mode with a channel spacing of 1.4 MHz and a bandwidth of 1.08 MHz to a mode with a channel spacing of 20 MHz and a bandwidth of 18 MHz.

Accordingly, the control unit 40 variably sets the cutoff frequency of the variable analog low-pass filters (A-LPF) A30, A31, A50, A51 and the cutoff frequency of the variable digital low-pass filters (D-LPF) A70, A71 in the wireless access system A reception unit (RXA) 200. This enables the above seven modes to be received by only the wireless access system A reception unit (RXA) 200.

This case represents switching from a reception operation mode in which the wireless access system A reception unit (RXA) 200 receives a wireless access system A0 to a reception operation mode in which the wireless access system A reception unit (RXA) 200 receives a wireless access system A1. The wireless access systems A0 and A1 are one and another modes selected from among the above seven modes.

First, assume that the wireless access system A reception unit (RXA) 200 receives the wireless access system A0 in the RF signal processing semiconductor integrated circuit (RFIC) 1000 of the receiver according to the first embodiment of the invention shown in FIG. 1.

A radio frequency (RF) reception signal received by the antenna 10 is supplied to the front-end module (FEM) 20.

The front-end module (FEM) 20 includes the antenna switch and the filter. The antenna switch included in the front-end module (FEM) 20 is controlled to couple with the wireless access system A reception unit (RXA) 200 and decouple with the wireless access system B reception unit (RXB) 210. The filter included in the front-end module (FEM) 20 passes, with as little loss as possible, a band including the desired signal band of the wireless access system A0 in the radio frequency (RF) reception signal received from the antenna 10, and suppresses an interference signal component outside the desired signal band. Consequently, the RF reception signal as the output signal of the front-end module (FEM) 20 is supplied to the low noise amplifier (LNA) A10.

The low noise amplifier (LNA) A10 amplifies the RF reception signal by a desired gain with as little noise as possible. The RF reception amplification signal outputted from the low noise amplifier (LNA) A10 is supplied to the mixers (MIX) A20, A21.

The PLL frequency synthesizer (PLL) 110 locks the frequency of the oscillation output signal of the voltage-controlled oscillator (VCO) 100 to a desired frequency by comparing the oscillation output signal of the voltage-controlled oscillator (VCO) 100 with the reference clock signal (not shown) based on operation setting information supplied from the control unit 40. Thus, the voltage-controlled oscillator (VCO) 100 generates the oscillation output signal of the desired frequency.

In response to the oscillation output signal supplied from the voltage-controlled oscillator (VCO) 100, the phase shifter A90 generates two local signals having a phase difference of 90 degrees and supplies the two local signals to the mixers (MIX) A20, A21. For example, if the wireless access system A reception unit (RXA) 200 is a direct conversion receiver, the frequency of the local signals supplied to the mixers (MIX) A20, A21 is equal to the center frequency of the RF reception signal of a desired channel supplied from the antenna 10. The oscillation signal of the voltage-controlled oscillator (VCO) 100 and the two local signals having a phase difference of 90 degrees generated from the phase shifter A90 do not necessarily have the same frequency. For example, the frequency of the oscillation output signal of the voltage-controlled oscillator (VCO) 100 is set to two times the frequency of the local signals. In this case, the phase shifter A90 has not only the function of the 90-degree phase shift between the local signals but also the function of dividing by two the frequency of the oscillation output signal of the voltage-controlled oscillator (VCO) 100.

The output signals of the mixers (MIX) A20, A21 are supplied to the variable analog low-pass filters (A-LPF) A30, A31. The variable analog low-pass filters (A-LPF) A30, A31, A50, A51 pass the desired channel signal band with as little loss as possible, and suppress the interference signal component outside the desired signal band.

The output signals of the variable analog low-pass filters (A-LPF) A30, A31 are supplied to the analog variable gain amplifiers (A-PGA) A40, A41. The analog variable gain amplifiers (A-PGA) A40, A41 are set to a desired gain based on setting information supplied from the control unit 40. The output signals of the analog variable gain amplifiers (A-PGA) A40, A41 are supplied to the variable analog low-pass filters (A-LPF) A50, A51. Further, the reception analog baseband signals which are the output signals of the variable analog low-pass filters (A-LPF) A50, A51 are supplied to the analog-digital converters (ADC) A60, A61, and the reception digital baseband signals are outputted from the output terminals of the analog-digital converters (ADC) A60, A61.

In response to the reception digital baseband signals from the output terminals of the analog-digital converters (ADC) A60, A61, the variable digital low-pass filters (D-LPF) A70, A71 pass the desired channel signal band with as little loss as possible, and suppress the interference signal component outside the desired signal band. The output signals of the variable digital low-pass filters (D-LPF) A70, A71 are supplied to the digital variable gain amplifiers (D-PGA) A80, A81.

The digital variable gain amplifiers (D-PGA) A80, A81 configured with digital multipliers are set to a desired digital gain based on setting information supplied from the control unit 40. The reception digital baseband signals as the output signals of the digital variable gain amplifiers (D-PGA) A80, A81 are transferred from the digital interface output terminal (DIFout) 32 to the baseband LSI (not shown) by the digital interface (DIF) 30.

Assume that the digital interface (DIF) 30 receives a reception stop signal of the wireless access system A0 and a reception start signal of the wireless access system A1 at the digital interface input terminal (DIFin) 31 in this state. In general, prior to the reception start signal of the wireless access system A1, the reception stop signal of the wireless access system A0 reaches the RF signal processing semiconductor integrated circuit (RFIC) 1000. However, the reception start signal of the wireless access system A1 may arrive prior to the reception stop signal of the wireless access system A0. Alternatively, it is possible to determine that the reception stop signal of the wireless access system A0 has been received by exclusively processing the reception start signal of the wireless access system A1. The two signals follow the control protocol between the RF signal processing semiconductor integrated circuit (RFIC) 1000 according to the first embodiment of the invention shown in FIG. 1 and the baseband LSI (not shown), and the invention is applicable to any signaling system described above.

For reception stop processing of the wireless access system A0, first the switch included in the front-end module (FEM) 20 decouples the wireless access system A reception unit (RXA) 200 based on the control unit 40.

The control unit 40 stores the signal delay time $t_{DA}$ of the analog reception unit (A-RXA) 202 and the analog reception unit (A-RXB) 212 and the signal delay time $t_{DD}$ of the digital reception unit (D-RXA) 203 and the digital reception unit (D-RXB) 213. To support the multiple wireless access systems A0, A1, the variable analog low-pass filters (A-LPF) A30, A31, A50, A51 and the variable digital low-pass filters (D-LPF) A70, A71 in the wireless access system A reception unit (RXA) 200 are varied. That is, in the case of supporting the multiple wireless access systems A0, A1 only by the wireless access system A reception unit (RXA) 200, the signal delay time $t_{DA}$ and the signal delay time $t_{DD}$ have different values for the respective wireless access systems; accordingly, a plurality of values are stored in a table, or desired values are transferred from the baseband LSI. Similarly, to support multiple wireless access systems B0, B1, the variable analog low-pass filters (A-LPF) B30, B31, B50, B51 and the variable digital low-pass filters (D-LPF) B70, B71 in the wireless access system B reception unit (RXB) 210 are varied. That is, in the case of supporting the multiple wireless access systems B0, B I only by the wireless access system B reception unit (RXB) 210, the signal delay time t.sub.DA and the signal delay time t.sub.DD have different values for the respective wireless access systems; accordingly, a plurality of values are stored in a table, or desired values are transferred from the baseband LSI.

After the control unit 40 waits for a signal delay time t.sub.DA (A0) of the analog reception unit (A-RXA) 202 in the reception mode of the wireless access system A0, the low level "L" of the on/off control signal (A-RXA_ON) 41R from the control unit 40 turns off the analog reception unit (A-RXA) 202 to complete the reception of the wireless access system A0. Then, the high level "H" of the on/off control signal (A-RXA_ON) 41R from the control unit 40 turns on the analog reception unit (A-RXA) 202 to receive the wireless access system A1. At this time, the variable analog low-pass filters (A-LPF) A30, A31, A50, A51 are set at a cutoff frequency corresponding to the wireless access system A1. At the same time, the PLL frequency synthesizer (PLL) 110 starts to lock the frequency of the voltage-controlled oscillator (VCO) 100 to the desired frequency of the wireless access system A1 by comparison with the reference clock signal (not shown) based on setting supplied from the control unit 40.

While the PLL frequency synthesizer (PLL) 110 and the voltage-controlled oscillator (VCO) 100 perform the lock operation, the digital reception unit (D-RXA) 203 is still processing internal signals. That is, the digital interface (DIF) 30 completes the output processing of all reception signals of the wireless access system A0 existing in the digital reception unit (D-RXA) 203 through the digital interface output terminal (DIFout) 32, and the low level "L" of the on/off control signal (D-RXA_ON) 44R from the control unit 40 turns off the digital reception unit (D-RXA) 203. This can also be implemented, in particular, by monitoring the digital reception unit (D-RXA) 203 by the control unit 40 and outputting a flag indicating that the digital interface (DIF) 30 has completed the output processing of all reception signals through the digital interface output terminal (DIFout) 32. Alternatively, since the signal delay time t.sub.DD of the digital reception unit (D-RXA) 203 is always constant, after the lapse of the signal delay time t.sub.DD after turning off the analog reception unit (A-RXA) 202, the low level "L" of the on/off control signal (D-RXA_ON) 44R from the control unit 40 may turn off the digital reception unit (D-RXA) 203.

After that, the high level "H" of the on/off control signal (D-RXA_ON) 44R from the control unit 40 turns on the digital reception unit (D-RXA) 203 to receive the wireless access system A1. At this time, the variable digital low-pass filters (D-LPF) A70, A71 are set at a cutoff frequency corresponding to the wireless access system A1. While the PLL frequency synthesizer (PLL) 110 and the voltage-controlled oscillator (VCO) 100 perform the lock operation, the analog reception unit (A-RXA) 202 cancels the offset voltage of the circuit and calibrates the filters. After the completion of all preparations for the reception start of the wireless access system A1, the switch included in the front-end module (FEM) 20 couples the wireless access system A reception unit (RXA) 200 based on the control unit 40.

By the above operation, the reception of the wireless access system A0 is completed, and the reception of the wireless access system A1 is enabled.

FIG. 4 is a diagram showing the time course of the operation for switching from the reception mode of the wireless access system A0 to the reception mode of the wireless access system A1 by the RF signal processing semiconductor integrated circuit according to the first embodiment of the invention shown in FIG. 1 and the time course of the operation for switching the reception operation of the RF signal processing semiconductor integrated circuit studied by the present inventors et al. prior to the invention shown in FIG. 11.

That is, for comparison, in FIG. 4, the upper part shows the time course of the operation for switching the reception operation of the RF signal processing semiconductor integrated circuit according to the first embodiment of the invention shown in FIG. 1, and the lower part shows the time course of the operation for switching the reception operation of the RF signal processing semiconductor integrated circuit studied by the present inventors et al. prior to the invention shown in FIG. 11.

In response to a reception stop command of the wireless access system A0, a reception unit off transition operation 400 of the wireless access system A0 is started as shown in FIG. 4. At the same time that the reception unit off transition operation 400 of the wireless access system A0 is started, the switching control signal 46 supplied from the control unit 40 to the front-end module (FEM) 20 changes from the high level "H" to the low level "L". Accordingly, in an antenna switch operation 401 in FIG. 4, the antenna switch included in the front-end module (FEM) 20 decouples the wireless access system A reception unit (RXA) 200.

After the start of the reception unit off transition operation 400 of the wireless access system A0, the on/off control signal (A-RXA_ON) 41R supplied from the control unit 40 to the analog reception unit (A-RXA) 202 is maintained at the high level "H" during the signal delay time t.sub.DA of the analog reception unit (A-RXA) 202, and the on/off control signal (A-RXA_ON) 41R changes to the low level "L" after the lapse of the signal delay time t.sub.DA. As a result, in the period of an analog reception unit A0 off transition operation 402 in FIG. 4 corresponding to the signal delay time t.sub.DA, analog reception signal processing of the wireless access system A0 by the analog reception unit (A-RXA) 202 including the variable analog low-pass filters (A-LPF) A30, A31, A50, A51 having a large signal delay time is completed. The analog signal processing includes analog-digital conversion processing by the analog-digital converters (ADC) A60, A61.

After the analog signal processing of the wireless access system A0 by the analog reception unit (A-RXA) 202 is completed in the signal delay time t.sub.DA, the on/off control signal (D-RXA_ON) 44R supplied from the control unit 40 to the digital reception unit (D-RXA) 203 is maintained at the high level "H" during the signal delay time t.sub.DD of the digital reception unit (D-RXA) 203, and the on/off control signal (D-RXA_ON) 44R changes to the low level "L" after the lapse of the signal delay time t.sub.DD. Consequently, in the period of a digital reception unit A0 off transition operation 403 in FIG. 4 corresponding to the signal delay time t.sub.DD, digital signal processing of the wireless access system A0 by the digital reception unit (D-RXA) 203 including the variable digital low-pass filters (D-LPF) A70, A71 having an extremely large signal delay time is completed. By the execution of the analog signal processing in the analog reception unit A0 off transition operation 402 during the signal delay time t.sub.DA and the digital signal processing in the digital reception unit A0 off transition operation 403 during the signal delay time t.sub.DD, the digital interface (DIF) 30 completes the sending of the last reception digital baseband signals of the wireless access system A0 to the baseband LSI (not shown) by a data sending operation 404.

On the other hand, at approximately the same time that the analog signal processing of the wireless access system A0 by the analog reception unit (A-RXA) 202 is completed in the signal delay time t.sub.DA, the on/off control signal (A-RXA_ON) 41R changes from the low level "L" to the high level "H", and a reception unit on transition operation 405 of the wireless access system A1 is started. That is, at approximately the same time that the reception unit on transition operation 405 of the wireless access system A1 is started, the on/off control signal (A-RXA_ON) 41R supplied from the control unit 40 to the analog reception unit (A-RXA) 202 of the wireless access system A reception unit (RXA) 200 changes from the low level "L" to the high level "H". As a result, in response to the high level "H" of the on/off control signal (A-RXA_ON) 41R, the analog reception unit (A-RXA) 202 of the wireless access system A reception unit (RXA) 200 is activated again. Accordingly, in the period of an analog reception unit A1 on transition operation 406 shown in FIG. 4, preparation for analog signal processing by the analog reception unit (A-RXA) 202 including the variable analog low-pass filters (A-LPF) A30, A31, A50, A51 having a large signal delay time is started. In an initial period 4061 in the period of the analog reception unit A1 on transition operation 406, the analog reception unit (A-RXA) 202 of the wireless access system A reception unit (RXA) 200 cancels DC offset voltage and calibrates filter characteristics. That is, the analog reception unit (A-RXA) 202 of the wireless access system A reception unit (RXA) 200 cancels the DC offset voltage of the internal circuit and calibrates the filter characteristics of the variable analog low-pass filters (A-LPF) A30, A31, A50, A51.

During a VCO lock period 407 in parallel with the period of the digital reception unit A0 off transition operation 403 and the analog reception unit A1 on transition operation 406 shown in FIG. 4, the PLL frequency synthesizer (PLL) 110 and the voltage-controlled oscillator (VCO) 100 perform the lock operation. That is, the PLL frequency synthesizer (PLL) 110 starts the lock operation so as to match the frequency of the oscillation output signal of the voltage-controlled oscillator (VCO) 100 to the desired frequency of the wireless access system A1 by comparing the oscillation output signal of the voltage-controlled oscillator (VCO) 100 with the reference clock signal (not shown) based on the on/off control signal (A-RXA_ON) 41R outputted from the control unit 40.

On the other hand, after the period of the digital reception unit A0 off transition operation 403 corresponding to the signal delay time t.sub.DD is completed, the on/off control signal (D-RXA_ON) 44R supplied from the control unit 40 to the digital reception unit (D-RXA) 203 of the wireless access system A reception unit (RXA) 200 changes from the low level "L" to the high level "H" again. As a result, in response to the high level "H" of the on/off control signal (D-RXA_ON) 44R, the digital reception unit (D-RXA) 203 of the wireless access system A reception unit (RXA) 200 is activated again. Accordingly, in the period of a digital reception unit A1 on transition operation 408 shown in FIG. 4, preparation for digital signal processing by the digital reception unit (D-RXA) 203 including the variable digital low-pass filters (D-LPF) A70, A71 having an extremely large signal delay time is started.

As shown in FIG. 4, after the PLL frequency synthesizer (PLL) 110 and the voltage-controlled oscillator (VCO) 100 complete the lock operation in the VCO lock period 407, the switching control signal 46 supplied from the control unit 40 to the front-end module (FEM) 20 changes from the low level "L" to the high level "H". Accordingly, in an antenna switch operation 409, the antenna switch included in the front-end module (FEM) 20 couples the wireless access system A reception unit (RXA) 200.

Consequently, this enables the direct conversion of the radio frequency (RF) reception signal of the wireless access system A1 into the reception digital baseband signals, using the analog reception unit (A-RXA) 202 and the digital reception unit (D-RXA) 203 in the wireless access system A reception unit (RXA) 200, after the antenna switch operation 409 is completed.

The lower part of FIG. 4 shows the time course of the operation for switching the reception operation of the RF signal processing semiconductor integrated circuit of the receiver studied by the present inventors et al. prior to the invention shown in FIG. 11.

In response to the reception stop command of the wireless access system A0, a reception unit off transition operation 410 of the wireless access system A0 is started. That is, by the reception unit off transition operation 410 of the wireless access system A0, transition from activation to deactivation of the reception operation of the whole wireless access system A reception unit (RXA) 200 in the RF signal processing semiconductor integrated circuit (RFIC) 1000 shown in FIG. 11 is started. At the same time that the reception unit off transition operation 410 of the wireless access system A0 is started, the switching control signal 46 supplied from the control unit 40 to the front-end module (FEM) 20 changes from the high level "H" to the low level "L". Accordingly, in an antenna switch operation 411 in FIG. 4, the antenna switch included in the front-end module (FEM) 20 decouples the wireless access system A reception unit (RXA) 200.

Consideration will be given to the total time of the analog signal delay time t.sub.DA of the analog reception unit and the digital signal delay time t.sub.DD of the digital reception unit in the wireless access system A reception unit (RXA) 200 after the start of the reception unit off transition operation 410 of the wireless access system A0. The on/off control signal (RXA_ON) 41R supplied from the control unit 40 to the wireless access system A reception unit (RXA) 200 is maintained at the high level "H" during the total time t.sub.DA+t.sub.DD. As a result, in the period of the reception unit off transition operation 410 of the wireless access system A0 in FIG. 4 corresponding to the total time t.sub.DA+t.sub.DD, reception signal processing of the wireless access system A0 composed of analog signal processing by the analog reception unit and digital signal processing by the digital reception unit in the wireless access system A reception unit (RXA) 200 is completed. By the execution of the analog signal processing by the analog reception unit and the digital signal processing by the digital reception unit in the wireless access system A reception unit (RXA) 200 during the total time t.sub.DA+t.sub.DD, the digital interface (DIF) 30 completes the sending of the last reception digital baseband signals of the wireless access system A0 to the baseband LSI (not shown) by a data sending operation 414.

After the completion of the reception unit off transition operation 410 of the wireless access system A0 in the total time t.sub.DA+t.sub.DD, the on/off control signal (RXA_ON) 41R supplied from the control unit 40 to the wireless access system A reception unit (RXA) 200 changes from the high level "H" to the low level "L". After that, the on/off control signal (RXA_ON) 41R supplied from the control unit 40 to the wireless access system A reception unit (RXA) 200 changes from the low level "L" to the high level "H". As a result, in response to the high level "H" of the on/off control signal (RXA_ON) 41R, the analog reception unit and the digital reception unit in the wireless access system A reception unit (RXA) 200 are activated again. Accordingly, in the period of a reception unit on transition operation 415 of the wireless access system A1 shown in FIG. 4, preparation for reception signal processing of the wireless access system A1 composed of preparation for analog signal processing by the analog reception unit and preparation for digital signal processing by the digital reception unit in the wireless access system A reception unit (RXA) 200 is started. In an initial period 4161 in the period of the reception unit on transition operation 415 of the wireless access system A1, the analog reception unit of the wireless access system A reception unit (RXA) 200 cancels DC offset voltage and calibrates filter characteristics. That is, the analog reception unit of the wireless access system A reception unit (RXA) 200 cancels the DC offset voltage of the internal circuit and calibrates the filter characteristics of the variable analog low-pass filters (A-LPF) A30, A31, A50, A51.

During a VCO lock period 417 approximately in parallel with the period of the reception unit on transition operation 415 of the wireless access system A1 shown in FIG. 4, the PLL frequency synthesizer (PLL) 110 and the voltage-controlled oscillator (VCO) 100 perform the lock operation. That is, the PLL frequency synthesizer (PLL) 110 starts the lock operation so as to match the frequency of the oscillation output signal of the voltage-controlled oscillator (VCO) 100 to the desired frequency of the wireless access system A1 by comparing the oscillation output signal of the voltage-controlled oscillator (VCO) 100 with the reference clock signal (not shown) based on the on/off control signal (RXA_ON) 41R outputted from the control unit 40.

As shown in FIG. 4, after the PLL frequency synthesizer (PLL) 110 and the voltage-controlled oscillator (VCO) 100 complete the lock operation in the VCO lock period 417, the switching control signal 46 supplied from the control unit 40 to the front-end module (FEM) 20 changes from the low level "L" to the high level "H". Accordingly, in an antenna switch operation 419, the antenna switch included in the front-end module (FEM) 20 couples the wireless access system A reception unit (RXA) 200 again.

Consequently, this enables the direct conversion of the radio frequency (RF) reception signal of the wireless access system A1 into the reception digital baseband signals, using the analog reception unit and the digital reception unit in the wireless access system A reception unit (RXA) 200, after the antenna switch operation 419 is completed.

As is obvious from the comparison of the upper and lower parts of FIG. 4, the operation for switching the reception operation according to the first embodiment of the invention shown in FIG. 1 shown in the upper part of FIG. 4 enables the early start of the DC offset voltage cancellation and filter characteristics calibration 4061 and the VCO lock period 407, in comparison with the operation for switching the reception operation studied by the present inventors et al. prior to the invention shown in FIG. 11 shown in the lower part of FIG. 4. This time difference corresponds to the digital signal delay time t.sub.DD of the digital reception unit (D-RXA) 203. As a result, the analog reception unit (A-RXA) 202 of the wireless access system A reception unit (RXA) 200 shown in FIG. 1 can early complete canceling the DC offset voltage of the internal circuit and calibrating the filter characteristics of the variable analog low-pass filters (A-LPF) A30, A31, A50, A51. Further, the PLL frequency synthesizer (PLL) 110 and the voltage-controlled oscillator (VCO) 100 can early complete the lock operation. Accordingly, the antenna switch operation 409 is completed early, thus making it possible to expedite the direct conversion of the radio frequency (RF) reception signal of the wireless access system A1 into the reception digital baseband signals, using the analog reception unit (A-RXA) 202 and the digital reception unit (D-RXA) 203 in the wireless access system A reception unit (RXA) 200.

<<Configuration of Cellular Phone Including Receiver and Transmitter>>

FIG. 5 is a diagram showing the configuration of a cellular phone including the receiver and a transmitter according to the first embodiment of the invention.

The essential feature of the first embodiment of the invention shown in FIG. 5 is to reduce the time of reception operation switching between the wireless access systems A and B to measure the signal power of an adjacent cell prior to a handover between adjacent cells in a wireless communication system as illustrated in FIGS. 1 to 4. If it is determined that the result of measuring the signal power of the adjacent cell is good, an instruction for a handover between the wireless access systems A and B is provided to a cellular phone terminal by a base station. Accordingly, the cellular phone terminal performs a reception operation and a transmission operation in accordance with the wireless access system after the handover.

In FIG. 5, reference numeral 10 denotes an antenna, 20 is a front-end module (FEM) including a switch, 1000 is a radio frequency (RF) signal processing semiconductor integrated circuit (RFIC), 30 is a digital interface (DIF), 31 is a digital interface input terminal (DIFin), and 32 is a digital interface output terminal (DIFout). Further, in FIG. 5, reference numerals A1002, B1002 denote an RF power amplifier (RF-HPA), and A1001, B1001 are a directional coupler for detecting power.

Further, reference numeral 200 denotes a wireless access system A reception unit (RXA), and 210 is a wireless access system B reception unit (RXB). In the wireless access system A reception unit (RXA) 200, reference numeral 202 denotes an analog reception unit (A-RXA), and 203 is a digital reception unit (D-RXA). In the wireless access system B reception unit (RXB) 210, reference numeral 212 denotes an analog reception unit (A-RXB), and 213 is a digital reception unit (D-RXB). Further, reference numeral 220 denotes a wireless access system A transmission unit (TXA), and 230 is a wireless access system B transmission unit (TXB). In the wireless access system A transmission unit (TXA) 220, reference numeral 222 denotes an analog transmission unit (A-TXA), and 223 is a digital transmission unit (D-TXA). In the wireless access system B transmission unit (TXB) 230, reference numeral 232 denotes an analog transmission unit (A-TXB), and 233 is a digital transmission unit (D-TXB).

A transmission digital baseband signal I having an in-phase component and a transmission digital baseband signal Q having a quadrature component are supplied from the baseband LSI (not shown) through the digital interface input terminal (DIFin) 31 of the digital interface (DIF) 30 to the digital transmission unit (D-TXA) 223 and the digital transmission unit (D-TXB) 233. The digital transmission unit (D-TXA) 223 and the digital transmission unit (D-TXB) 233 include FIR digital filters and digital-analog converters (DAC). The transmission digital baseband signals undergo digital filter signal processing by the FIR digital filters in the digital transmission units (D-TXA) 223 and (D-TXB) 233, and are supplied to the input terminals of the digital-analog converters (DAC). Then, transmission analog baseband signals outputted from the output terminals of the digital-analog converters (DAC) in the digital transmission units (D-TXA) 223 and (D-TXB) 233 are supplied to the input terminals of the analog transmission units (A-TXA) 222 and (A-TXB) 232. The analog transmission units (A-TXA) 222 and (A-TXB) 232 are each comprised of two transmission mixers, a phase shifter, and an adder. The transmission analog baseband signals I, Q and two transmission local signals having a phase difference of 90 degrees generated from the phase shifter are supplied to the two transmission mixers, RF transmission signals I, Q as the outputs of the two transmission mixers are supplied to the two input terminals of the adder, and a vector synthesis RF transmission signal is outputted from the output of the adder.

Further, reference numeral 40 denotes a control unit, 41R is an on/off control signal (A-RXA_ON) to the analog reception unit (A-RXA) 202 of the wireless access system A reception unit (RXA) 200, and 42R is an on/off control signal (A-RXB_ON) to the analog reception unit (A-RXB) 212 of the wireless access system B reception unit (RXB) 210. Further, reference numeral 44R denotes an on/off control signal (D-RXA_ON) to the digital reception unit (D-RXA) 203 of the wireless access system A reception unit (RXA) 200, and 45R is an on/off control signal (D-RXA_ON) to the digital reception unit (D-RXB) 213 of the wireless access system B reception unit (RXB) 210.

Further, reference numeral 41T denotes an on/off control signal (TXA ON) to the wireless access system A transmission unit (TXA) 220, 42T is an on/off control signal (TXB ON) to the wireless access system B transmission unit (TXB) 230, and 43T is an on/off control signal (DET ON) to a transmission level detector circuit (DET) 500.

In the radio frequency (RF) signal processing semiconductor integrated circuit (RFIC) shown in FIG. 5, the analog reception unit (A-RXA) 202 and the digital reception unit (D-RXA) 203 in the wireless access system A reception unit (RXA) 200 and the analog reception unit (A-RXB) 212 and the digital reception unit (D-RXB) 213 in the wireless access system B reception unit (RXB) 210 are configured as illustrated in FIG. 1.

Further, reference numeral 46 denotes a switching control signal (FEM_C) to the front-end module (FEM) 20, 100 is a voltage-controlled oscillator (VCO), and 110 is a PLL frequency synthesizer (PLL). Further, in the front-end module (FEM) 20, reference numerals 201, 203 denote a filter (FIL), and 202 is a duplexer (DPX).

The duplexer (DPX) 202 performs filtering to reduce as much as possible the signal interference between an RF transmission signal transmitted from the RF power amplifier (RFHPA) A1002 and an RF reception signal received by the wireless access system A reception unit (RXA) 200. The filters (FIL) 201, 203 function as channel selection filters for suppressing signals outside a band containing a desired RF reception signal or RF transmission signal. While in the example shown in FIG. 5 the duplexer (DPX) 202 and the filters (FIL) 201, 203 are included in the front-end module (FEM) 20, they can also be provided outside the front-end module (FEM) 20 with the cellular phone having equivalent performance.

In the example shown in FIG. 5, the wireless access system A reception unit (RXA) 200 and the wireless access system A transmission unit (TXA) 220 coupled to the duplexer (DPX) 202 of the front-end module (FEM) 20 configure a transmission/reception unit for implementing the transmission/reception of a wireless access system such as the W-CDMA or LTE system adopting Frequency Division Duplex (FDD). The wireless access system B reception unit (RXB) 210 and the wireless access system B transmission unit (TXB) 230 coupled the filters (FIL) 201, 203 of the front-end module (FEM) 20 configure a transmission/reception unit for implementing the transmission/reception of a wireless access system such as the GSM system of Time Division Duplex (t.sub.DD).

A plurality of switches included in the front-end module (FEM) 20 are switch-controlled based on the switching control signal (FEM_C) 46 from the control unit 40. In the example shown in FIG. 5, during the transmission/reception of the wireless access system A, the duplexer (DPX) 202 and the antenna 10 are coupled based on the switching control signal (FEM_C) 46. Further, during the reception of the wireless access system B, the filter (FIL) 201 and the antenna 10 are coupled based on the switching control signal (FEM_C) 46, and during the transmission of the wireless access system B, the filter (FIL) 203 and the antenna 10 are coupled based on the switching control signal (FEM_C) 46.

During the transmission of the wireless access system A, the transmission level detector circuit (DET) 500 detects the output power level of the RF power amplifier (RFHPA) A1002 through the directional coupler A1001. For the transmission unit of the wireless access system A, e.g., direct up-conversion shown in FIG. 2 of Non-patent Document 3 is adoptable. The transmission level detector circuit (DET) 500 performs gain control so that the total gain of the wireless access system A transmission unit (TXA) 220 and the gain of the RF power amplifier (RFHPA) A1002 become desired values by feeding back the detected output power level of the RF power amplifier (RFHPA) A1002 to the digital transmission unit (D-TXA) 223.

During the transmission of the wireless access system B, the transmission level detector circuit (DET) 500 detects the output power level of the RF power amplifier (RFHPA) B1002 through the directional coupler B1001. For the transmission unit of the wireless access system B, e.g., a polar modulation transmitter shown in FIG. 3 of Non-patent Document 3 and Patent Document 3 is adoptable. In this case, the transmission level detector circuit (DET) 500 performs gain control so that the total gain of the wireless access system B transmission unit (TXB) 230 and the gain of the RF power amplifier (RFHPA) B1002 become desired values by feeding back the detected output power level of the RF power amplifier (RFHPA) B1002 to the digital transmission unit (D-TXB) 233. Along therewith, in the case of an eight phase shift keying (8PSK) transmission signal, the transmission level detector circuit (DET) 500 performs phase control so that an envelope also has a desired property. On the other hand, in the case of a Gaussian minimum shift keying (GMSK) transmission signal, an automatic gain control function by current sensing can be included in the RF power amplifier (RFHPA) B1002 as described in Non-patent Document 4 for example. In this case, power control by the transmission level detector circuit (DET) 500 is disabled.

The RF signal processing semiconductor integrated circuit (RFIC) 1000 can be controlled from the baseband LSI (not shown) through the digital interface (DIF) 30. That is, the digital interface input terminal (DIFin) 31 and the digital interface output terminal (DIFout) 32 transfer digital signals. Accordingly, control signals for controlling the RF signal processing semiconductor integrated circuit (RFIC) 1000 and the front-end module (FEM) 20 and transmission signal data etc. processed by the RF signal processing semiconductor integrated circuit (RFIC) 1000 are transferred to the digital interface input terminal (DIFin) 31 from the baseband LSI (not shown). The digital interface output terminal (DIFout) 32 transfers reception signals processed by the RF signal processing semiconductor integrated circuit (RFIC) 1000 and information about the internal states etc. of the RF signal processing semiconductor integrated circuit (RFIC) 1000 and the front-end module (FEM) 20 to the baseband LSI (not shown). That is, if the digital interface (DIF) 30 is a serial interface, the number of external terminals of the RF signal processing semiconductor integrated circuit (RFIC) 1000 can be reduced in comparison with a parallel interface performing output processing of digital data having the same number of bits. Therefore, by configuring the digital interface (DIF) 30 with the serial interface, it is possible to reduce the size of a package containing the RF signal processing semiconductor integrated circuit (RFIC) 1000.

This embodiment enables high-speed switching between the wireless access system A reception unit (RXA) 200 and the wireless access system B reception unit (RXB) 210 in the RF signal processing semiconductor integrated circuit (RFIC) 1000 according to the first embodiment of the invention shown in FIG. 5 to measure the signal power of an adjacent cell prior to a handover between adjacent cells in a wireless communication system as illustrated in FIGS. 1 to 4. Further, since the wireless access system A transmission unit (TXA) 220 and the wireless access system B transmission unit (TXB) 230 in the RF signal processing semiconductor integrated circuit (RFIC) 1000 according to the first embodiment of the invention shown in FIG. 5 are independent of each other, one of the two units is deactivated and the other is activated in accordance with a handover instruction from a base station.

Second Embodiment

Figure 6:
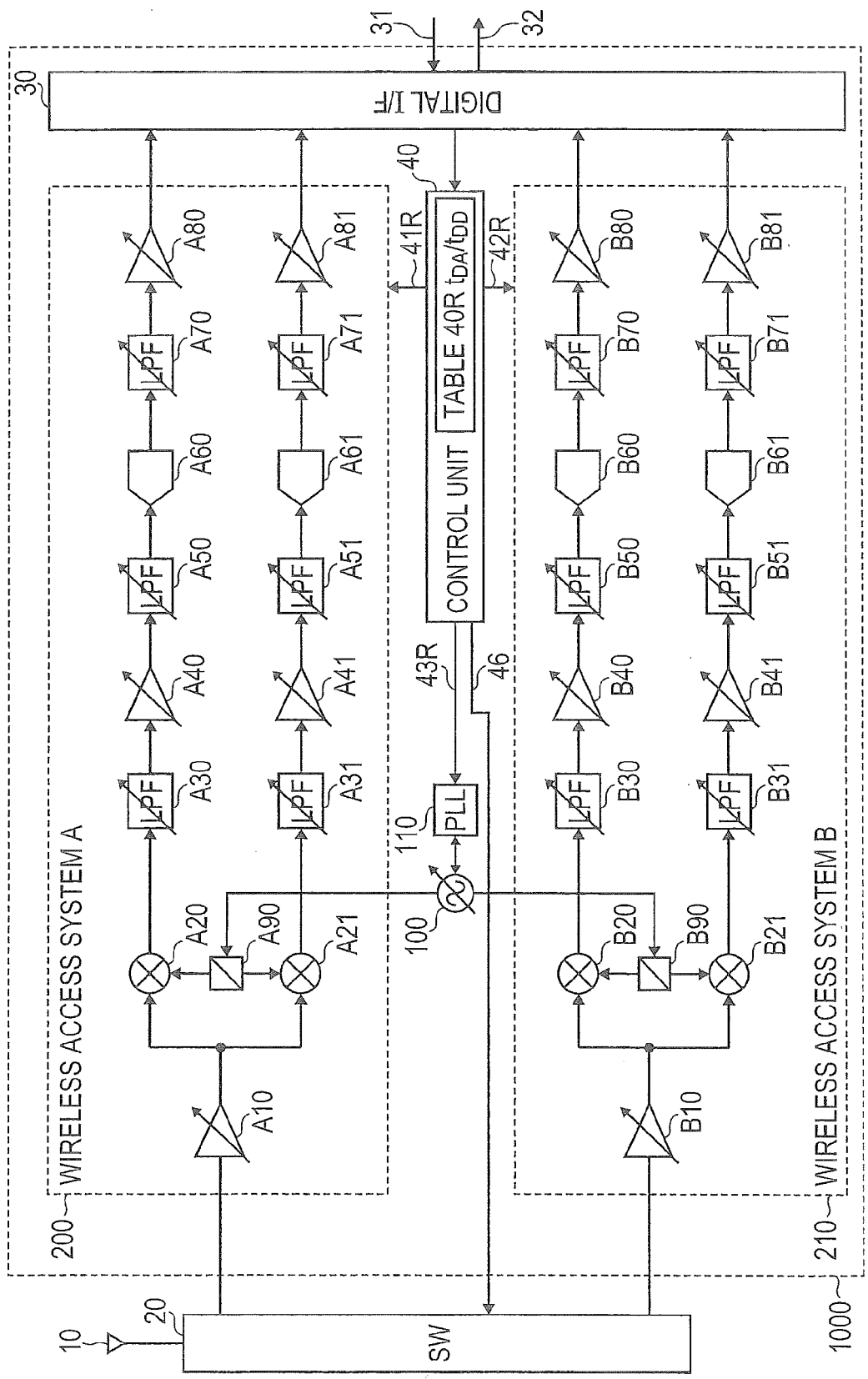
FIG. 6 is a diagram showing the configuration of a receiver according to a second embodiment of the invention.

FIG. 6 is a diagram showing the configuration of a receiver according to the second embodiment of the invention.

The receiver according to the second embodiment of the invention shown in FIG. 6 differs from the receiver according to the first embodiment of the invention shown in FIG. 1 in the following points.

That is, in the receiver according to the first embodiment of the invention shown in FIG. 1, the analog reception unit (A-RXA) 202 and the digital reception unit (D-RXA) 203 in the wireless access system A reception unit (RXA) 200 are controlled by the on/off control signal (A-RXA_ON) 41R and the on/off control signal (D-RXA_ON) 44R, respectively. Further, the analog reception unit (A-RXB) 212 and the digital reception unit (D-RXB) 213 in the wireless access system B reception unit (RXB) 210 are controlled by the on/off control signal (A-RXB_ON) 42R and the on/off control signal (D-RXB_ON) 45R, respectively.

On the other hand, in the receiver according to the second embodiment of the invention shown in FIG. 6, the analog reception unit and the digital reception unit in the wireless access system A reception unit (RXA) 200 are controlled by the common on/off control signal (RXA_ON) 41R, and the analog reception unit and the digital reception unit in the wireless access system B reception unit (RXB) 210 are controlled by the common on/off control signal (RXB_ON) 42R.

Further, in the receiver according to the second embodiment of the invention shown in FIG. 6, the PLL frequency synthesizer (PLL) 110 is controlled by a PLL control signal (PLL_C) 43R generated from the control unit 40.

The other configuration of the receiver according to the second embodiment of the invention shown in FIG. 6 is the same as that of the receiver according to the first embodiment of the invention shown in FIG. 1.

<<Operation for Switching Reception Operation>>

Figure 7:
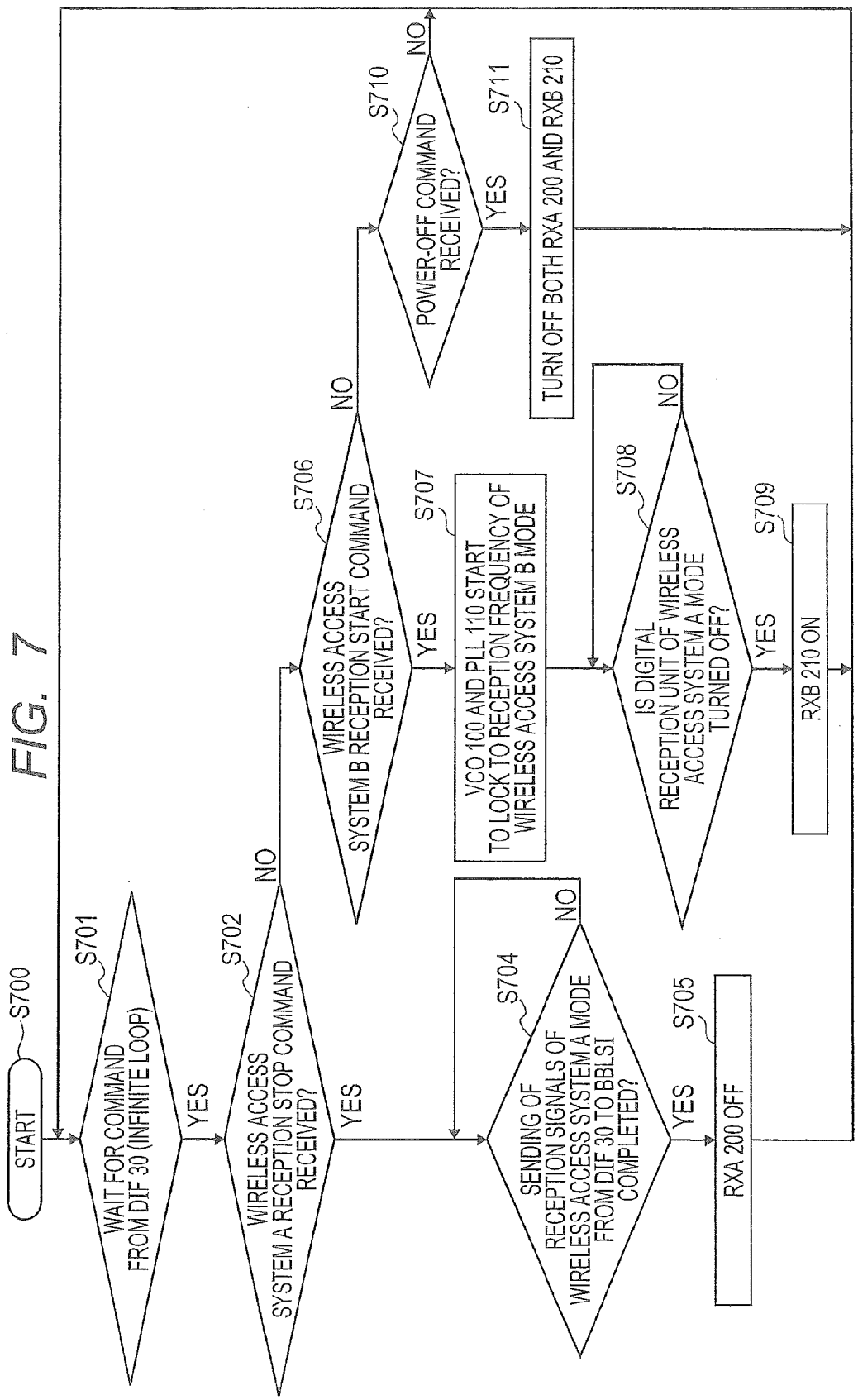
FIG. 7 is a flowchart showing an operation for switching the reception operation of the RF signal processing semiconductor integrated circuit (RFIC) 1000 as the receiver according to the second embodiment of the invention shown in FIG. 6.

FIG. 7 is a flowchart showing an operation for switching the reception operation of the RF signal processing semiconductor integrated circuit (RFIC) 1000 as the receiver according to the second embodiment of the invention shown in FIG. 6.

In step S700 of FIG. 7, the analog reception unit and the digital reception unit in the wireless access system A reception unit (RXA) 200 of the RF signal processing semiconductor integrated circuit (RFIC) 1000 are receiving the wireless access system A.

In step S701 of FIG. 7, the digital interface (DIF) 30 of the RF signal processing semiconductor integrated circuit (RFIC) 1000 waits for a command to be supplied to the digital interface input terminal (DIFin) 31 from the baseband LSI (not shown).

In step S702 of FIG. 7, the wireless access system A reception unit (RXA) 200 receives a reception stop command of the wireless access system A from the baseband LSI (not shown) through the digital interface (DIF) 30.

Then, in step S704 of FIG. 7, concerning all reception signals of the wireless access system A existing in the digital reception unit of the wireless access system A reception unit (RXA) 200, the digital reception unit completes output processing (sending) of the reception digital baseband signals from the digital interface output terminal (DIFout) 32 of the digital interface (DIF) 30 to the baseband LSI.

Upon completion of sending the reception digital baseband signals of the wireless access system A in step S704 of FIG. 7, the common on/off control signal (RXA_ON) 41R of the control unit 40 turns off the analog reception unit and the digital reception unit in the wireless access system A reception unit (RXA) 200 in next step S705.

In step S706 of FIG. 7, assume that the wireless access system B reception unit (RXB) 210 receives a reception start command of the wireless access system B through the digital interface (DIF) 30.

If the reception start command of the wireless access system B has been received in step S706, the PLL frequency synthesizer (PLL) 110 starts a lock operation based on the PLL control signal (PLL_C) 43R from the control unit 40 in next step S707. That is, the PLL frequency synthesizer (PLL) 110 starts the lock operation so as to match the frequency of the oscillation output signal of the voltage-controlled oscillator (VCO) 100 to the desired frequency of the wireless access system B by comparing the oscillation output signal of the voltage-controlled oscillator (VCO) 100 with the reference clock signal (not shown). While the PLL frequency synthesizer (PLL) 110 and the voltage-controlled oscillator (VCO) 100 perform the lock operation, in step S708 the wireless access system A reception unit (RXA) 200 performs digital signal processing by the digital reception unit of the wireless access system A reception unit (RXA) 200 including the variable digital low-pass filters (D-LPF) A70, A71 having an extremely large signal delay time.

After completion of turning off the digital reception unit of the wireless access system A reception unit (RXA) 200 in step S708 of FIG. 7, the analog reception unit and the digital reception unit in the wireless access system B reception unit (RXB) 210 are turned on in step S709 of FIG. 7. The timing of completion of turning off the digital reception unit of the wireless access system A reception unit (RXA) 200 in step S708 of FIG. 7 matches the timing of completion of turning off the digital reception unit of the wireless access system A reception unit (RXA) 200 in step S705 of FIG. 7.

When the digital interface (DIF) 30 receives a power-off command of the RF signal processing semiconductor integrated circuit (RFIC) 1000 in step S710 of FIG. 7, the wireless access system A reception unit (RXA) 200 and the wireless access system B reception unit (RXB) 210 are turned off in step S711 of FIG. 7.

Incidentally, the receiver studied by the present inventors et al. prior to the invention shown in FIG. 11, at the time of switching between wireless access systems by the switching operation shown in FIG. 12, completes the output processing (sending) of all reception digital baseband signals concerning all reception signals existing in the reception unit of a currently-accessed wireless access system, and then moves to preparation to receive a wireless access system to be accessed next.

<<Reduction in Reception Operation Switching Time>>

On the other hand, in step S707 of the operation for switching the reception operation shown in FIG. 7, the time required for the PLL frequency synthesizer (PLL) 110 to perform the lock operation so as to match the frequency of the oscillation output signal of the voltage-controlled oscillator (VCO) 100 to the desired frequency of the wireless access system B is several hundreds of microseconds. Further, in step S704 of the operation for switching the reception operation shown in FIG. 7, the time required to complete the output processing (sending) of the reception digital baseband signals from the digital interface (DIF) 30 to the baseband LSI concerning all reception signals of the wireless access system A existing in the digital reception unit of the wireless access system A reception unit (RXA) 200 is several tens of microseconds.

Therefore, the operation for switching the reception operation shown in FIG. 7 according to the second embodiment of the invention enables the parallel execution of the output processing (sending) of the reception digital baseband signals with a processing time of several ten microseconds in step S704 and the lock operation of the oscillation frequency of the voltage-controlled oscillator (VCO) 100 with a processing time of several hundred microseconds in step S707. Consequently, according to the operation for switching the reception operation in FIG. 7 according to the second embodiment of the invention, the processing time of several ten microseconds in step S704 is not included in the switching time by the parallel execution, which can reduce the time of reception operation switching between multiple wireless systems.

<<Time Course of Operation for Switching Reception Operation>>

Figure 8:
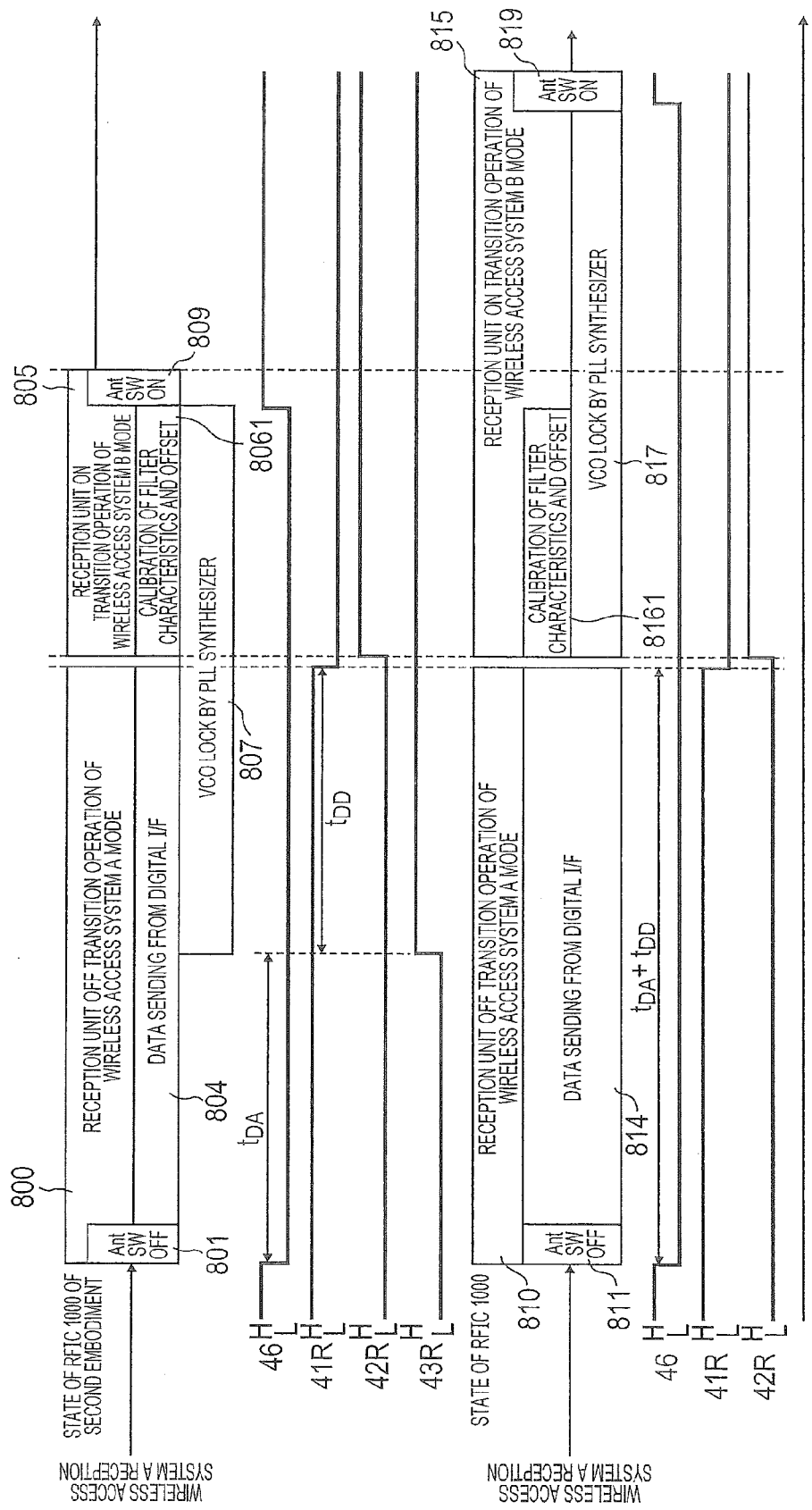
FIG. 8 is a diagram showing the time course of the operation for switching the reception operation of the RF signal processing semiconductor integrated circuit of the receiver according to the second embodiment of the invention shown in FIG. 6 and the time course of the operation for switching the reception operation of the RF signal processing semiconductor integrated circuit of the receiver studied by the present inventors et al. prior to the invention shown in FIG. 11.

FIG. 8 is a diagram showing the time course of the operation for switching the reception operation of the RF signal processing semiconductor integrated circuit of the receiver according to the second embodiment of the invention shown in FIG. 6 and the time course of the operation for switching the reception operation of the RF signal processing semiconductor integrated circuit of the receiver studied by the present inventors et al. prior to the invention shown in FIG. 11.

That is, for comparison, in FIG. 8, the upper part shows the time course of the operation for switching the reception operation of the RF signal processing semiconductor integrated circuit of the receiver according to the second embodiment of the invention shown in FIG. 6, and the lower part shows the time course of the operation for switching the reception operation of the RF signal processing semiconductor integrated circuit of the receiver studied by the present inventors et al. prior to the invention shown in FIG. 11.

The upper part of FIG. 8 shows the time course of the operation for switching the reception operation of the RF signal processing semiconductor integrated circuit of the receiver according to the second embodiment of the invention shown in FIG. 6.

In response to the reception stop command of the wireless access system A received in step S702 of FIG. 7, a reception unit off transition operation 800 of the wireless access system A is started as shown in FIG. 8. At the same time that the reception unit off transition operation 800 of the wireless access system A is started, the switching control signal 46 supplied from the control unit 40 to the front-end module (FEM) 20 changes from the high level "H" to the low level "L". Accordingly, in an antenna switch operation 801 in FIG. 8, the antenna switch included in the front-end module (FEM) 20 decouples the wireless access system A reception unit (RXA) 200.

After the start of the reception unit off transition operation 800 of the wireless access system A, the common on/off control signal (RXA_ON) 41R supplied from the control unit 40 to the wireless access system A reception unit (RXA) 200 is maintained at the high level "H" during the signal delay time t.sub.DA of the analog reception unit of the wireless access system A reception unit (RXA) 200. As a result, in the signal delay time t.sub.DA, analog signal processing by the analog reception unit of the wireless access system A reception unit (RXA) 200 including the variable analog low-pass filters (A-LPF) A30, A31, A50, A51 having a large signal delay time is completed. The analog signal processing includes analog-digital conversion processing by the analog-digital converters (ADC) A60, A61.

After the analog signal processing is completed in the signal delay time t.sub.DA, the common on/off control signal (RXA_ON) 41R supplied from the control unit 40 to the wireless access system A reception unit (RXA) 200 is maintained at the high level "H" during the signal delay time t.sub.DD of the digital reception unit of the wireless access system A reception unit (RXA) 200. Consequently, in the signal delay time t.sub.DD, digital signal processing by the digital reception unit of the wireless access system A reception unit (RXA) 200 including the variable digital low-pass filters (D-LPF) A70, A71 having an extremely large signal delay time is completed. By the execution of the analog signal processing during the signal delay time t.sub.DA and the digital signal processing during the signal delay time t.sub.DD, the digital interface (DIF) 30 completes the sending of the last reception digital baseband signals of the wireless access system A to the baseband LSI (not shown) by a data sending operation 804.

On the other hand, at approximately the same time that the analog signal processing by the analog reception unit of the wireless access system A reception unit (RXA) 200 is completed in the signal delay time t.sub.DA, the PLL control signal (PLL_C) 43R supplied from the control unit 40 to the PLL frequency synthesizer (PLL) 110 changes from the low level "L" to the high level "H". As a result, a VCO lock period 807 is started, and the PLL frequency synthesizer (PLL) 110 and the voltage-controlled oscillator (VCO) 100 perform the lock operation. That is, the PLL frequency synthesizer (PLL) 110 starts the lock operation so as to match the frequency of the oscillation output signal of the voltage-controlled oscillator (VCO) 100 to the desired frequency of the wireless access system B by comparing the oscillation output signal of the voltage-controlled oscillator (VCO) 100 with the reference clock signal (not shown) based on the PLL control signal (PLL_C) 43R outputted from the control unit 40.

After the digital signal processing is completed in the signal delay time t.sub.DD, a reception unit on transition operation 805 of the wireless access system B is started. Accordingly, preparation for analog signal processing by the analog reception unit of the wireless access system B reception unit (RXB) 210 including the variable analog low-pass filters (A-LPF) B30, B31, B50, B51 having a large signal delay time is started. In an initial period 8061 in the period of the reception unit on transition operation 805 of the wireless access system B, the analog reception unit of the wireless access system B reception unit (RXB) 210 cancels DC offset voltage and calibrates filter characteristics. That is, the analog reception unit of the wireless access system B reception unit (RXB) 210 cancels the DC offset voltage of the internal circuit and calibrates the filter characteristics of the variable analog low-pass filters (A-LPF) B30, B31, 950, B51.

During the VCO lock period 807 in parallel with the period of the reception unit on transition operation 805 of the wireless access system B shown in FIG. 8, the PLL frequency synthesizer (PLL) 110 and the voltage-controlled oscillator (VCO) 100 perform the lock operation.

On the other hand, after the completion of the period of the reception unit off transition operation 800 of the wireless access system A corresponding to the end of the signal delay time t.sub.DD, the common on/off control signal (RXB_ON) 42R supplied from the control unit 40 to the analog reception unit and the digital reception unit in the wireless access system B reception unit (RXB) 210 changes from the low level "L" to the high level "H". As a result, in response to the high level "H" of the common on/off control signal (RXB_ON) 42R, the digital reception unit of the wireless access system B reception unit (RXB) 210 is also activated. Accordingly, in an initial period in the period of the reception unit on transition operation 805 of the wireless access system B, preparation for digital signal processing by the digital reception unit of the wireless access system B reception unit (RXB) 210 including the variable digital low-pass filters (D-LPF) B70, B71 having an extremely large signal delay time is started.

As shown in FIG. 8, after the PLL frequency synthesizer (PLL) 110 and the voltage-controlled oscillator (VCO) 100 complete the lock operation in the VCO lock period 807, the switching control signal 46 supplied from the control unit 40 to the front-end module (FEM) 20 changes from the low level "L" to the high level "H". Accordingly, in an antenna switch operation 809, the antenna switch included in the front-end module (FEM) 20 couples the wireless access system B reception unit (RXB) 210.

Consequently, this enables the direct conversion of the radio frequency (RF) reception signal of the wireless access system B into the reception digital baseband signals, using the analog reception unit and the digital reception unit in the wireless access system B reception unit (RXB) 210, after the antenna switch operation 809 is completed.

The lower part of FIG. 8 shows the time course of the operation for switching the reception operation of the RF signal processing semiconductor integrated circuit of the receiver studied by the present inventors et al. prior to the invention shown in FIG. 11.

In response to the reception stop command of the wireless access system A, a reception unit off transition operation 810 of the wireless access system A is started. That is, by the reception unit off transition operation 810 of the wireless access system A, transition from activation to deactivation of the reception operation of the whole wireless access system A reception unit (RXA) 200 in the RF signal processing semiconductor integrated circuit (RFIC) 1000 shown in FIG. 11 is started. At the same time that the reception unit off transition operation 810 of the wireless access system A is started, the switching control signal 46 supplied from the control unit 40 to the front-end module (FEM) 20 changes from the high level "H" to the low level "L". Accordingly, in an antenna switch operation 811 in FIG. 8, the antenna switch included in the front-end module (FEM) 20 decouples the wireless access system A reception unit (RXA) 200.

Consideration will be given to the total time of the analog signal delay time t.sub.DA of the analog reception unit and the digital signal delay time t.sub.DD of the digital reception unit in the wireless access system A reception unit (RXA) 200 after the start of the reception unit off transition operation 810 of the wireless access system A. The on/off control signal (RXB_ON) 41R supplied from the control unit 40 to the wireless access system A reception unit (RXA) 200 is maintained at the high level "H" during the total time t.sub.DA+t.sub.DD, and the on/off control signal (RXA_ON) 41R changes to the low level "L" after the lapse of the total time t.sub.DA+t.sub.DD. As a result, in the period of the reception unit off transition operation 810 of the wireless access system A in FIG. 8 corresponding to the total time t.sub.DA+t.sub.DD analog signal processing by the analog reception unit and digital signal processing by the digital reception unit in the wireless access system A reception unit (RXA) 200 are completed. By the execution of the analog signal processing by the analog reception unit and the digital signal processing by the digital reception unit in the wireless access system A reception unit (RXA) 200 during the total time t.sub.DA+t.sub.DD the digital interface (DIF) 30 completes the sending of the last reception digital baseband signals of the wireless access system A to the baseband LSI (not shown) by a data sending operation 814.

After the completion of the reception unit off transition operation 810 of the wireless access system A in the total time t.sub.DA+t.sub.DD, the on/off control signal (RXA_ON) 41R supplied from the control unit 40 to the wireless access system A reception unit (RXA) 200 changes from the high level "H" to the low level "L". After that, the on/off control signal (RXB_ON) 42R supplied from the control unit 40 to the wireless access system B reception unit (RXB) 210 changes from the low level "L" to the high level "H". As a result, in response to the high level "H" of the on/off control signal (RXB_ON) 42R, the analog reception unit and the digital reception unit in the wireless access system B reception unit (RXB) 210 are activated. Accordingly, in the period of a reception unit on transition operation 815 of the wireless access system B shown in FIG. 8, preparation for analog signal processing by the analog reception unit and preparation for digital signal processing by the digital reception unit in the wireless access system B reception unit (RXB) 210 are started. In an initial period 8161 in the period of the reception unit on transition operation 815 of the wireless access system B, the analog reception unit of the wireless access system B reception unit (RXB) 210 cancels DC offset voltage and calibrates filter characteristics. That is, the analog reception unit of the wireless access system B reception unit (RXB) 210 cancels the DC offset voltage of the internal circuit and calibrates the filter characteristics of the variable analog low-pass filters (A-LPF) B30, B31, B50, B51.

During a VCO lock period 817 approximately in parallel with the period of the reception unit on transition operation 815 of the wireless access system B shown in FIG. 8, the PLL frequency synthesizer (PLL) 110 and the voltage-controlled oscillator (VCO) 100 perform the lock operation. That is, the PLL frequency synthesizer (PLL) 110 starts the lock operation so as to match the frequency of the oscillation output signal of the voltage-controlled oscillator (VCO) 100 to the desired frequency of the wireless access system B by comparing the oscillation output signal of the voltage-controlled oscillator (VCO) 100 with the reference clock signal (not shown) based on the on/off control signal (RXB_ON) 42R outputted from the control unit 40.

As shown in FIG. 8, after the PLL frequency synthesizer (PLL) 110 and the voltage-controlled oscillator (VCO) 100 complete the lock operation in the VCO lock period 817, the switching control signal 46 supplied from the control unit 40 to the front-end module (FEM) 20 changes from the low level "L" to the high level "H". Accordingly, in an antenna switch operation 819, the antenna switch included in the front-end module (FEM) 20 couples the wireless access system B reception unit (RXB) 210.

Consequently, this enables the direct conversion of the radio frequency (RF) reception signal of the wireless access system B into the reception digital baseband signals, using the analog reception unit and the digital reception unit in the wireless access system B reception unit (RXB) 210, after the antenna switch operation 819 is completed.

As is obvious from the comparison of the upper and lower parts of FIG. 8, the operation for switching the reception operation according to the second embodiment of the invention shown in FIG. 6 shown in the upper part of FIG. 8 enables the early start of the VCO lock period 807, in comparison with the operation for switching the reception operation studied by the present inventors et al. prior to the invention shown in FIG. 11 shown in the lower part of FIG. 8. This time difference corresponds to the digital signal delay time $t_{DD}$ of the digital reception unit of the wireless access system A reception unit (RXA) 200. Accordingly, for the analog reception unit of the wireless access system B reception unit (RXB) 210 shown in FIG. 6, the PLL frequency synthesizer (PLL) 110 and the voltage-controlled oscillator (VCO) 100 can early complete the lock operation. Accordingly, the antenna switch operation 809 is completed early, thus making it possible to expedite the direct conversion of the radio frequency (RF) reception signal of the wireless access system B into the reception digital baseband signals, using the analog reception unit and the digital reception unit in the wireless access system B reception unit (RXB) 210.

Figure 9:
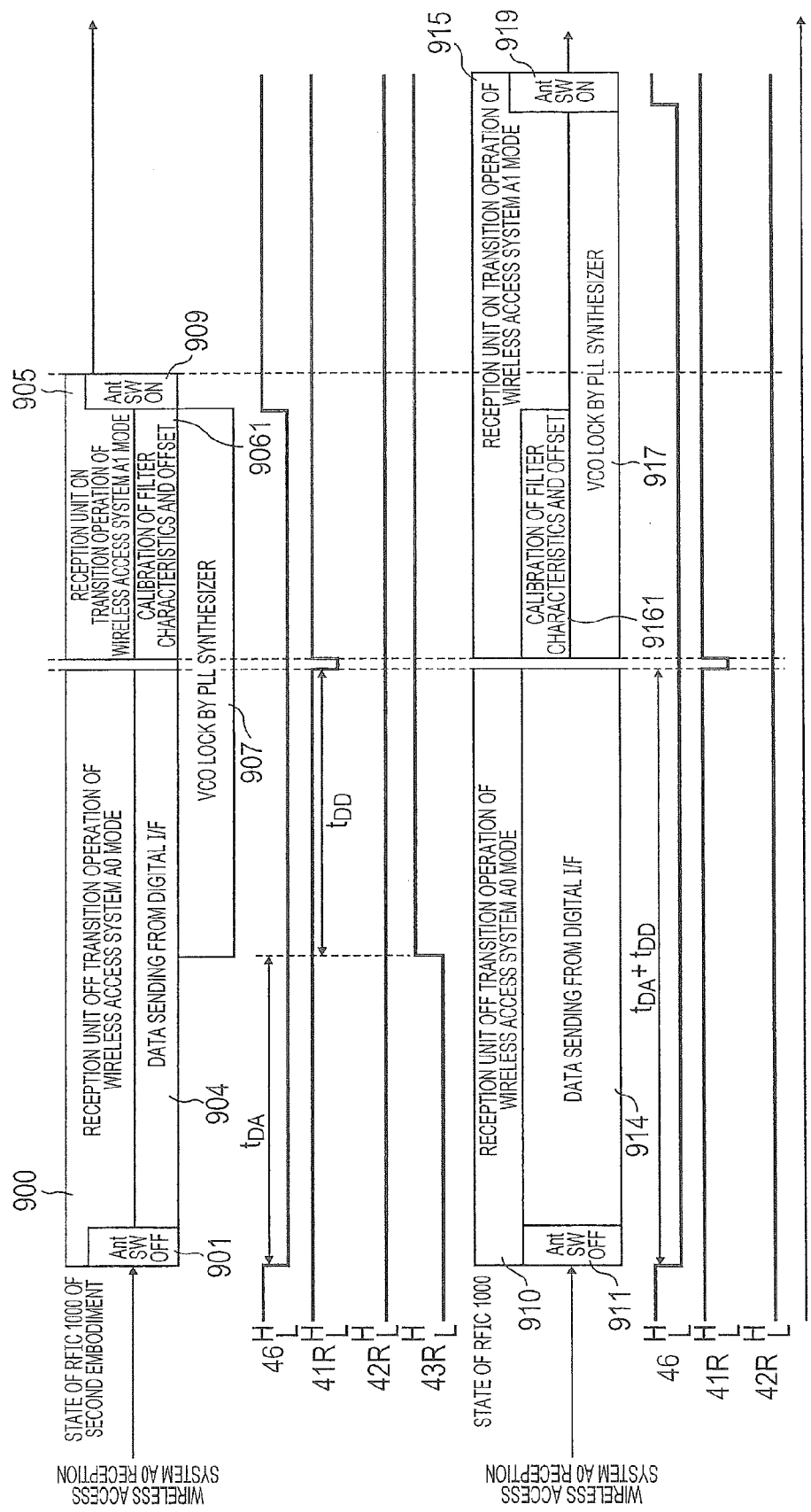
FIG. 9 is a diagram showing the time course of the operation for switching the reception operation of the RF signal processing semiconductor integrated circuit of the receiver according to the second embodiment of the invention shown in FIG. 6 and the time course of the operation for switching the reception operation of the RF signal processing semiconductor integrated circuit of the receiver studied by the present inventors et al. prior to the invention shown in FIG. 11.

FIG. 9 is a diagram showing the time course of the operation for switching the reception operation of the RF signal processing semiconductor integrated circuit of the receiver according to the second embodiment of the invention shown in FIG. 6 and the time course of the operation for switching the reception operation of the RF signal processing semiconductor integrated circuit of the receiver studied by the present inventors et al. prior to the invention shown in FIG.

That is, for comparison, in FIG. 9, the upper part shows the time course of the operation for switching the reception operation of the RF signal processing semiconductor integrated circuit of the receiver according to the second embodiment of the invention shown in FIG. 6, and the lower part shows the time course of the operation for switching the reception operation of the RF signal processing semiconductor integrated circuit of the receiver studied by the present inventors et al. prior to the invention shown in FIG. 11.

The upper part of FIG. 9 shows the time course of the operation for switching the reception operation of the RF signal processing semiconductor integrated circuit of the receiver according to the second embodiment of the invention shown in FIG. 6.

In response to a reception stop command of the wireless access system A0, a reception unit off transition operation 900 of the wireless access system A0 is started as shown in FIG. 9. At the same time that the reception unit off transition operation 900 of the wireless access system A0 is started, the switching control signal 46 supplied from the control unit 40 to the front-end module (FEM) 20 changes from the high level "H" to the low level "L". Accordingly, in an antenna switch operation 901 in FIG. 9, the antenna switch included in the front-end module (FEM) 20 decouples the wireless access system A reception unit (RXA) 200.

After the start of the reception unit off transition operation 900 of the wireless access system A0, the common on/off control signal (RXA_ON) 41R supplied from the control unit 40 to the wireless access system A reception unit (RXA) 200 is maintained at the high level "H" during the signal delay time $t_{DA}$ of the analog reception unit of the wireless access system A reception unit (RXA) 200. As a result, in the signal delay time $t_{DA}$, analog signal processing by the analog reception unit of the wireless access system A reception unit (RXA) 200 including the variable analog low-pass filters (A-LPF) A30, A31, A50, A51 having a large signal delay time is completed. The analog signal processing includes analog-digital conversion processing by the analog-digital converters (ADC) A60, A61.

After the analog signal processing is completed in the signal delay time $t_{DA}$, the common on/off control signal (RXA_ON) 41R supplied from the control unit 40 to the wireless access system A reception unit (RXA) 200 is maintained at the high level "H" during the signal delay time $t_{DD}$ of the digital reception unit of the wireless access system A reception unit (RXA) 200. Consequently, in the signal delay time $t_{DD}$, digital signal processing by the digital reception unit of the wireless access system A reception unit (RXA) 200 including the variable digital low-pass filters (D-LPF) A70, A71 having an extremely large signal delay time is completed. By the execution of the analog signal processing during the signal delay time $t_{DA}$ and the digital signal processing during the signal delay time $t_{DD}$, the digital interface (DIF) 30 completes the sending of the last reception digital baseband signals of the wireless access system A0 to the baseband LSI (not shown) by a data sending operation 904.

On the other hand, at approximately the same time that the analog signal processing by the analog reception unit of the wireless access system A reception unit (RXA) 200 is completed in the signal delay time $t_{DA}$, the PLL control signal (PLL_C) 43R supplied from the control unit 40 to the PLL frequency synthesizer (PLL) 110 changes from the low level "L" to the high level "H". As a result, a VCO lock period 907 is started, and the PLL frequency synthesizer (PLL) 110 and the voltage-controlled oscillator (VCO) 100 perform the lock operation. That is, the PLL frequency synthesizer (PLL) 110 starts the lock operation so as to match the frequency of the oscillation output signal of the voltage-controlled oscillator (VCO) 100 to the desired frequency of the wireless access system B by comparing the oscillation output signal of the voltage-controlled oscillator (VCO) 100 with the reference clock signal (not shown) based on the PLL control signal (PLL_C) 43R outputted from the control unit 40.

After the digital signal processing is completed in the signal delay time $t_{DD}$, a reception unit on transition operation 905 of the wireless access system A1 is started. Accordingly, preparation for analog signal processing by the analog reception unit of the wireless access system A reception unit (RXA) 200 including the variable analog low-pass filters (A-LPF) A30, A31, A50, A51 having a large signal delay time is started. In an initial period 9061 in the period of the reception unit on transition operation 905 of the wireless access system A1, the analog reception unit of the wireless access system A reception unit (RXA) 200 cancels DC offset voltage and calibrates filter characteristics. That is, the analog reception unit of the wireless access system A reception unit (RXA) 200 cancels the DC offset voltage of the internal circuit and calibrates the filter characteristics of the variable analog low-pass filters (A-LPF) A30, A31, A50, A51.

During the VCO lock period 907 in parallel with the period of the reception unit on transition operation 905 of the wireless access system A1 shown in FIG. 9, the PLL frequency synthesizer (PLL) 110 and the voltage-controlled oscillator (VCO) 100 perform the lock operation.

On the other hand, after the completion of the period of the reception unit off transition operation 900 of the wireless access system A0 corresponding to the end of the signal delay time t.sub.DD, the common on/off control signal (RXA_ON) 41R supplied from the control unit 40 to the analog reception unit and the digital reception unit in the wireless access system A reception unit (RXA) 200 changes from the low level "L" to the high level "H". As a result, in response to the high level "H" of the common on/off control signal (RXA_ON) 41R, the digital reception unit of the wireless access system A reception unit (RXA) 200 is also activated. Accordingly, in an initial period in the period of the reception unit on transition operation 905 of the wireless access system A1, preparation for digital signal processing by the digital reception unit of the wireless access system A reception unit (RXA) 200 including the variable digital low-pass filters (D-LPF) A70, A71 having an extremely large signal delay time is started.

As shown in FIG. 9, after the PLL frequency synthesizer (PLL) 110 and the voltage-controlled oscillator (VCO) 100 complete the lock operation in the VCO lock period 907, the switching control signal 46 supplied from the control unit 40 to the front-end module (FEM) 20 changes from the low level "L" to the high level "H". Accordingly, in an antenna switch operation 909, the antenna switch included in the front-end module (FEM) 20 couples the wireless access system A reception unit (RXA) 200.

Consequently, this enables the direct conversion of the radio frequency (RF) reception signal of the wireless access system A1 into the reception digital baseband signals, using the analog reception unit and the digital reception unit in the wireless access system A reception unit (RXA) 200, after the antenna switch operation 909 is completed.

The lower part of FIG. 9 shows the time course of the operation for switching the reception operation of the RF signal processing semiconductor integrated circuit of the receiver studied by the present inventors et al. prior to the invention shown in FIG. 11.

In response to the reception stop command of the wireless access system A0, a reception unit off transition operation 910 of the wireless access system A0 is started. That is, by the reception unit off transition operation 910 of the wireless access system A0, transition from activation to deactivation of the reception operation of the whole wireless access system A reception unit (RXA) 200 in the RF signal processing semiconductor integrated circuit (RFIC) 1000 shown in FIG. 11 is started. At the same time that the reception unit off transition operation 910 of the wireless access system A0 is started, the switching control signal 46 supplied from the control unit 40 to the front-end module (FEM) 20 changes from the high level "H" to the low level "L". Accordingly, in an antenna switch operation 911 in FIG. 9, the antenna switch included in the front-end module (FEM) 20 decouples the wireless access system A reception unit (RXA) 200.

Consideration will be given to the total time of the analog signal delay time t.sub.DA of the analog reception unit and the digital signal delay time t.sub.DD of the digital reception unit in the wireless access system A reception unit (RXA) 200 after the start of the reception unit off transition operation 910 of the wireless access system A0. The on/off control signal (RXA_ON) 41R supplied from the control unit 40 to the wireless access system A reception unit (RXA) 200 is maintained at the high level "H" during the total time t.sub.DA+t.sub.DD, and the on/off control signal (RXA_ON) 41R changes to the low level "L" after the lapse of the total time t.sub.DA+t.sub.DD. As a result, in the period of the reception unit off transition operation 910 of the wireless access system A0 in FIG. 9 corresponding to the total time t.sub.DA+t.sub.DD, analog signal processing by the analog reception unit and digital signal processing by the digital reception unit in the wireless access system A reception unit (RXA) 200 are completed. By the execution of the analog signal processing by the analog reception unit and the digital signal processing by the digital reception unit in the wireless access system A reception unit (RXA) 200 during the total time t.sub.DA+t.sub.DD, the digital interface (DIF) 30 completes the sending of the last reception digital baseband signals of the wireless access system A0 to the baseband LSI (not shown) by a data sending operation 914.

After the completion of the reception unit off transition operation 910 of the wireless access system A0 in the total time t.sub.DA+t.sub.DD, the on/off control signal (RXA_ON) 41R supplied from the control unit 40 to the wireless access system A reception unit (RXA) 200 changes from the high level "H" to the low level "L". After that, the on/off control signal (RXA_ON) 41R supplied from the control unit 40 to the wireless access system A reception unit (RXA) 200 changes from the low level "L" to the high level "H" again. As a result, in response to the high level "H" of the on/off control signal (RXA_ON) 41R, the analog reception unit and the digital reception unit in the wireless access system A reception unit (RXA) 200 are activated. Accordingly, in the period of a reception unit on transition operation 915 of the wireless access system A1 shown in FIG. 9, preparation for analog signal processing by the analog reception unit and preparation for digital signal processing by the digital reception unit in the wireless access system A reception unit (RXA) 200 are started. In an initial period 9161 in the period of the reception unit on transition operation 915 of the wireless access system A1, the analog reception unit of the wireless access system A reception unit (RXA) 200 cancels DC offset voltage and calibrates filter characteristics. That is, the analog reception unit of the wireless access system A reception unit (RXA) 200 cancels the DC offset voltage of the internal circuit and calibrates the filter characteristics of the variable analog low-pass filters (A-LPF) A30, A31, A50, A51.

During a VCO lock period 917 approximately in parallel with the period of the reception unit on transition operation 915 of the wireless access system A1 shown in FIG. 9, the PLL frequency synthesizer (PLL) 110 and the voltage-controlled oscillator (VCO) 100 perform the lock operation. That is, the PLL frequency synthesizer (PLL) 110 starts the lock operation so as to match the frequency of the oscillation output signal of the voltage-controlled oscillator (VCO) 100 to the desired frequency of the wireless access system A1 by comparing the oscillation output signal of the voltage-controlled oscillator (VCO) 100 with the reference clock signal (not shown) based on the on/off control signal (RXA_ON) 41R outputted from the control unit 40.

As shown in FIG. 9, after the PLL frequency synthesizer (PLL) 110 and the voltage-controlled oscillator (VCO) 100 complete the lock operation in the VCO lock period 917, the switching control signal 46 supplied from the control unit 40 to the front-end module (FEM) 20 changes from the low level "L" to the high level "H". Accordingly, in an antenna switch operation 919, the antenna switch included in the front-end module (FEM) 20 couples the wireless access system A reception unit (RXA) 200.

Consequently, this enables the direct conversion of the radio frequency (RF) reception signal of the wireless access system A1 into the reception digital baseband signals, using the analog reception unit and the digital reception unit in the wireless access system A reception unit (RXA) 200, after the antenna switch operation 919 is completed.

As is obvious from the comparison of the upper and lower parts of FIG. 9, the operation for switching the reception operation according to the second embodiment of the invention shown in FIG. 6 shown in the upper part of FIG. 9 enables the early start of the VCO lock period 907, in comparison with the operation for switching the reception operation studied by the present inventors et al. prior to the invention shown in FIG. 11 shown in the lower part of FIG. 9. This time difference corresponds to the digital signal delay time t.sub.DD of the digital reception unit of the wireless access system A reception unit (RXA) 200. Accordingly, for the wireless access system A reception unit (RXA) 200 shown in FIG. 6, the PLL frequency synthesizer (PLL) 110 and the voltage-controlled oscillator (VCO) 100 can early complete the lock operation. Accordingly, the antenna switch operation 909 is completed early, thus making it possible to expedite the direct conversion of the radio frequency (RF) reception signal of the wireless access system A1 into the reception digital baseband signals, using the analog reception unit and the digital reception unit in the wireless access system A reception unit (RXA) 200.

<<Configuration of Cellular Phone Including Receiver and Transmitter>>

Figure 10:
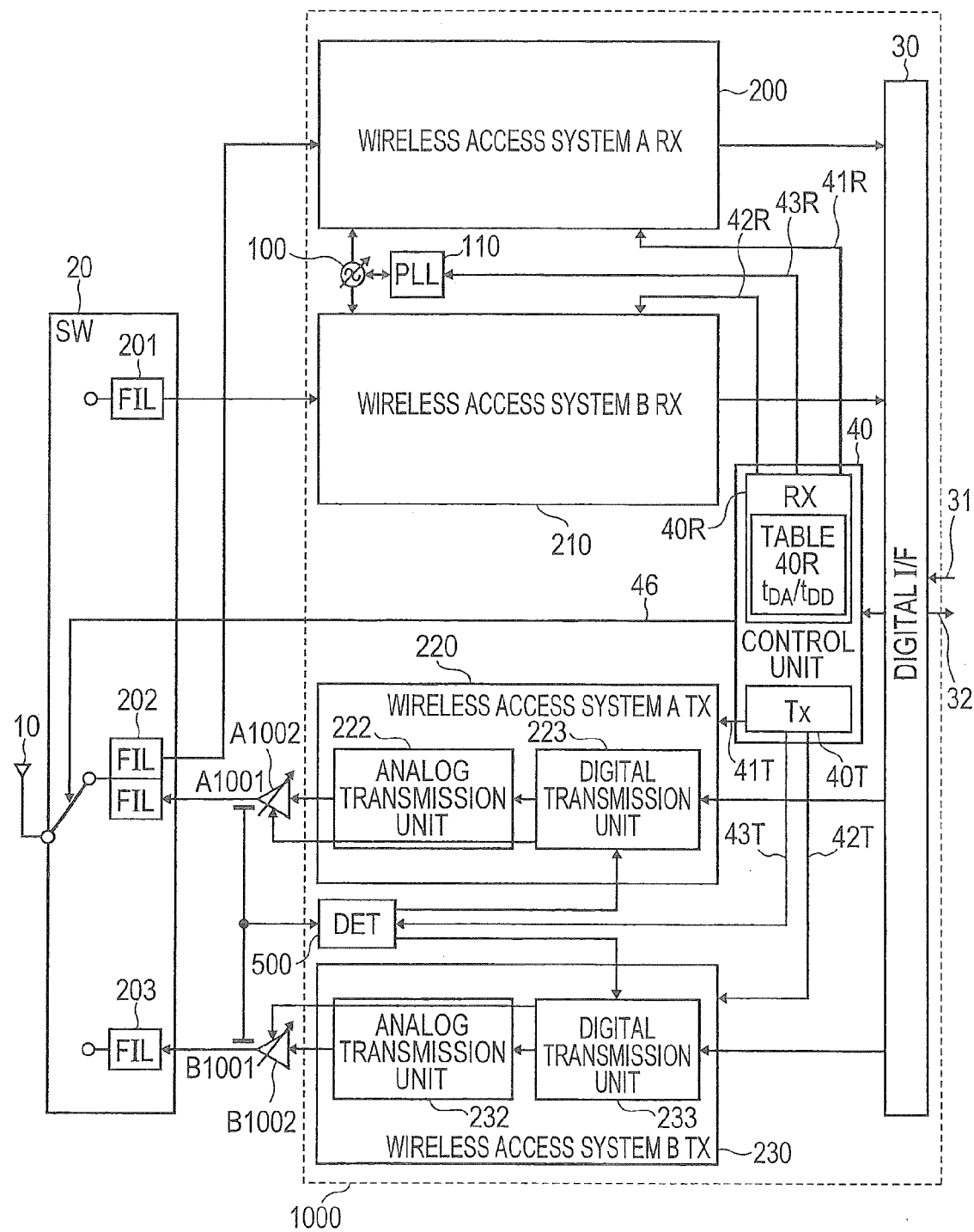
FIG. 10 is a diagram showing the configuration of a cellular phone including the receiver and the transmitter according to the second embodiment of the invention.

FIG. 10 is a diagram showing the configuration of a cellular phone including the receiver and the transmitter according to the second embodiment of the invention.

The essential feature of the second embodiment of the invention shown in FIG. 10 is to reduce the time of reception operation switching between multiple wireless access systems to measure the signal power of an adjacent cell prior to a handover between adjacent cells in a wireless communication system as illustrated in FIGS. 6 to 9. If it is determined that the result of measuring the signal power of the adjacent cell is good, an instruction for a handover between the multiple wireless access systems is provided to a cellular phone terminal by a base station. Accordingly, the cellular phone terminal performs a reception operation and a transmission operation in accordance with the wireless access system after the handover.

The cellular phone including the receiver and the transmitter according to the second embodiment of the invention shown in FIG. 10 differs from the cellular phone including the receiver and the transmitter according to the first embodiment of the invention shown in FIG. 5 in the following points.

That is, in the cellular phone according to the second embodiment of the invention shown in FIG. 10, as described for the receiver according to the second embodiment of the invention shown in FIG. 6, the analog reception unit and the digital reception unit in the wireless access system A reception unit (RXA) 200 are controlled by the common on/off control signal (RXA_ON) 41R. Further, the analog reception unit and the digital reception unit in the wireless access system B reception unit (RXB) 210 are controlled by the common on/off control signal (RXB_ON) 42R. Furthermore, the PLL frequency synthesizer (PLL) 110 is controlled by the PLL control signal (PLL_C) 43R generated from the control unit 40.

The other configuration of the cellular phone according to the second embodiment of the invention shown in FIG. 10 is the same as that of the cellular phone according to the first embodiment of the invention shown in FIG. 5.

While the invention made above by the present inventors has been described specifically based on the illustrated embodiments, the present invention is not limited thereto. It is needless to say that various changes and modifications can be made thereto without departing from the spirit and scope of the invention.

For example, the wireless access system A received by the wireless access system A reception unit (RXA) 200 and the wireless access system B received by the wireless access system B reception unit (RXB) 210 in the RF signal processing semiconductor integrated circuit (RFIC) 1000 according to the first embodiment of the invention shown in FIG. 1 are not limited to the LTE and GSM systems, respectively. For example, the W-CDMA system can be used as the wireless access system A received by the wireless access system A reception unit (RXA) 200, and the EDGE system can be used as the wireless access system B received by the wireless access system B reception unit (RXB) 210.

Further, the invention can also be applied to reception operation switching between multiple wireless access systems prior to a handover between the multiple wireless access systems in wireless communication such as wireless LAN other than the cellular phone.

What is claimed is:
1. A semiconductor integrated circuit comprising:
a first wireless access system reception unit comprising a first analog reception unit and a first digital reception unit;
a voltage-controlled oscillator;
a phase locked loop;
a digital interface,
wherein the first analog reception unit comprises a first reception mixer for down-converting an RF reception signal into a first analog reception signal and a first analog-digital converter for converting the first analog reception signal into a first digital reception signal, and
wherein the first wireless access system reception unit, the voltage-controlled oscillator, and the phase locked loop enable switching from a reception operation for a first RF reception signal of a first system to a reception operation for a second RF reception signal of a second system; and
a second wireless access system reception unit comprising a second analog reception unit and a second digital reception unit,
wherein the second analog reception unit comprises a second reception mixer for down-converting an RF reception signal into a second analog reception signal and a second analog-digital converter for converting the second analog reception signal into a second digital reception signal,
wherein the second digital reception unit comprises a second digital filter including an input terminal to which the second digital reception signal is supplied,
wherein a second digital filter reception output signal outputted from an output terminal of the second digital filter in the second digital reception unit can be outputted to the outside of the semiconductor integrated circuit through the digital interface,
wherein the voltage-controlled oscillator generates an oscillation output signal as a base for the first reception local signal supplied to the first reception mixer, and the phase locked loop locks a frequency of the oscillation output signal generated from the voltage-controlled oscillator to a desired frequency of the first system,
wherein the voltage-controlled oscillator generates an oscillation output signal as a base for a second reception local signal supplied to the second reception mixer, and the phase locked loop locks a frequency of the oscilla- tion output signal generated from the voltage-controlled oscillator to a desired frequency of the second system, wherein the first wireless access system reception unit, the voltage-controlled oscillator, and the phase locked loop can perform the reception operation for the first RF reception signal of the first system, wherein the second wireless access system reception unit, the voltage-controlled oscillator, and the phase locked loop can perform the reception operation for the second RF reception signal of the second system, wherein the first wireless access system reception unit, the second wireless access system reception unit, the voltage-controlled oscillator, and the phase locked loop enable switching from the reception operation for the first RF reception signal of the first system to the reception operation for the second RF reception signal of the second system, wherein in the switching, as for the reception operation for the first RF reception signal of the first system, the end transition operation of the first digital reception unit is performed subsequent to the end transition operation of the first analog reception unit, wherein in the switching, for the reception operation for the second RF reception signal of the second system, a start transition operation of the second analog reception unit and a start transition operation of the second digital reception unit are performed, and wherein in a period of the end transition operation of the first digital reception unit in the switching, the phase locked loop starts a lock operation so as to match the frequency of the oscillation output signal generated from the voltage-controlled oscillator to the desired frequency of the second system.

2. The semiconductor integrated circuit according to claim 1, wherein in the switching, for the reception operation for the second RF reception signal of the second system, a start transition operation of the first analog reception unit and a start transition operation of the first digital reception unit are performed.

3. The semiconductor integrated circuit according to claim 1, wherein the first digital reception unit comprises a first digital filter including an input terminal to which the first digital reception signal is supplied.

4. The semiconductor integrated circuit according to claim 3, wherein a first digital filter reception output signal outputted from an output terminal of the first digital filter in the first digital reception unit can be outputted to an outside of the semiconductor integrated circuit through the digital interface.

5. The semiconductor integrated circuit according to claim 1, further comprising a first wireless access system transmission unit comprising a first digital transmission unit and a first analog transmission unit and a second wireless access system transmission unit comprising a second digital transmission unit and a second analog transmission unit, wherein the first digital transmission unit of the first wireless access system transmission unit can convert a first digital transmission signal of the first system supplied from the outside of the semiconductor integrated circuit through the digital interface into a first analog transmission signal, wherein the second digital transmission unit of the second wireless access system transmission unit can convert a second digital transmission signal of the second system supplied from the outside of the semiconductor integrated circuit through the digital interface into a second analog transmission signal, wherein the first analog transmission unit of the first wireless access system transmission unit can up-convert the first analog transmission signal into a first RF transmission signal of the first system, and wherein the second analog transmission unit of the second wireless access system transmission unit can up-convert the second analog transmission signal into a second RF transmission signal of the second system.

* * * * *